INVENTORS:
Paul Niquette
Charles E. Wallace

Attorneys

Dec. 5, 1967  P. NIQUETTE ET AL  3,356,996

DATA TRANSFER SYSTEM

Filed Jan. 7, 1965  13 Sheets-Sheet 2

INVENTORS:
Paul Niquette
Charles E. Wallace

Attorneys

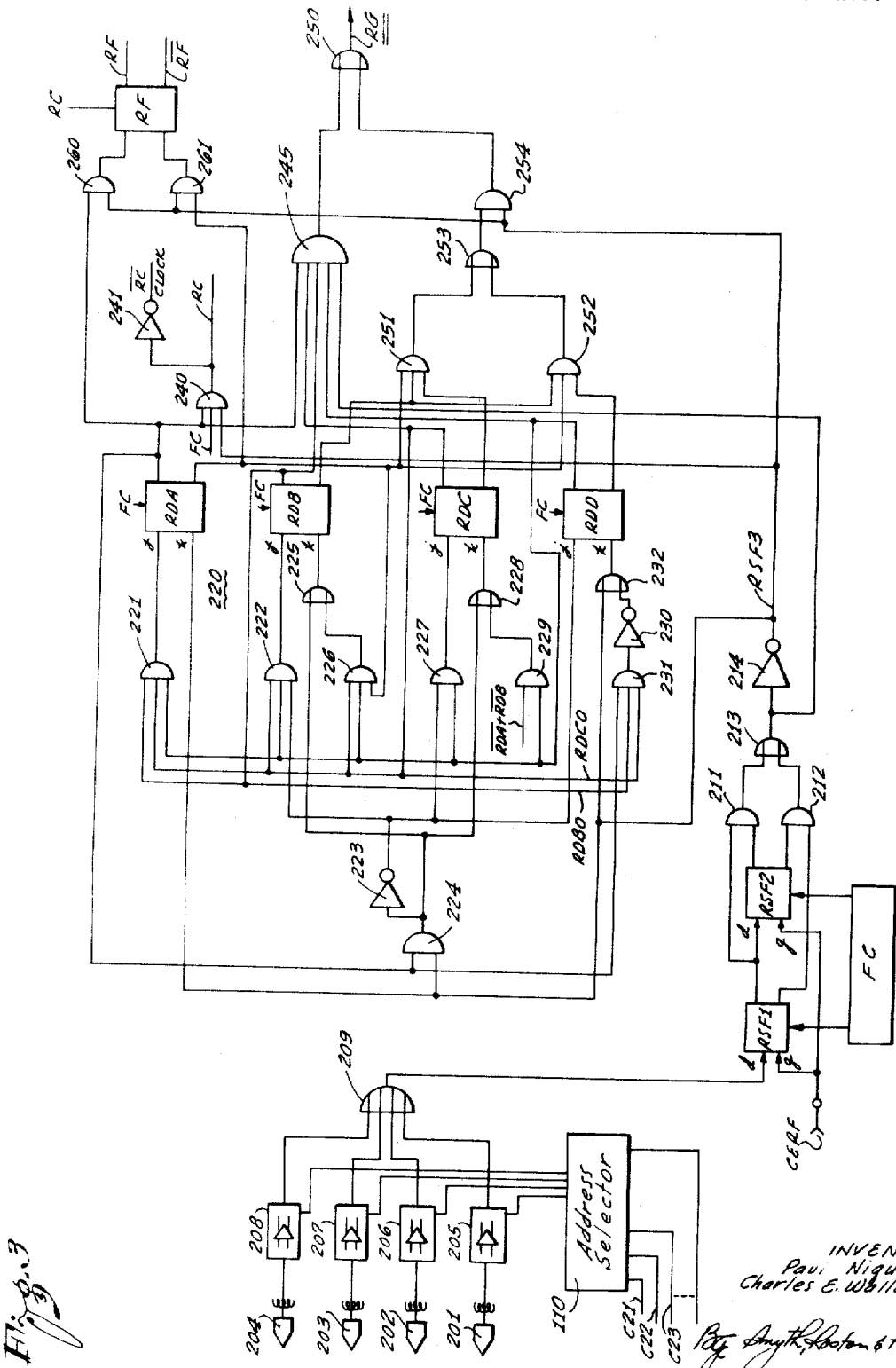

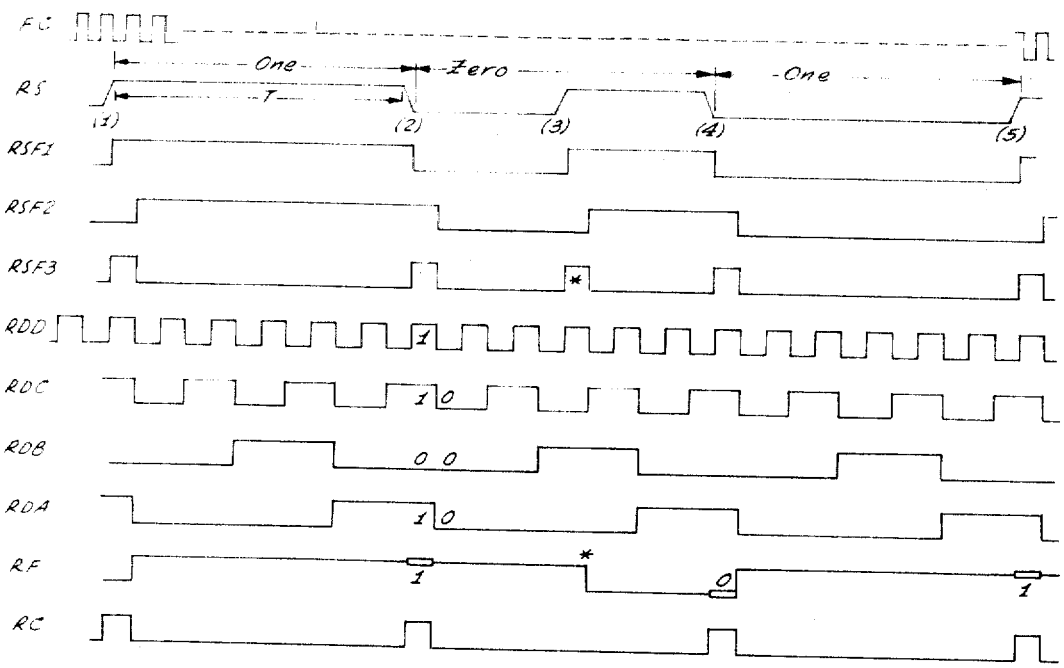
Fig. 4 Read Decoder Waveforms with Transport Operating at Rated Speed
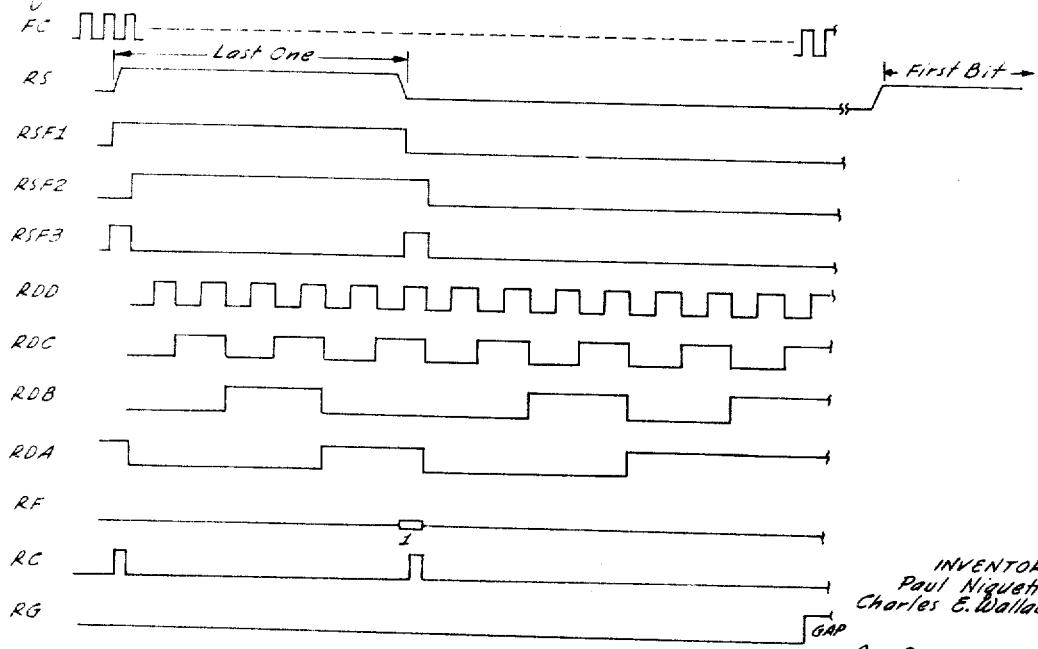
Fig. 4A Read Decoder Waveforms Gap Detection
INVENTORS:
Paul Niquette
Charles E. Wallace
Attorneys

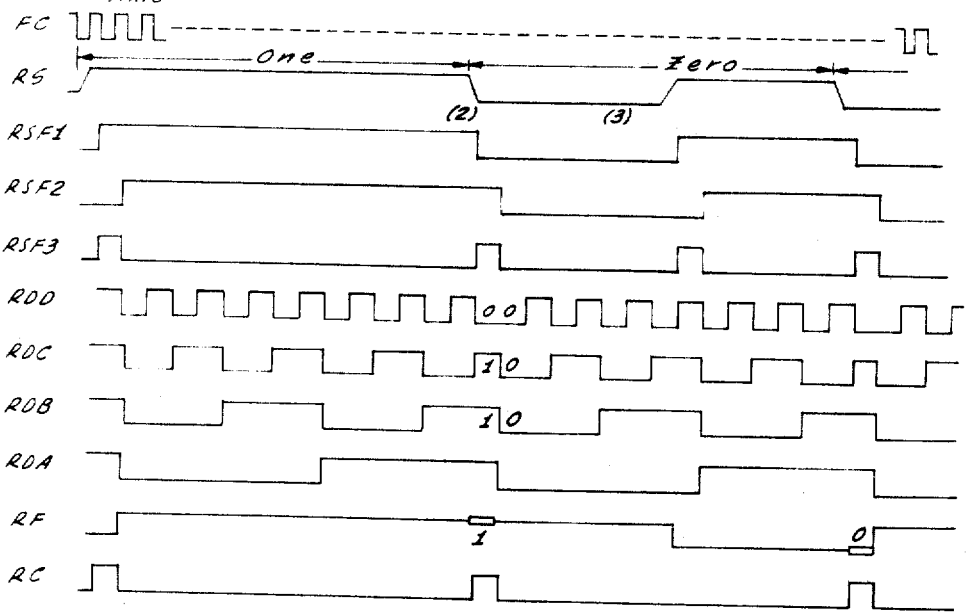
Fig. 5A — Read Decoder Waveforms with Transport Operating at 25% Below Rated Speed
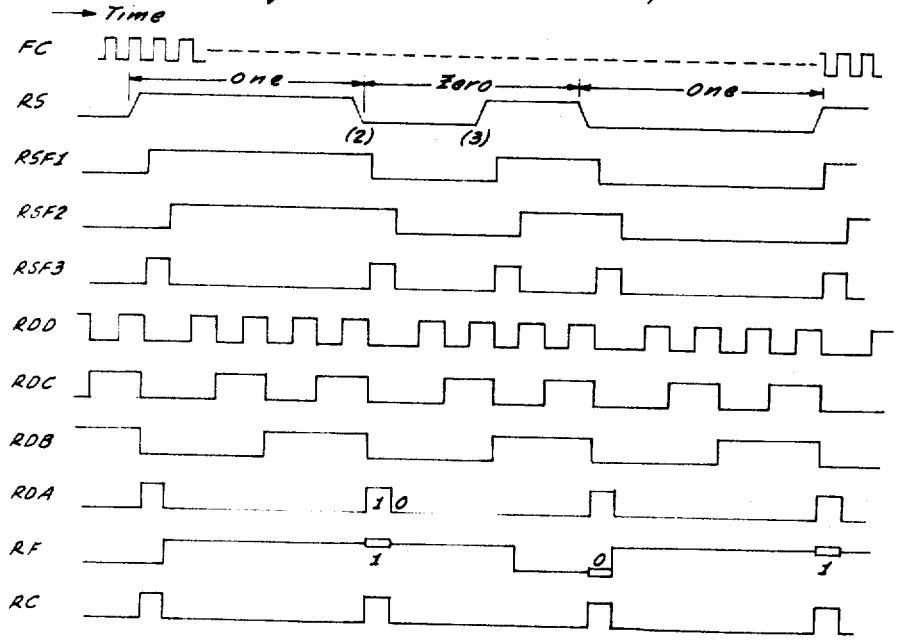
Fig. 5B — Read Decoder Waveforms with Transport Operating at 25% Above Rated Speed
INVENTORS:
Paul Niquette
Charles E. Wallace
Attorneys INVENTORS:
Paul Niquette
Charles E. Wallace Attorneys

Fig. 8

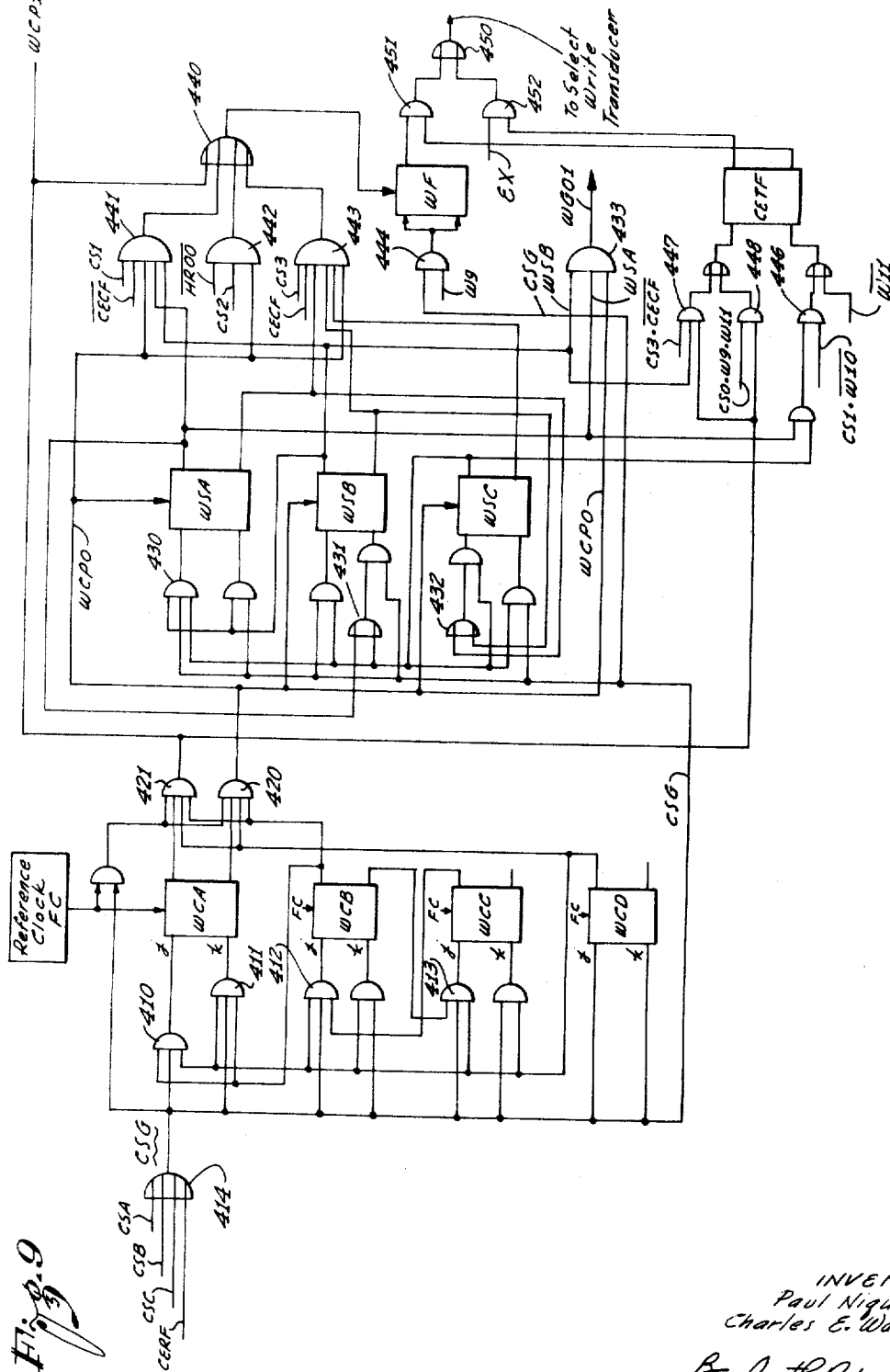

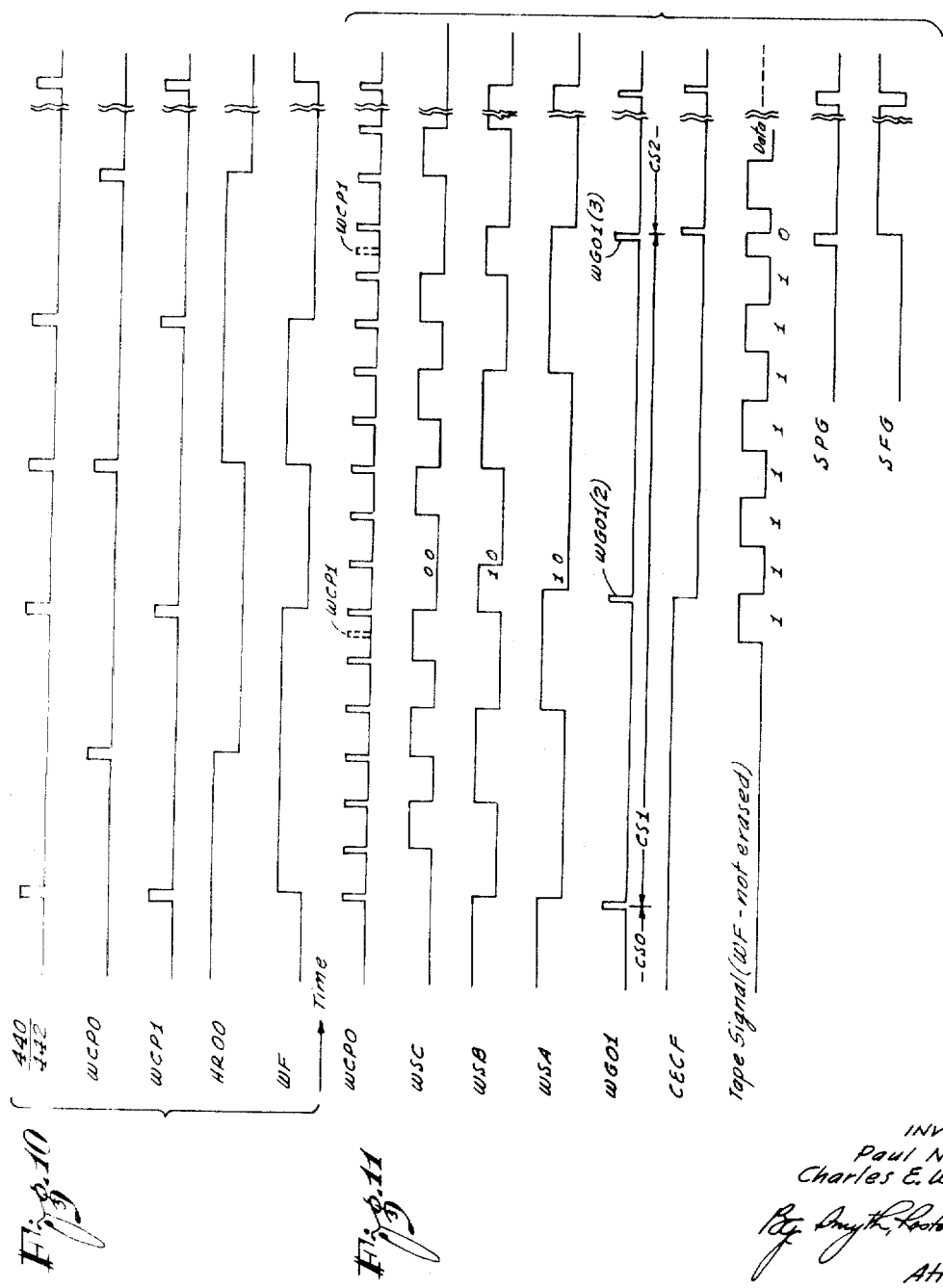

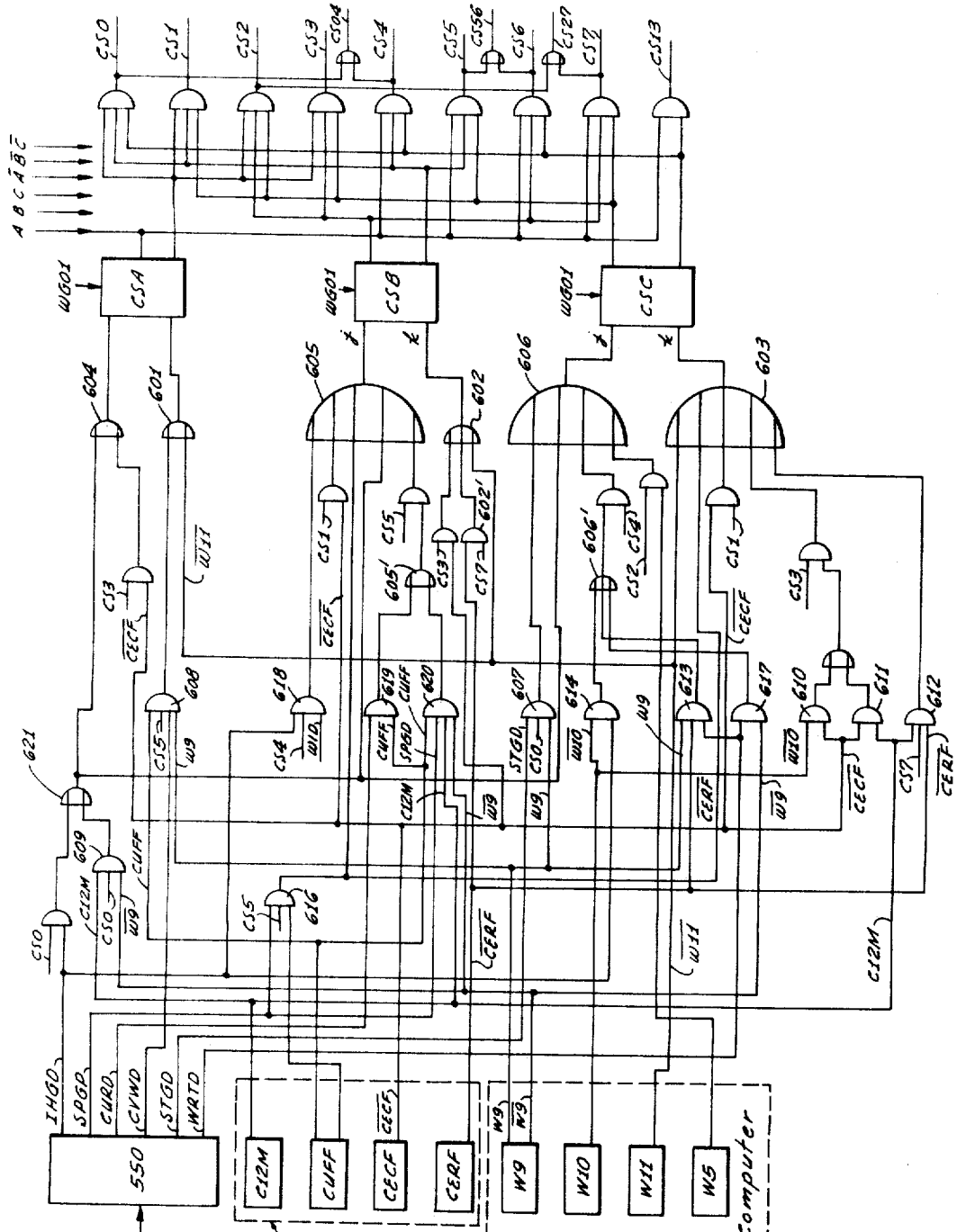

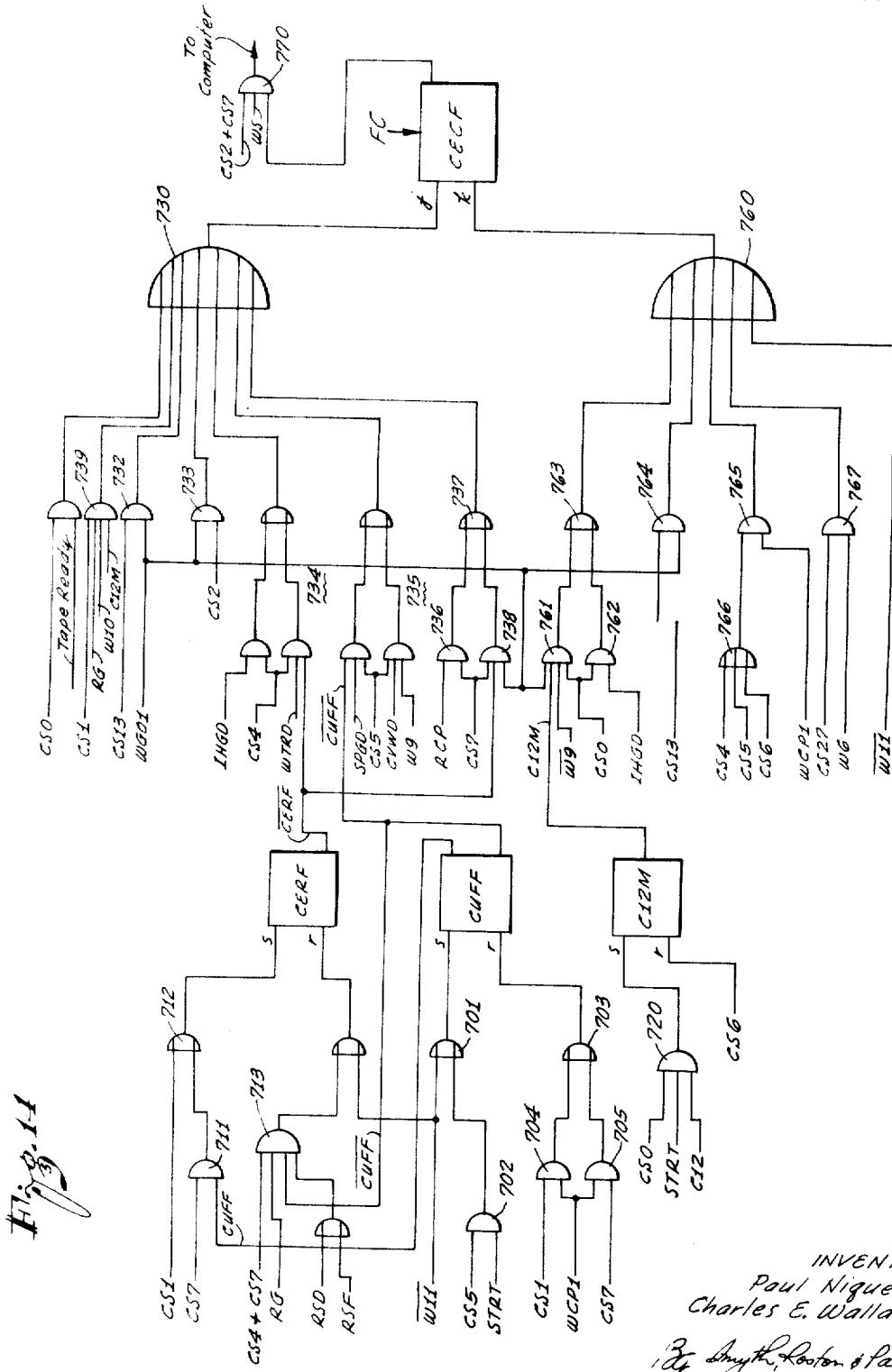

United States Patent Office 3,356,996
Patented Dec. 5, 1967

3,356,996
DATA TRANSFER SYSTEM
Paul Niquette, Palos Verdes Estates, and Charles E. Wallace, Playa Del Rey, Calif., assignors to Scientific Data Systems, Inc., Santa Monica, Calif., a corporation of Delaware
Filed Jan. 7, 1965, Ser. No. 423,998
55 Claims. (Cl. 340—172.5)

ABSTRACT OF THE DISCLOSURE

A transfer system for digital data is disclosed wherein the data are furnished in parallel-by-bit format and recorded on tape in serial-by-bit format. After data reproduction, the original format is re-established by reconversion. The data are encoded for recording by counting higher frequency pulses and distinguishing by value of bits by count numbers. Reproduced signals are referenced against pulse counts for bit value discrimination. The system operates autonomously through a state counter providing eight different operating states during each of which specific operations are performed. The data converter is operated as counter metering delay periods after a block of data has been transferred. A symmetrically arranged code pair respectively precedes and succeeds each data block.

---

This invention relates to a data transfer system for controlling the flow of data from a computer to one of a purality of magnetic tape tracks for recording thereon or for controlling the flow of data read from any of such tape tracks to the computer when needed therein. The system is designed to provide general computer compatibility, which means, for example, that is responds to specific operational and format requirements for such input-output operations of the computer requiring among other aspects a temporary storage of data and the retrieval of these and other data from the tape storage upon issuance of specific command signals.

Storage of data is usually organized in that one or more magnetic tape tracks are set aside as a library containing data which are not to be erased, but which provide necessary information to be drawn upon when the computer is about to perform a specific task, such as specific calculations and programs for which specific and known data are required. The content of such library varies, but the flow of data from the library to the computer is to be independent from the content thereof. Care must be taken that this library will not be erased during operation.

Another track is usually used for temporarily storing data during extensive calculations. Another track is used to store the program for a particular routine as selected by the programmer and written by him into the unit to be stored and maintained until the program is completed. Another track serves as temporary storage for results to be maintained therein, for example, until being fed to a printer.

All data are present in the form of binary bits, and all bits are organized in characters, usually there are seven bits per character, six bits defining the information code and one bit being used for parity. Computers, in general, provide or receive such characters in a parallel-by-bit, serial-by-character relationship or format. Furthermore, computers usually require that groups of characters can be transferred in one routine or program step. Such groups are often called records and thus, there is a requirement that a record having a large number of characters within the capacity of the tapes can be recorded or retrieved from the tape system in a continuous process.

Since the computer memorizes in which tape track a record or a type of record has been stored, the transfer system must be equipped to couple selected tracks to the computer with the selection being made by the computer. On the other hand, the similarity of format, bits-characters-records, in general, permits steering of the data flow to and from the computer regardless of the information content of such data and independently from the respectively addressed track. Furthermore, the data transfer operation should not be dependent upon any specific number of tracks, so that the storage capacity of the system can be enlarged at will.

Since the computer, in general, does not furnish data for storage at a fixed rate, the clocking of recording for storage can be done autonomously by the transfer system. The same holds true for the retrieval of data from a tape track, which data are provided to the computer at a rate determined by the reading speed of the transfer system.

As a further requirement for providing general computer compatibility, the transfer system must be capable to write a record comprised of any number of characters within the capacity of the tape, but otherwise regardless of the length of the record. The various records on a tape though different in size must be separated from each other by gaps of defined length so that tape is not wasted. On the other hand, the tape must be capable of stopping in a gap after having, for example, read a record permitting restarting, so that for subsequent reading the tape has attained sufficient speed when the next record enters the range of the read transducer. The same holds true for writing. The system furthermore, must be capable of reading or erasing in either forward or reverse tape movement direction.

The data transfer system in accordance with the present invention, in general, includes a data converter connected for input and output operations to the seven data input lines and to the seven data output lines of the computer to respectively provide thereto or receive therefrom characters sequentially and in parallel by bit format. The data converter operates as parallel-to-serial converter when receiving the data from the computer, and it operates as serial-to-parallel converter when feeding data to the computer. The serial input and output channels of the converter are operatively connectible to read and write or recording logic networks. The read logic network is an autonomous one, in that it reads during all operations so as to provide a straight reading sequence or a running read-after-write check. The data are recorded in serial by character and bit format.

Since only one track is addressed at a time for a writing or reading operation, a single write control switch controls the recording proper. Binary quantities are distinguished by frequency. For any recording, a first frequency is recorded defining bit rate as well as binary quantity "one." The binary quantity zero is determined by temporary frequency doubling. The recording signals are square waves, so that the record proper is a sequence of magnetic transitions. A transition in between two bit-rate defining regular transitions defines the 0, while the binary quantity 1 is determined by the absence of such additional transition. The transitions, i.e., the duration of the square waves are metered by a counter counting pulses from a local clock having a higher frequency than any of the recording frequencies. The write flip-flop producing the square waves is thus operated by a local bit clock defining bit rate and regular transition sequences, and additional data are gated to the write-flip-flop from the serial output side of the data format converter, for providing additional transitions only at the occurrence of binary quantity 0.

The read logic recovers the recorded binary signal by detecting the rate of transition occurrences. For this purpose the same rather high frequency reference clock is used. It furnishes pulses continuously and at a constant rate. The transitions detected by the reading transducer are converted into pulses, and the resulting pulse train is referenced against the clock pulses by a counter. The bit rate defining transition pulses will occur after counting a particular number of reference pulses within a predetermined tolerance range of counting numbers. The bit quantity defining pulses then occur (0) or do not occur (1) at about half this reference pulse count. Large ranges of speed variations and bit density variations on the tape can be accommodated with this system. The only limitation here is the discernibility between binary quantities one and zero.

Tape track selection for reading and writing is carried out by enabling one pair of reading and writing transducers, there being one transducer pair per track. This selection is to be made by the computer providing the track address in a code, and a decoder gate opens the signal path to the selected and addressed transducers. As additional computer signal distinguishes between reading and writing exclusively in the control circuit that is respectively common to all writing and all reading transducers, since the mode of operation is independent from the selected track.

A unique feature of the invention is to be seen in that multiple use is being made of the data converter itself. This converter is comprised of bistable switching stages selectively operated by various sets of gates and clocking control means to operate as parallel and as serial shift registers, during recording and reading operations, whereby, for example, during reading serial shifting is possible in either direction.

When not needed for such data conversion these bistable stages are interconnected to serve as a binary counter to establish predetermined waiting periods. Principal waiting periods are those during which the magnetic transducer heads pass over tape portions which do not contain data (gap), or which are not to be written on for providing such a gap during recording.

Other waiting periods result from the fact that a certain asymmetry is introduced by the arrangement of reading and writing heads along the tape at a fixed distance from each other. Forward and reverse tape movement cause, relatively speaking, the reading head to trail or to lead the writing head. Thus, the two heads have always different relative positions to the tape. Any recording must be readable in either direction, and stopping and restarting conditions for the tape must be independent from the direction of tape movement. A period of time equal to the delay for passage of a tape portion under one head until passing under the other head must be provided for to take this asymmetry in account.

Another waiting period is needed after a record has been written or read. During such waiting period, the computer must decide whether or not it wants to write or read another record as the case may be. This waiting period is also metered by this counter.

Another unique feature of the inventive transfer system is the autonomous formation of a beginning-of-record code called preamble, and of an end-of-record code called postamble, to be recorded respectively ahead and behind any data recordings on a tape track. Pre and postamble appear symmetrically relative to the record proper, so that either code can serve as preamble or as postamble depending on the direction of tape movement during reading. These codes separate a record on the tape from the remaining tape portion in a clearly discernible manner, and they aid in the recognition of records when read, so that, for example, operation of the data converter can be made dependent upon formation and occurrences of these codes. Pre and postamble detection further aids in the conversion of the data converter into a counter and vice versa. The period of data transmission from and to the computer, is restricted to the time interval between pre and postamble formation or detection. These codes further permit the distinction of a true gap from a portion of the tape which does not contain any records though it should. A true gap in between recordings is flanked by a postamble and a preamble. If absence of data is detected without prior detection of a postamble, then there is a data gap due to, for example, a bad tape portion.

Another feature of the inventive system is the provision of a state counter. A system of three flip-flops defines eight different operational states by selected on-off combinations; each such combination defines a state signal. The presence of each state signal controls the transfer system to carry out a particular sub-routine terminated with the termination of the state signal. Changes from one state to another are controlled by signals derived from the computer and by signals resulting from the completion of a particular sub-routine.

One state signal accompanies the starting, a second state signal is set aside for termination of any operation. Two state signals respectively accompany the reading and writing of data proper. Two states respectively are set aside for pre and postamble formation, and two states define waiting periods as outlined above. This state control system enables the transfer system to operate in accordance with the following rules: (1) Each state defines and limits operation of the transfer system to a particular sub-routine to the exclusion of all other sub-routines. (2) Specific instructions issued by the computer, serve to define state changes and to assemble sequences of states for the formation of specific communication programs to render the system computer oriented. (3) The states are set up to accommodate formation of a suitable recording format of bits-characters-records on any tape track permitting the control of data retrieval by the recording itself and thereby rendering the system record oriented.

No overlapping of states, sub-routines, and programs can occur as long as preventive measures are taken permitting shifting from one state to another only after completion of a sub-routine which in many instances is either controlled directly from the tape or in relation to desired conditions of the tape. Also, any one state cannot be attained out of any other state, but only particular state sequences are permitted, with the assembly of sequences for a program being determined by the computer. Thus, the transfer system will provide only for predetermined types of programs composed of fixed sequences of state identified sub-routines.

In two of such states, i.e., during two such sub-routines, respectively pertaining to different sequences or programs, data may flow between the computer and a tape track. Thus, there is one state for data flow from the computer to a selected tape track, while in the other state, data flows in the reverse direction. All other states serve to meter the pause in between two sequences of data flow to or from the computer to accommodate tape stopping and starting conditions, and to allow for the asymmetry of the transducers relative to any recordings on the tape, since data may be retrieved or erased from the tape in either direction of tape movement. Also, the computer can communicate with the transfer system in any operational state of the transfer system only in a manner that is compatible with the particular state then in existence.

The data proper transferred for recording or resulting from retrieval from any tape track, do not themselves determine or alter any operational state. Operational states are determined, i.e., changed by three types of signals. One type of signal is derived from the computer as an instruction signal and communicating to the transfer system the type of operation desired, such as recording, reading or erasing, direction of tape movement, the address, i.e., which tape track is to be selected for data communication, intended continuation or discontinuation of operation, and temporary termination of data issuance.

Another type of signal is developed by the transfer system itself as completion signals of sub-routines such as counting results reached. This includes the pre and post-amble formation states lasting for fixed periods actually being counted. Another type of signal included in this group and developed indirectly by the transfer system is a postamble detection terminating the reading state, or delaying the termination of writing for completion of a read-after-write check.

All state changes are strobed by a clocking signal produced at the rate of character recordings regardless of whether or not there actually is recording in progress; the same signal serves as counter input to meter the various delay periods mentioned above. This means that the entire system as far as programming is concerned is carried out in increments of tape character recordings.

Another principal feature of the invention is the employment of the time sharing principle. This is made possible also by the employment of the state counter. One of these aspects was already mentioned above, in that the multipurpose register stages can be interconnected to serve as serial-to-parallel or as parallel-to-serial data converter or as counter. The particular mode of operation present at any instant is exclusively determined by the state counter, in that the state identifying signals govern the mode of operation of this multipurpose register. Since during each state of operation a particular sub-routine is carried out independently from any other sub-routines carried out at other times, the mode of operation of the multipurpose register during one state is entirely independent from the mode of operation during any other state.

This principle of time sharing is extended to other control elements within the system. This principle of time sharing of individual elements on the basis of restricting any specific function of such elements to the duration of one or more operational states permits utilization of such elements during any other state for a different function. Since each operational state governs a particular sub-routine, it is possible to have all or at least most of the circuit elements within the system participating in all sub-routines, even though the cooperation between the seevral circuit elements varies widely from state to state or sub-routine to sub-routine. The function of each such time sharing circuit element at any instant is determined by the state signal alone then in existence, and no conflict occurs if for different state signals such circuit element performs an entirely different function which may even be incompatible with the function within a previous state if such states were coexistent which is never the case.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

Figure 1:
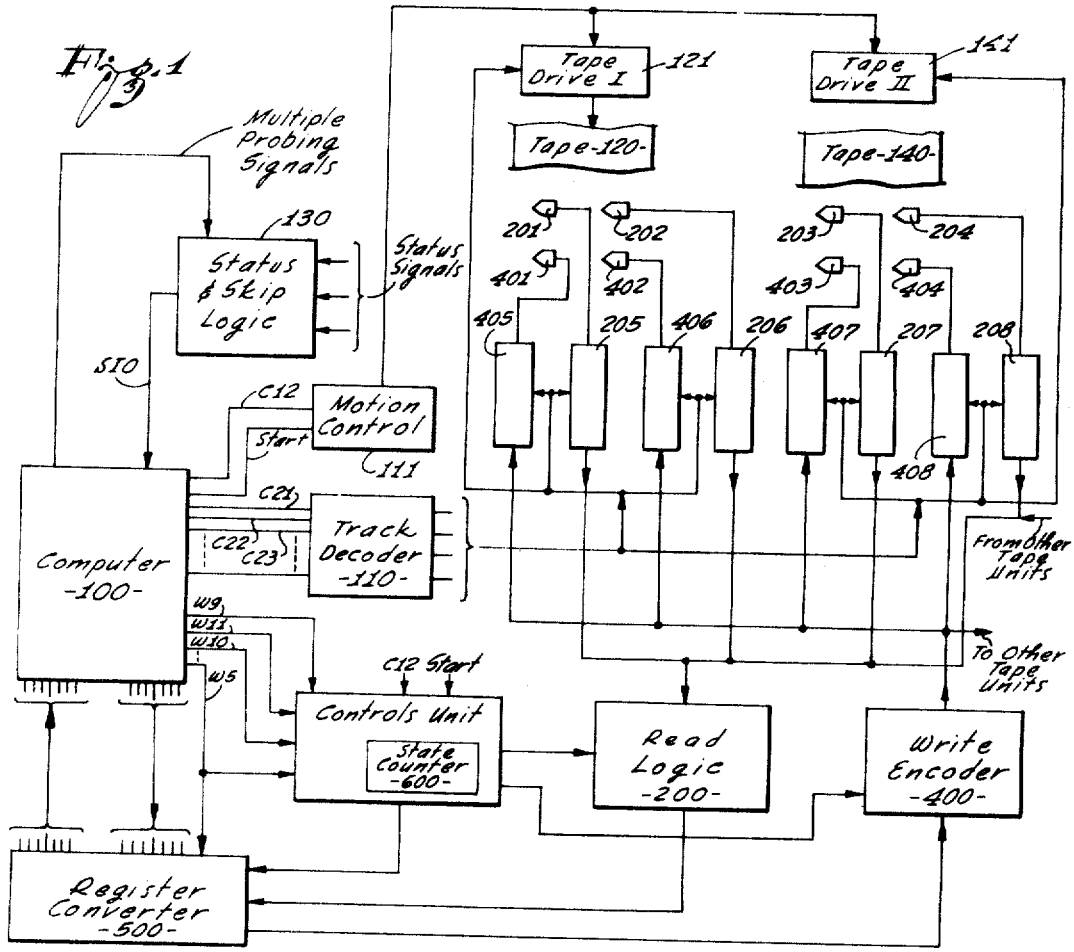
FIGURE 1 illustrates schematically a block diagram of the entire data transfer system in accordance with the preferred embodiment of the present invention.
Figure 2A:
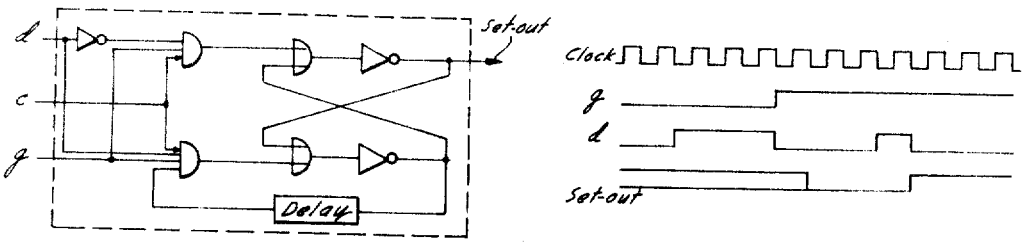
Figure 6:
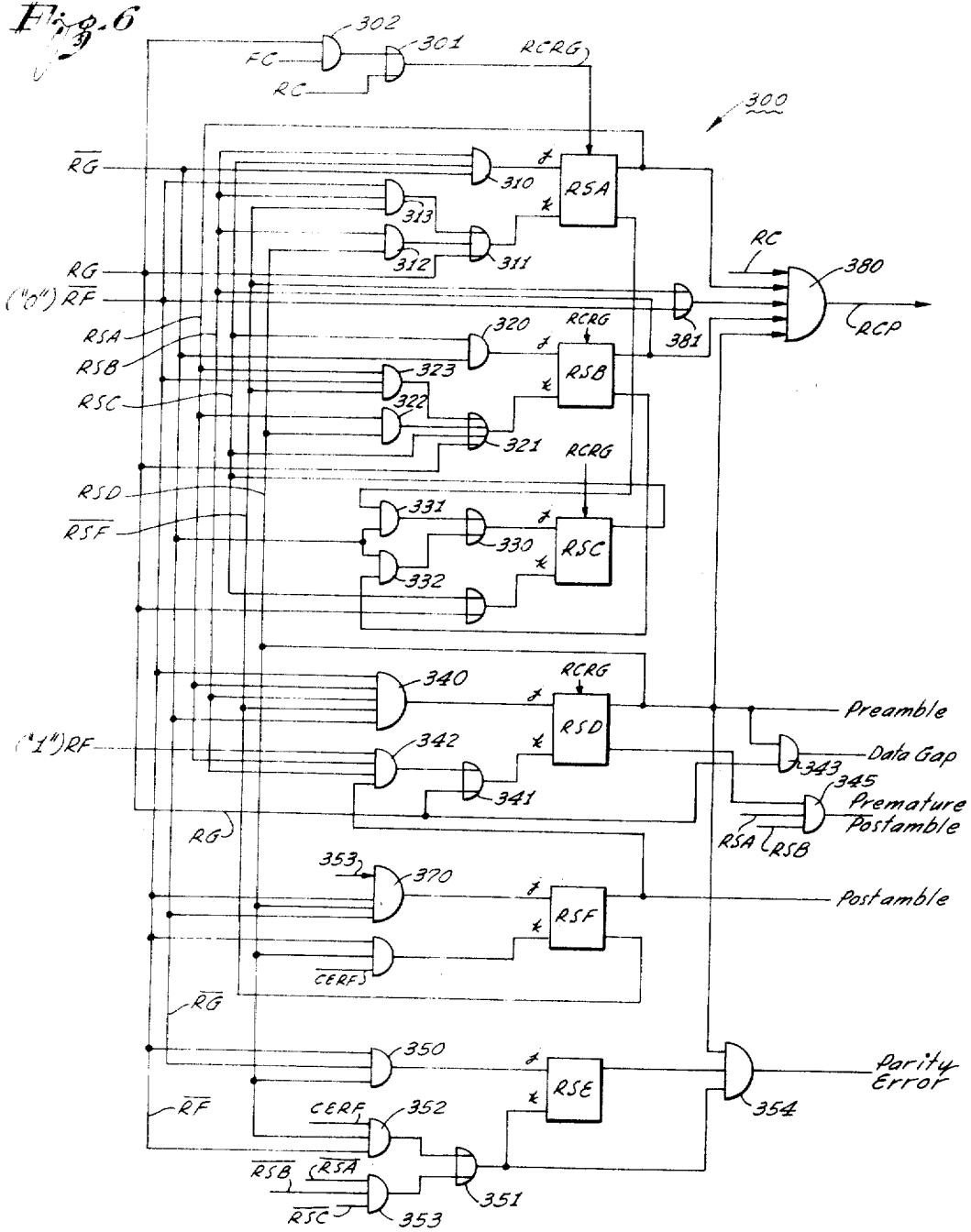
Figure 7:
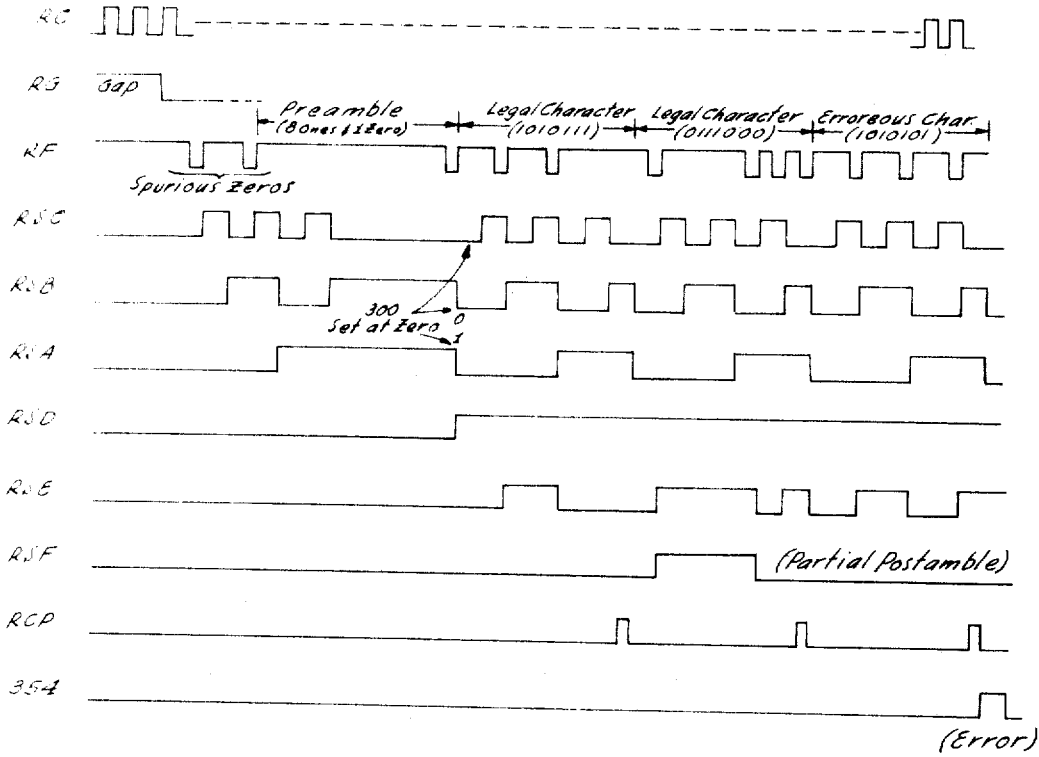
Figure 12:
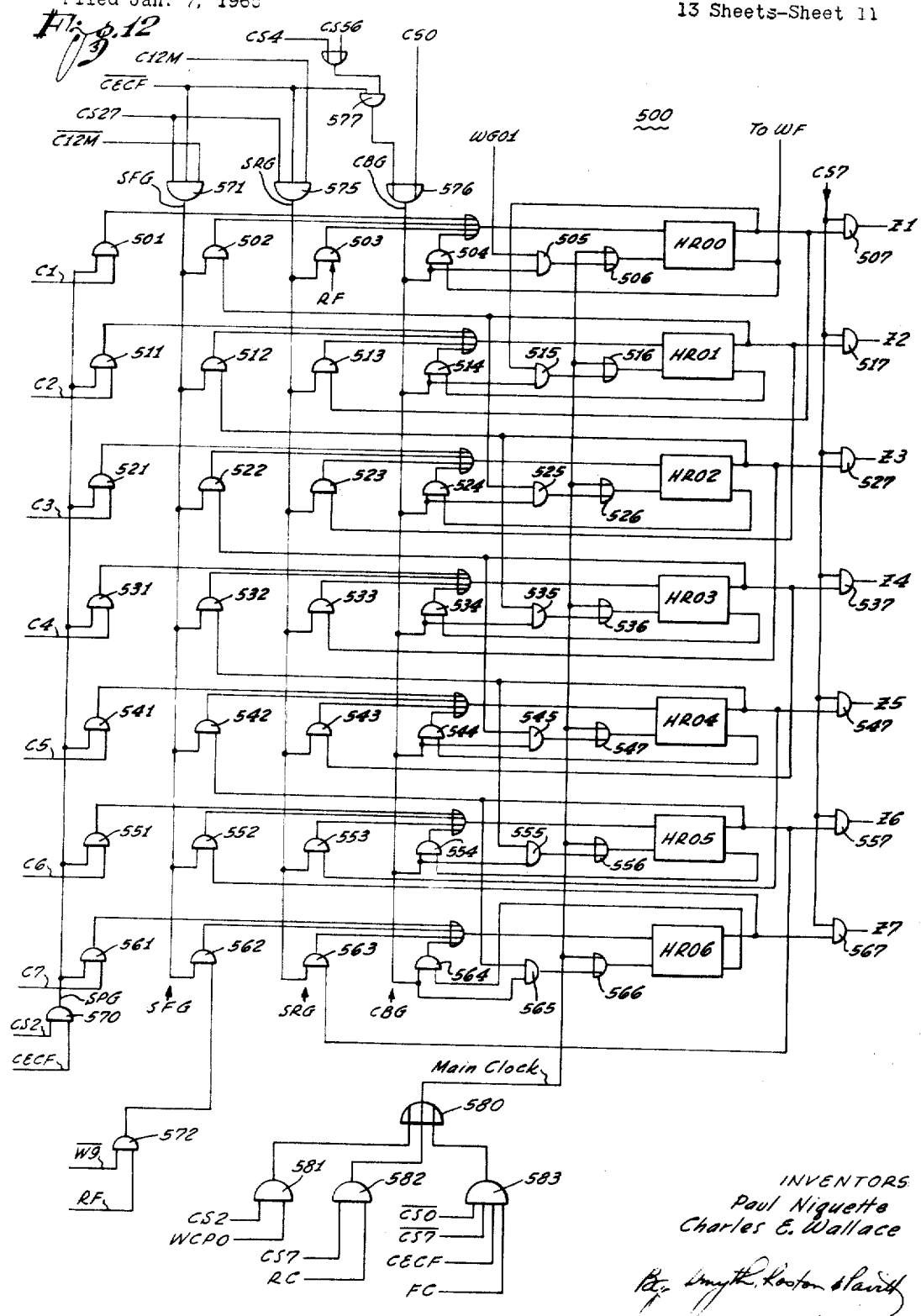

FIGURES 2A, B and C schematically show circuit diagrams of the type of flip-flops employed within the inventive system;

FIGURE 3 illustrates somewhat schematically a circuit diagram of the read decoder network within the read logic for data retrieval by the inventive transfer system;

FIGURE 4 illustrates the waveform of signals furnished by the read decoder network shown in FIGURE 3;

FIGURE 4A illustrates the waveform for operation of the network shown in FIGURE 3 in case a data gap occurs;

FIGURES 5A and 5B illustrate waveforms similar to FIGURE 4 but at tape speeds respectively 25 percent higher or lower than normal tape speed;

FIGURE 6 illustrates schematically the circuit network for the read synchronizer including preamble, postamble, parity error and character clock pulse detecting systems;

Figure 8:
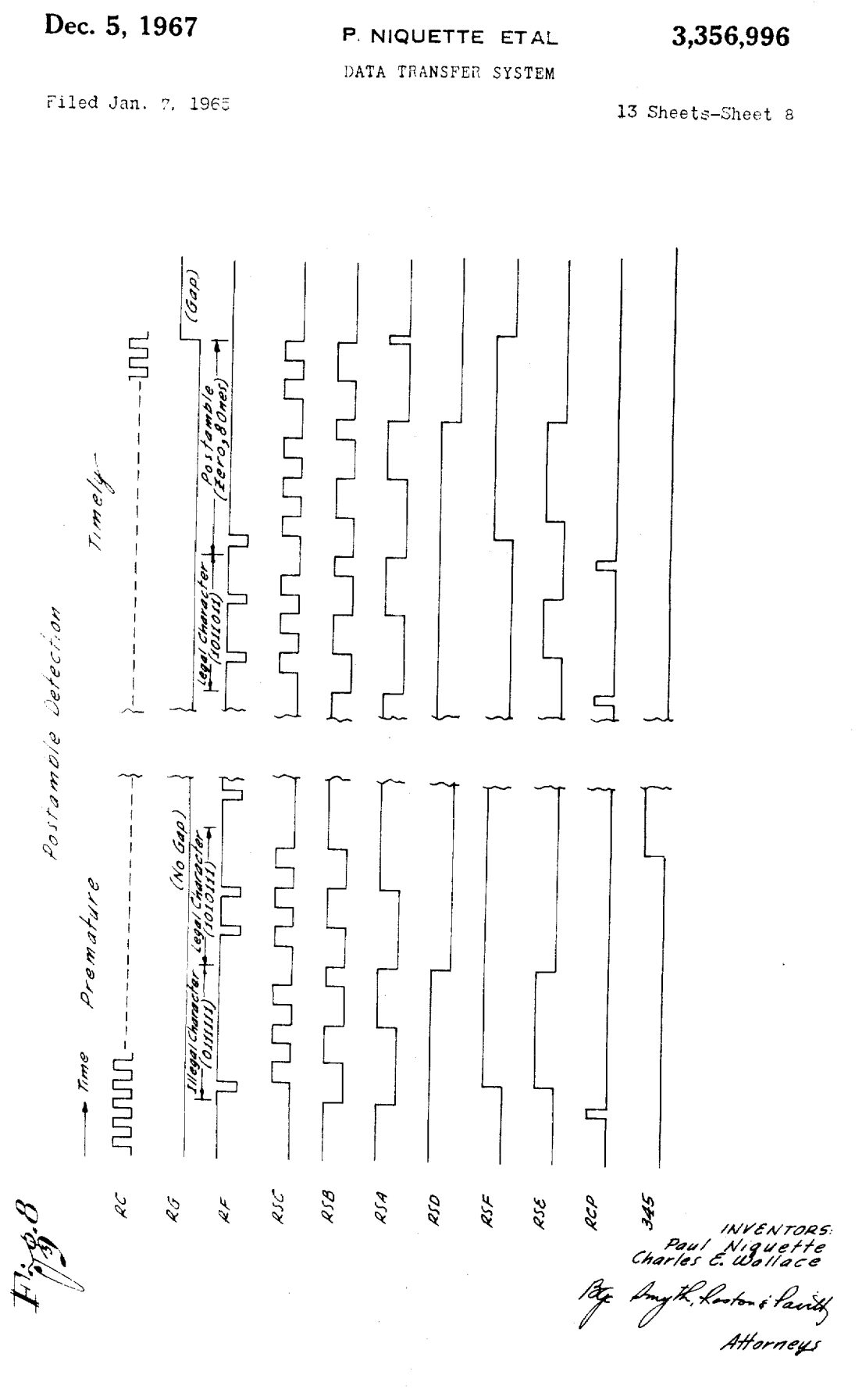

FIGURES 7 and 8 illustrate waveforms of signals developed by the system in FIGURE 6 during various phases of operation;

FIGURE 9 illustrates somewhat schematically a circuit diagram for the recording or write logic of the preferred embodiment of the inventive data transfer system;

FIGURES 10 and 11 illustrate waveform of signals during various phases of operation of the system shown in FIGURE 9;

FIGURE 12 illustrates the circuit diagram of the multipurpose register of the system shown in FIGURE 1;

FIGURE 13 illustrates the state counter logic including input and output circuit networks for programming the inventive data transfer system; and FIGURE 14 illustrates several control switches provided for operatively coupling the state counter shown in FIGURE 13 to read and write logic networks (FIGURES 3, 6 and 9) and to the multipurpose register shown in FIGURE 12.

*General description*

Proceeding now to the detailed description of the drawings, in FIGURE 1 thereof there is shown the general layout of the inventive data transfer system connected as input and output device to a computer 100. The data proper flow to and from the computer, from and to a general purpose register 500. There are provided, accordingly, seven lines for feeding characters serially and in parallel by bit format to the register 500; there are seven lines for the computer to receive characters in like format from the register 500.

The data may flow from the register in serial by character and bit format to a write encoder logic network 400, or data may flow, also in serial by character and bit format from a read decoder logic 200 to the register 500.

The magnetic storage device, basically, comprises two magnetic tapes 120 and 140, each having two tracks for independent recording thereon. Thus, the system shown has four tracks or addresses for storage of data. There are provided, accordingly, four pairs of stationarily positioned recording and reading transducers positioned so that when a tape moves in forward direction the relative movement of the transducers provide for a trailing reading transducer, and for a reverse tape movement the write head appears to be the trailing one.

The four read transducers 201, 202, 203 and 204 respectively feed gated amplifiers 205, 206, 207 and 208 with the gating signal provided by an address or track decoder 110. Whatever read-output signals are permitted to pass through the selected gate are then fed to the read decoder 200 having a common input accordingly. The address or track decoder 110 is connected to computer command or instruction output lines C21, C22 and C23. These lines provide an address instruction which in decoder 110 is used to furnish one out of four possible output signals.

It should be mentioned that these three instruction output lines are capable of providing eight different instruction addresses. The inventive system is not restricted to any number of addresses. However, four tracks or addresses are most commonly needed. An enlargement of the system to accommodate more tracks presents no difficulties whatever. The control of data flow between computer and read or write logic is entirely independent from the number of tracks and tapes used since communication is had between computer and tape units only with one track at a time.

The write or recording transducers 401, 402, 403 and 404 respectively receive signals from gated amplifiers 405, 406, 407 and 408, which correspondingly receive gating signals, one at a time, from track decoder 110. Upon selection of any one track, both read and write transducers are thus enabled concurrently, but operation proper of each of them is controlled by read and write logic, and at predetermined time intervals only.

The system further includes a motion control decoder 111 which responds to suitable computer signals commonly denoted as STRT and C12 or $\overline{C12}$, respectively indicating that a tape is to be started (STRT) in reverse (C12) or in forward direction ($\overline{C12}$). Which tape is to be started, of course, depends on the selected track, and the two tape drives 121 and 141 are accordingly responsive to outputs from the track decoder 110.

It can be seen that the number of tapes used is immaterial since only proper association of motion control signals, and of address or track instructions is required to identify which track or storage address is to be used; the drive control proper follows logically from this selection.

Next, the system is to be equipped with a status or skip logic network 130 which does not need detailed elaboration. This logic network responds to suitably derived status signals denoting, for example, whether any tape is at the beginning or end or in between, whether any track contains a library, so that it should not be erased, whether a tape drive is ready for movement, etc. The computer will, at times, individually issue probing signals fed to coincidence gates in the unit 130 and being decoded therein. Dependent upon the existence or non-existence of status signals in the unit the computer will then receive information on the status of various parts of the transfer system. The output signal of this status seeking network 130 is commonly denoted Si0. A particular probing signal will result in signal Si0 or $\overline{Si0}$, depending on the status probed. For example, if a probing signal from the computer as encoder inquires "Is tape drive ready," an Si0 signal will be produced if the tape is ready, $\overline{Si0}$ will appear when the tape is not ready. Further operation of the computer and communication with the data transfer system is dependent on the outcome of such tests. This is an internal computer operation and is of no direct concern to this system.

The inventive system further includes a general controls unit basically comprised of a state counter 600 shown in detail in FIGURE 13, a number of control switches and a count detector unit 550 (shown in FIGURE 14). The controls unit responds to several command or instruction signals derived from the computer. The signal W9 is issued by the computer when the computer intends to issue data, the complementary signal $\overline{W9}$ exists when the computer intends to receive data. W10 commands erasing, and, of course, $\overline{W10}$ is true for as long as no erasing is intended. W11 connects the transfer system to the computer, $\overline{W11}$ causes decoupling thereof. W5 is produced as a continuous signal to accompany temporary termination of issue of data by the computer. The signals C12 and STRT were introduced above respectively serving as direction and motion control signals. Aside from the data proper and test result signal Si0, the computer will receive from the transfer system signals which will be mentioned below when the several units are being described in detail.

The controls unit, in general, serves to convert the command instructions from the computer into specific operating and control signals for controlling the read decoder 200, the write encoder 400 and the register 500 to carry out routines and programs set up to organize the data flow between tapes and computer. One significant aspect of the invention is the employment of the state counter 600 defining and establishing specific operational states for organizing the programs for such data flow into state sequences. At any given time the state counter permits only specific types of subroutines to be conducted by the controls unit, the units 200, 400 and 500, and the subroutines each are accompanied by a sub-routine identifying state signal.

Figure 1A:
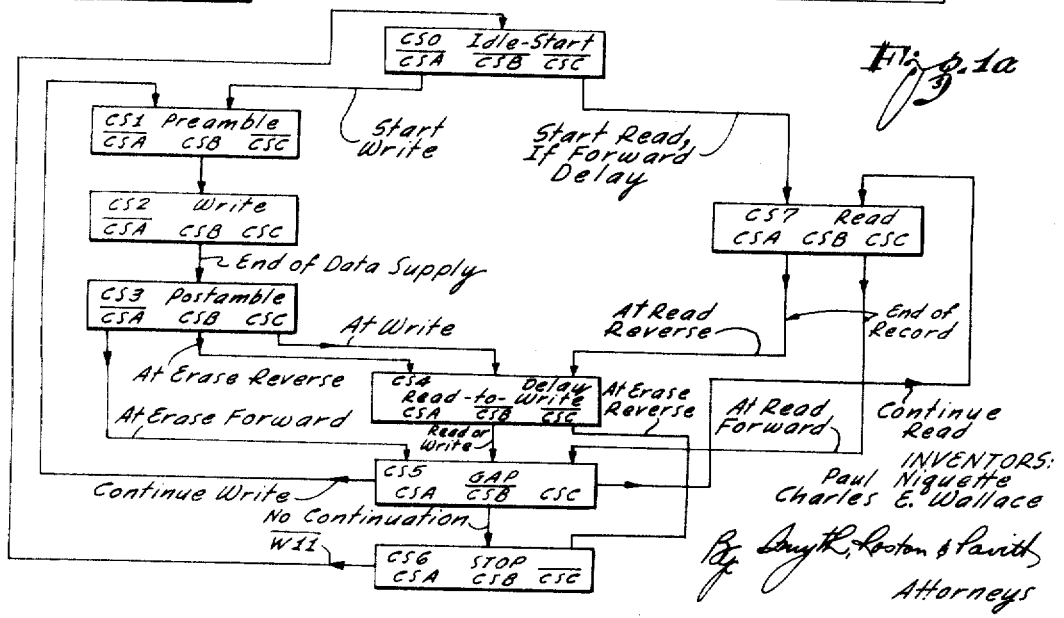
FIGURE 1A illustrates a state diagram defining each of the eight states of operation of the system shown in FIGURE 1.

The purpose of state counter 600 will be understood best from the description of FIGURE 1A illustrating schematically the several operational states and programs as defined by particular sequences of states. In this specification, frequent reference to FIGURE 1A facilitates understanding of the inventive data transfer system.

The transfer system in accordance with the present invention is designed to be maintained always in one of eight operational states. In the several states the state counter system 600 will develop and maintain a status signal designated CS0, CS1, CS2, · · ·, CS7, and the changeover from one state to another is accompanied by the removal of the one state signal and the production of the next one. The sequence of operational states is not a fixed one but may vary as a result of a continuous communication between the inventive control and data transfer system and the computer. Particular sequences of states define programs of the transfer system. These states are illustrated schematically in FIGURE 1A and identified therein as follows: State CS0 is present when no communication is present between the transfer system and the computer, but the transfer system awaits command signals (idle period). The CS0 state is not immediately terminated upon reception of a command signal from the computer but at first the system prepares itself for the type of operation demanded by the computer. The type of operation may be erasing of a tape track, reading a tape track in forward or reverse directions or writing on a tape track. Also, during this state the computer may inquire through the status and skip logic, to what extent the system is ready for operation. Only when the transfer system is ready to start with either one of these operations state CS0 can be terminated.

For writing, a changeover from state CS0 to CS1 will occur. In the CS1 state the preamble is formed. This is an identifying code to precede a record on the tape and serving to identify the beginning of the record (or the end thereof in case the record to be written is read later on in reverse direction). The preamble code signal is formed in the transfer unit itself and not derived from the computer.

In the CS2 state, always succeeding the CS1 state, the system controls the writing of a record on a tape track, serially by bit and character. The computer furnishes the data for this record in a serially-by-character, parallel-by-bit format.

In the CS3 state, always succeeding the CS2 state, the postamble is formed to identify the end of the record, but in a manner permitting the use of such postamble as a preamble in case of reverse reading. Thus, post and preamble are codes which are written symmetrically to be used interchangeably during forward and reverse reading.

The CS4 state is provided to take into account that reading and writing heads face different tape portions. During forward reading and writing, the read head trails the write head relative to the tape while during reverse reading the situation is reversed. Since after reading or writing or erasing of a record operation may or may not continue, the direction of tape movement requires the interpositioning of direction dependent delay periods, formed by the transfer system during the CS4 state.

In the CS5 state the system runs through a writing period during which the computer must decide whether reading or writing or erasing operations are to be continued to cover another record. The tape still runs and the transducer heads pass over a record gap. In case of continuing operation, different writing periods are developed to accommodate gap information (writing) or the existing gap lengths (reading). In the CS6 state the system deactivated, stops the tape for shutdown of operation. During the CS7 state the system operates for tape reading, either forward or backward.

Several sequences of states are shown in FIGURE 1A. In a typical reading operation in forward direction and reading, for example, two records, the inventive transfer system runs through states in the following sequence on a program: CS0–CS7–CS5–CS7–CS5–CS6–CS0. Reading backwards of three records requires the following sequence of state defining another program: CS0–CS7–CS4–CS5–CS7–CS4–CS5–CS7–CS4–CS5–CS6–CS0. Writing of one record requires the sequence: CS0–CS1–CS2–CS3–CS4–CS5–CS6–CS0. For forward erasing of one record, the sequence is: CS0–CS1–CS2–CS3–CS5–CS6–CS0. Reverse erasing of one record is carried out at sequence: CS0–CS1–CS2–CS3–CS4–CS6.

It should be mentioned, that erasing is carried out in a manner similar to writing, which is done to some extent for reasons of simplification, but primarily for reasons of computer compatibility. In general, a computer will issue random data when erasing is required. Usually, the amount of such random data will be equal to the number of characters of the record to be erased. Thus, as far as logic control is concerned, the system can then operate as it does during writing. However, the data will be suppressed and not be written, and an erase control circuit will be operating throughout this period. Since preand postambles are added always by the inventive system, erasing should be extended to cover also pre- and postambles, and the insertion of the formation periods into the erase program is then proper. The reason for skipping the CS4 state in case of reverse erasing is, of course, again related to the relative position aspect of the read and write heads to the records on the tape.

Operational states and the accompanying state signals are used in the following description interchangeably, since each operational state is defined by the presence of the state signal. The changeover from one operational state to another one is controlled by providing this other state signal in dependence upon completion of certain operational steps or sub-routines within the one state, whereby computer command signals may cause modifications in the selection of the respective succeeding state.

Figure 2B:
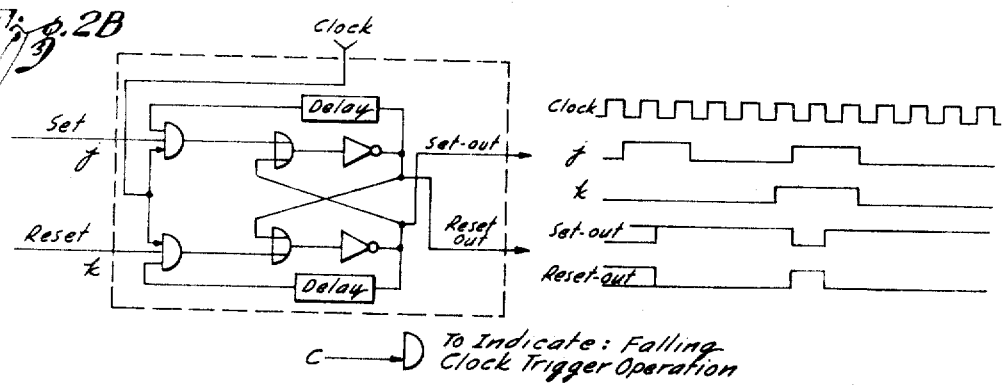
Figure 2C:
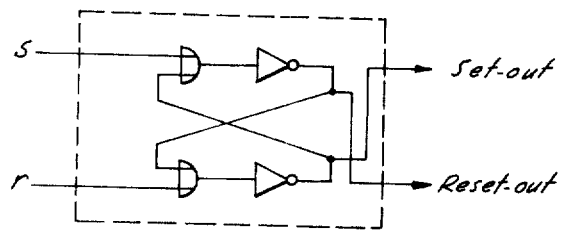

FIGURES 2A, 2B and 2C illustrate three different types of flip-flops used in the embodiment hereinafter described. The flip-flops are comprised conventionally of "or" gates, inverters and additional "and" gates for input control. The flip-flop of FIGURE 2A is also known as gated-delay flip-flop. FIGURE 2B illustrates a reset-set flip-flop with internal steering, and FIGURE 2C is a gated flip-flop without delay. All these flip-flops are triggered only by a clocking signal. Additionally, D.C. flip-flops are used as shown in FIGURE 2D.

The circuit networks illustrated and described in detail below are designed strictly in terms of desired logical results. One skilled in the art will be readily aware of design modifications that do not alter these results. Such modifications may be desirable since usually electronic "and" and "or" gates will not have more than three input terminals. If more than three coincidence inputs or alternative inputs are needed for obtaining a particular command signal, staggering of gates with the interpositioning of amplifiers is desired. Since inverter stages usually can be provided with a power gain >1 to serve as amplifiers, use can be made of the known Boolean relations such as $\overline{A+B}=\overline{A}\cdot\overline{B}$ and $\overline{AB}=\overline{A}+\overline{B}$ so that, for example, a four signal coincidence ABCD can be split up into $\overline{\overline{AB}+\overline{CD}}$ or $\overline{(\overline{A}+\overline{B})+(\overline{C}+\overline{D})}$ or $\overline{(\overline{A}+\overline{B}+\overline{C})\cdot\overline{D}}$ or $\overline{(\overline{A}+\overline{B})\cdot(\overline{C}+\overline{D})}$. This requires little change since within the system for many signals the respective complements thereof are already available as is the case, for example, for flip-flop output signals, and any power gain required for multiple use of any signal in various sections of the system, may be accompanied by an inversion.

Read logic

The read logic 200 is comprised of a read decoder 220 illustrated in FIGURE 3 and providing signals distinguishing between binary quantities as encoded and recorded on the tape. A read synchronizer shown in FIGURE 6 assembles the binary bits to characters and probes the content of the characters as to specific features.

Before proceeding to the description of FIGURE 3 which illustrates the read decoder 220, reference is first being made to FIGURE 4 and particularly the top two diagrams thereof. The signal RS plotted in the second diagram illustrates a typical signal as furnished by the tape reading unit when scanning a track. The signal is comprised of periodically appearing transitions, i.e., alternations in the state of magnetization of the single track. The transitions occur at a rate determined by a time period T thereby defining the bit rate. The bits are defined as follows. If in between two transitions separated by the period of time T no additional transition occurs, such two succeeding transitions define a "1"; if in between two transitions spaced apart by the time T there occurs another transition, a "0" is being defined therewith.

Looking now specifically at FIGURE 4 it can be seen that the transitions 1 and 2 define a "1." The transitions 2 and 4 define a "0" because an additional transition occurs at 3. As will be described below, the recording process is controlled in that this zero defining transition occurs right in the middle in between the two transitions 2 and 4 spaced apart by the time period T. The transitions 4 and 5 define a "1" because there is no transition occurring in between. Looking at the bit "1" as defined by the transitions 1 and 2 and comparing therewith the bit "1" as defined between the transitions 4 and 5, one can see that no specific direction and polarity is used to define a bit, but 1's and 0's are exclusively distinguished by the frequency of occurrence of magnetic transitions. As far as instrumentation is concerned the decoding of such signals requires the determination whether or not in between two transitions spaced apart by the time period T there occurs another transition. Absence or presence of such intermediate transition is then used to define a "0" or a "1."

It is a specific feature of the present invention that the decoding of the signals RS is carried out by quantizing the information content of the signals RS. In other words, the sequentially occurring bit defining time intervals T are being subdivided into small regular time intervals which are being counted. The occurrence of any transition is measured in terms of number of subdividing intervals counted from the respective previous transitions.

In order to attain this objective, there is provided a reference clock furnishing clock pulses FC. This is the master clock for the entire system. The frequency of this clock pulse source is selected so that in case of correct transition recordings on the magnetic tape, and at correct tape speed, precisely twelve pulses FC will appear in between two bit defining transitions following each other at a time T, while a "0" defining transition will occur precisely six FC clock pulses before and after each such bit defining transitions.

The equipment to be described next has as its primary purpose the detection of these transitions while permitting tape speed errors of ±25%. The same equipment further is destined to furnish distinguishing signals accompanying the passage of tape portions on which is recorded information to be distinguished from gaps in between such tape records. The equipment is further destined to provide error signals in case any transition occurs too early after another transition so that such premature occurrence cannot be attributed to a temporarily occurring excessive tape speed but must be an error.

Turning now specifically to FIGURE 3 there is first shown the set of the four magnetic transducer heads 201 to 204 individually coupable to specific magnetic tape tracks as was explained above with reference to FIGURE 1. For example, respective two heads may be provided for reading two parallel and independent tracks provided on one magnetic tape. The gated amplifiers 205 through 208 feed a common "or" gate 209 to provide read signals RS. The address selector 110 governs the gated amplifiers 205 to 208 to determine which magnetic tape track is to be addressed. The selector 110 includes a suitable decoder to be connected to computer output lines commonly denoted with C21, C22 and C23 which provide code signals identifying each track. The decoder 110 is not of special interest here, and it is apparent that for each code provided by computer output C21, C22, C23 a periodic magnetic reading head is being enabled to provide the RS signals.

The RS signals are first fed to a read signal standardizer comprised of two flip-flops RSF1 and RSF2. The two flip-flops are of the $d$-$g$ type (FIG. 2A) and they receive synchronizing or clocking signals FC from the reference clock. The read signal flip-flop RSF1 has its signal input connected to receive the read signal RS. The enable terminal of this flip-flop RSF1 is connected to receive a gating signal CERF during reading. This gating or enabling signal is developed by a read enable flip-flop of like designation (see FIGURE 14). It is a significant aspect, that the only connection of the read decoder shown in FIGURE 3 to the controls unit, is this line for receiving the CERF enabling signal. This emphasizes that the read decoder is autonomous for as long as this enable signal is in existence. Upon occurrence of a signal RS at the signal input side, defined as a transition from minus to plus (transitions 1, 3 and 5 in FIGURE 4) the flip-flop RSF1 will be set with the next trailing edge of a clock pulse FC (see line 3 in FIGURE 4). The resetting of the flip-flop RSF1 occurs of course in a similar manner. The output signal of flip-flop RSF1 in response to a setting thereof is the input pulse at the signal input side of the flip-flop RSF2. The gating side of flip-flop RSF2 is also connected to respond to enabling signal CERF. As a result thereof the flip-flop RSF2 is being set precisely one clock pulse after the setting of flip-flop RSF1. The resetting of flip-flop RSF2 occurs also precisely one clock pulse after the resetting of flip-flop RSF1. Lines 3 and 4 in FIGURE 4 illustrate this relationship between the two flip-flops RSF1 and RSF2.

The two output signals of flip-flops RSF1 and RSF2 occurring in response to the setting thereof are being fed to an "and" gate 211 while the complementary output sides of the two flip-flops feed an "and" gate 212. The outputs of "and" gates 210 and 211 are combined in an "or" gate 213 the output of which is fed to an inverter 214 to furnish an output pulse called RSF3.

The output signal RSF3 is thus a positive signal whenever the flip-flops RSF1 and RSF2 are in different states. The signal level RSF3 is zero whenever the flip-flops RSF1 and RSF2 are either set or are both reset. The fifth line in FIGURE 3 thus illustrates a train of pulses RSF3 respectively associated with and identifying occurrence of the five transitions of the RS signal. A binary bit "1" is thus defined as two RSF3 pulses occurring within a time interval T, while a "0" is defined by an additional RSF3 pulse illustrated with a star in FIGURE 4 and occurring in between two RSF3 pulses spaced apart by time T.

The RSF3 pulses are thus standardized pulses indicative of the occurrence of transitions detected in the tape track which is being read.

The standardized read pulses RSF3 are now being used in a read decoder to be described in the following. The principal elements of this read decoder 220 are four flip-flops RDA, RDB, RDC and RDD of the j-K type, shown in FIGURE 2B. These four flip-flops are interconnected in such a manner that they form a binary pulse counter responding and counting FC clock pulses, and this binary counter is, furthermore, wired in such a manner that it will be reset to counting state zero after each RSF3 pulse which is not a zero defining middle pulse. This objective is attained as follows.

The set side of a flip-flop RDA is governed by a three input "and" gate 221 having its three inputs respectively connected to the set side outputs of flip-flops RDB, RDC and RDD. Flip-flop RDA is reset by the RSF3 pulses. It is thus apparent that flip-flop RDA can be reset at the earliest after altogether at least eight pulses FC have been received. Any earlier occurrence of a reset pulse will be suppressed. Thus, flip-flop RDA will normally not be reset by a zero defining central RSF3 pulse.

The flip-flop RDB is set by an "and" gate 222 responding when the set side outputs of flip-flops RDC and RDD are true. Additionally, for coincidence an output pulse is required to be drawn from an inverter 223 inverting the output of an "and" gate 224. The "and" gate 224 responds to coincidence of an RSF3 signal and of the set side output signal of flip-flop RDA. The flip-flop RDB can be reset by either one of two signals applied to the reset input side of flip-flop RDB through an "or" gate 225. One input side of "or" gate 225 connects to the output side of the "and" gate 224, and the other input side of "or" gate 225 connects to the output side of an "and" gate 226. "And" gate 226 has three inputs, two of which are respectively connected to the output set side of flip-flops RDC and RDD. The third input of "and" gate 226 connects to the reset output side of flip-flop RDA and thus responds to the signal $\overline{RDA}$.

The flip-flop RDC has its set side input connected to an "and" gate 227 having its two input terminals respectively connected to the output side of inverter 223 and to the set side output of flip-flop RDD. The reset input side of flip-flop RDC is connected to an "or" gate 228 so that the flip-flop RDC can be reset by either one of two signals, one of which is the output side of the "and" gate 224 while the other input terminal of "or" gate 228 connects to the output side of an "and" gate 229 responding to coincidence of a set side output signal of flip-flop RDD, and of a combined signal representing $\overline{RDA}+\overline{RDB}$, suitably cleared through an "or" gate from the RDA and RDB flip-flops.

The flip-flop RDD is set directly by the output signal of inverter 223. Flip-flop RDD is reset through an "or" gate 232 having two input terminals, one is responsive directly to the RSF3 signal, the other input terminal of "or" gate 232 responds to the output side of an inverter 230 having its input side connected to "and" gate 231 which has three inputs to respond to coincidence of signals RDA, RDB and RDC.

The signals RDA, RDB, RDC and RDD are depicted in FIGURE 4 as they result from the specific train of RSF3 pulses illustrated in the fifth line of FIGURE 4. These four trains of counter pulses together with the read signal pulses RSF3 are now being used in a decoding network to distinguish between "1" and "0" and to be described in the following.

There is first provided an "and" gate 240 having two inputs respectively connected to be responsive to the RDA and the RSF3 signals. An inverter 241 furnishes as a positive pulse the complementary signal. The output of the "and" gate 240 is called RC and is in fact the read clock. One can see from the last line in FIGURE 4 that the RC pulses occur at a rate determined by the transitions normally following each other at a time T. Thus, the signal pulse train RC defines only the sequence of *bits* regardless of whether the bit be a "1" or a "0." In particular, the train of pulses RC suppresses those RSF3 pulses which are used for defining the bit "0." Accordingly, the RC pulses are the read clock pulses used for gating and other control purposes.

Next, there is provided a gap detector 250 comprised of an "or" gate to respond to the output of either "and" gate 245 or "and" gate 254. Gate 245 has its inputs respectively connected to the set side output of all four flip-flops RDA, RDB, RDC and RDD so that the "and" gate 245 responds when this counter has reached "fifteen" before coincidence is possible. The fifth input of "and" gate 245 is connected to the output side of "or" gate 213, and a positive pulse $\overline{RSF3}$ signals the absence of an RSF3 pulse. Thus, "and" gate 245 will furnish an output pulse if the FC pulse counter 220 has reached the count fifteen state without appearance of an RSF3 pulse. This is shown in FIGURE 4A and is indicative of an information gap, and the gap indicating signal is called RG. An inverter 246 furnishes as a positive signal the $\overline{RG}$ complement.

Next is provided a read error network comprised of two "and" gates 251 and 252 the outputs of which are combined in an "or" gate 253 to furnish an error signal. The "and" gate 251 is of the three input type and it responds to coincidence of the signals $\overline{RDC}$, $\overline{RDA}$ and $\overline{RDB}$. The input of "and" gate 252 is connected to respond to coincidence of signals $\overline{RDA}$, $\overline{RDB}$, $\overline{RDD}$. Accordingly, the "or" gate 253 will furnish an output signal for the duration of the first three clock pulses FFC after a transition, i.e., an RSF3 pulse. The "and" gate 254 furnishes as a positive signal the coincidence of this output of "or" gate 253 with an RSF3 signal. Thus, if another transition in the RS read signal occurs three or less clock pulse (FC) periods after a transition, a gap situation is indicated. While this might not necessarily be due to an information gap, as such, it is however a situation indicating a gap in usable information. For this reason, the output of gate 254 feeds gate 250 to also provide a gap signal RG.

Finally, the read decoder operates a read flip-flop RF which is of the j-K type (FIGURE 2B) and furnishing at its set side output the read signal RF, with the reset side, of course, furnishing the complement $\overline{RF}$. The set side input of the read flip-flop RF is connected to the output side of an "and" gate 260 responding to coincidence of an RSF3 signal and of an RDA signal. The reset input side of flip-flop RF is connected to the output side of an "and" gate 261 having its two inputs respectively connected to be responsive to an RSF3 pulse and to the $\overline{RDA}$ signal.

Looking at the last two lines of FIGURE 4 one can see that flip-flop RF can be set if an RSF3 transition pulse occurs whenever the flip-flop RDA is set which requires at least eight clock pulses FC after previous resetting to zero. The flip-flop RF can be reset by an RSF3 pulse occurring whenever the RDA flip-flop has not been set. This situation arises whenever an RSF3 pulse indicative of a bit "0" appears.

Accordingly, the flip-flop RF furnishes a constant signal output level in case binary bits "1" succeed each other and only in case of a "0" bit an $\overline{RF}$ signal is temporarily furnished, particularly in between a zero defining transition (such as transition 3 in FIGURE 4) and the next following transition occurring at the regular bit rate. In other words, a plurality of 1's is defined by a constant signal level for RF, while a plurality of succeeding 0's is a block shaped waveform having a length of six FC pulses and occurring at the rate of the RC pulses (twelve RC pulses).

Thus, the decoder system as described thus far operates by quantizing the time intervals in between transitions of the RS signal and counting of such time intervals produces a binary signal RF which by its signal level is indicative of the binary quantity of any bit as recorded. The decoder, furthermore, furnishes a reference clock RC determining the rate of occurrence of the binary bits at a degree of accuracy determined by the FC quantizing clock pulses. The decoder, finally, furnishes the signal RG indicative of the fact that there is an information gap on the track or that there is a gap in usable information since a transition has occurred too early to be explained by too fast a reading speed.

FIGURES 5A and 5B illustrate pulse diagrams for a similar sequence of read signals RS, but in FIGURE 5A the tape read speed is 25 percent below the rated speed or, what means the same thing, the writing speed was 25 percent above the rated speed. In this case the transition 2 as standardized and as identified by an RSF3 pulse occurred after the binary counter (RDA to RDD) has reached the count fifteen. If at the respective next reference clock pulse FC still no RSF3 pulse had occurred, then, as can be seen from FIGURE 3, the gap indicator gate 245 would have responded indicating that since no transitions have occurred a gap must exist. As was explained above, this results in an error situation. Since, however, an RSF3 pulse did occur, the bit "1" is being registered duly. Thus, for proper operation care must be taken that speed deviations of the tape during reading and writing does not result in a compounded error in excess of 25 percent deviations from the rated speed.

The internal clock required for further evaluation of the read signals and provided by "and" gate 240 furnishing the RC signals, has adapted itself to this slower tape speed, since the clock pulses RC are furnished now at a rate to correspond to the passage of transition signals under the magnetic reading head for this particular instance.

The zero defining transition 3 in FIGURE 5A results in an RSF3 pulse which occurs at a time during which it is still possible to have the read flip-flop RF reset by this particular RSF3 pulse in cooperation with the coincidence of an $\overline{RDA}$ signal (count state seven). A later occurrence of the such RSF3 signal would find the RDA flip-flop in the set-state and would thus be suppressed as a zero-defining transition. An operating speed of 25 percent or more below the rated speed is a tape speed error situation. Thus, if the decoder does not register a transition after eight FC pulses, there is either an error situation present, or, if the tape speed were within the tolerance range, the bit scanned is in fact a "1," and there is no zero-defining middle transition. The error situation proper is detected by a count up to fifteen without detecting a bit-defining transition.

FIGURE 5B depicts a situation in which the transport during tape reading operates a 25 percent above rated speed. It can be seen that here a "1" defining transition such as 2 occurs just when the flip-flop RDA has been set (eight FC pulses). Since the RSF3 pulses when occurring at the regular rate are used to reset the RDA flip-flop, this transition is properly registered even though it occurred already after eight reference clock pulses FC. A still earlier occurring RSF3 pulse would coincide with a state of flip-flop RDA in which it is not being set and would have registered as a zero-defining transition. However, a zero-defining transition such as 3 can only be recognized after four or more FC pulses. At a still higher tape speed, transition 3 would occur less than four FC pulses after transition 2 and either "and" gate 251 or "and" gate 252 would respond to produce a usable information gap signal.

A comparison between FIGURES 4, 5A and 5B reveals that the decoding device permits recognition of "1" defining and "0" defining transitions in the RS signal in case of speed deviations up to a point beyond which such distinction is not possible any more for principal reasons: As long as a transition occurs four to seven reference pulses FC, after the counter and decoder 220 has been reset to counting state zero, such a transition (RSF3 pulse) will be recognized as a "0" defining transition. Looking, therefore, particularly at FIGURE 5B one can see that if a "1" defining transition such as 2 had occurred slightly earlier, the RDA flip-flop would not have been set, and such a transition would have been registered as a zero-defining transition, which of course, is a mistake. On the other hand, looking at FIGURE 5A, had the zero-defining transition 3 occurred slightly later, i.e. after seven FC pulses, the RDA flip-flop would have been set again, and such a transition would have been registered as a "1" defining transition, which again is a mistake.

A transition (RSF3 pulse) occurring eight or more but not exceeding 15 pulses FC after resetting of the counter 220 to zero, will be recognized as a "1" defining transition. A "0" defining transition at an excessively slowly running tape, will be recognized as a "1" defining transition which is an error situation. An excessively fast running tape does not produce any "1" defining transition.

The error proper is detected by development of a gap signal. In case of an excessively slow running tape, the "0" defining transitions occur eight or more FC pulses after the last transition and are "decoded" as "1" defining transitions, but the true "1" defining transitions appear sixteen or more FC pulses late and produce the gap signal RG. In case of an excessively fast running tape the "1" defining transitions occur less than eight FC pulses after the last transition and are thus "decoded" as "0" defining transitions, but the true "0" defining transitions appear less than four FC pulses early and again the gap signal RG is produced.

The inventive device enables recognition and distinction of "1" defining transitions and of "0" defining transitions, even in case of +25 percent deviations of the tape speed from normal or rated speed, and the recognition is limited only up to a point where the speed compensation overlaps with the bit discrimination, so that in case of excessively high or excessively low speeds transitions of one bit type enter the tolerance range of transition recognition for the other bit type.

Proceeding now to the description of FIGURE 6 there is shown the read synchronizer and detector having as a basic element a binary counter 300 composed of the three flip-flops RSA, RSB and RSC of the j-K type (FIGURE 2B). The function of the read synchronizer-detector is to continuously monitor during reading operation (CERF being true) whether there is a preamble or a postamble, and to provide the character clock pulses RCP. This is done by counting operations. FIGURES 7 and 8 show various phases of this counting. The counting pulses are derived as follows:

There is an "or" gate 301 having two inputs, one of which is connected to respond to the bit clock pulses RC for normal counter operation. (See top diagram in FIGURE 7.) The second input for the "or" gate 301 is derived from an "and" circuit 302 having two inputs, respectively connected to respond to the FC pulses during production of an RG gap defining signal. This is for emptying the counter as soon as a gap situation is encountered.

The flip-flop RSA has a set side input terminal connected to an "end" gate 310 having three input terminals respectively connected to the set side outputs of flip-flops RSB and RSC, and the third input terminal of "and" gate 310 responds to the signal $\overline{RG}$, i.e., the flip-flop RSA can be set only as long as no gap is being detected. The reset side input of flip-flop RSA is connected to an "or" gate 311 having three inputs. One of the inputs is the gap signal RG capable of directly resetting the flip-flop RSA. The second input of "or" gate 311 is drawn from an "and" gate 312 responding to a coincidence of signals RSB and RSD.

The flip-flop RSD is the principal element for preamble detection, so that the flip-flop RSA is in fact reset upon detection of a preamble which will be described more fully below. There is another "and" gate 313 for resetting flip-flop RSA via "or" gate 311, which "and" gate 313 has three inputs, one of which is connected to respond to the $\overline{RF}$ signal which is a positive signal upon occurrence of a bit "0." The second input of "and" gate 313 is the set side output of flip-flop RSB and the third input of "and" gate 313 is the reset side output of a postamble detector flip-flop RSF.

The "and" gate 313, as will be developed more fully below, serves to reset the flip-flop RSA when more than seven bit signals have been counted by the counter succeeded by a bit "0."

The flip-flop RSB has its set side input connected to an "and" gate 320, having two inputs, one of which is connected to the set side output of flip-flop RSC, and the other input of "and" gate 320 responds to the $\overline{RG}$ signal (no gap). The flip-flop RSB can be reset by one of four signals fed to the reset side input through "or" circuit 321. The four inputs of "or" circuit 321 are derived as follows. One is the gap signal RG, the second one is drawn from the output side of flip-flop RSC. The third one is drawn through an "and" gate 322 having two input terminals respectively connected to the set side output of flip-flop RSA and to the set side output of flip-flop RSD (preamble detection).

It should be mentioned that the two "and" gates 312 and 322 together serve to reset the counter to counting state zero after detection and during the presence of a preamble, whenever the binary counter 300 has reached the count of six; the resetting occurs with the next following, i.e., the seventh pulse. This provision serves to determine and to synchronize the read signal output to the character rate, since each character is composed of seven bits. In other words, the two "and" gates 312 and 322 reset the counter to "0" at the seventh signal for the purpose of determining the phase of occurrence of the characters, and to permit recognition of respective seven bits as one character.

The fourth input of "or" circuit 321 is drawn from an "and" gate 323 having three input terminals respectively connected to respond to the $\overline{RF}$ signal, i.e., the bit "0" defining output signal; the second input of "and" gate 323 responds to the reset output of postamble detector flip-flop RSF, and the third input terminal of "and" gate 323 responds to the set side output of the flip-flop RSA. The "and" gate 313 and 323 together serve to respectively control flip-flops RSA and RSB for resetting the counter 300 to serve after detection of the postamble.

The flip-flop RSC has its set side input connected to an "or" circuit 330 having two inputs, one of which is connected to an "and" circuit 331 having two inputs respectively responding to $\overline{RSA}$ and $\overline{RG}$ signals. The other input of "or" circuit 330 is connected to the output of an "and" gate 332 respectively connected to receive the $\overline{RG}$, $\overline{RSB}$ signals. The reset side input of flip-flop RSC receives its own set output, thus the flip-flop RSC is being set by every other clock pulse up to count six whereupon it remains reset. Alternatively, a gap signal RG can reset this flip-flop at any time.

Proceeding now to the description of the preamble detector, it is comprised, as stated, of flip-flop RSD of the j-K type and having its set side input (j) connected to an "and" circuit 340 which responds to the coincidence of five signals. There is first the $\overline{RF}$ pulse, since the principal requirement of preamble detection is the detection of a zero bit. Two further inputs are respectively connected to receive the set side outputs of flip-flops RSA and RSB which is an indication that the preamble detector requires for response that the binary counter has reached the counting six state. The fourth input of "and" circuit 340 is connected to receive the $\overline{RSF}$ signal, i.e., the preamble detector can only respond if no postamble has been detected, and the fifth input of "and" circuit 340 connected to respond to the $\overline{RG}$ signal, i.e., thus no gap must be in existence.

The preamble detector flip-flop RSD can be reset by a gap signal drawn through "or" circuit 341. Thus, the preamble detector remains on as long as no gap is in existence, but as soon as a gap has been detected by the "and" circuit 245 (FIGURE 3) the preamble detector RSD is being reset, and thus is being prepared to respond to the detection of another preamble.

The other input of "or" circuit 341 is connected to the output side of "and" circuit 342 having four inputs. One input is the RF signal which is positive for as long as a signal 1 is being detected. Other inputs are RSA and RSB signals. This requires a count up to at least six by the binary counter, and, additionally, the postamble detector flip-flop set side output is being applied to "and" circuit 342, i.e., upon detection of a postamble, the preamble detector flip-flop is being reset.

The preamble detector operates as follows. Reference is made to FIGURES 6 and 7. The preamble detector is not designed to distinctly respond to the existence of a specific number of 1's to be followed by zero signals on the tape. The principal design of the preamble detector is to make use of the fact that the preamble is the inversion of the postamble, so that the tape can be read in either one of the two directions of tape movement. Another function of the preamble detector is to sort out spurious signals in a gap on the tape which may have simulated the existence of zero signals. It is extremely unlikely that such spurious and zero simulating transitions on the tape have succeeded in such regular sequence on the tape so as to avoid response of the gap detector. Therefore, it can be assumed that in a gap of a few zero transitions may occur, but the signal detector described with reference to FIGURE 3 will clearly suppress more than a few spurious zero defining transitions. Thus, it is a principal design of the preamble detector to respond to at least several, regularly occurring signals (bits) which in fact define 1's on the tape. It is only important that after a plurality of such 1-defining signals exceeding six, there occurs a bit zero (=$\overline{\text{RF}}$) which causes ultimately (see "and" gate 340) the preamble detector flip-flop RSD to respond. The first portion of FIGURE 7 illustrates this situation in which the zero at time 1 resets the counter 300 to zero, and causes the preamble detector flip-flop to respond to furnish the signal RSD for as long as no gap or no postamble occurs.

Proceeding now to the description of the postamble detector, the postamble detector flip-flop RSF has its input set side connected to a four input "and" gate 370. One of the four inputs of "and" gate 370 is respectively connected to "and" gate 353 to respond to the resetting of the binary counter 300 counting state zero. The second input of "and" gate 370 is connected to respond to the $\overline{\text{RF}}$ signal, i.e. a zero defining signal; the third input is provided by the preamble detector output, i.e., the postamble detector will respond only if a preamble was detected previously, and the fourth input of "and" gate 370 responds to the $\overline{\text{RG}}$ signal so as to respond only in the absence of a gap. Though a gap will normally follow the postable, a gap should not precede it.

The normal postamble detection requires that the counter 300 is at count state zero. It further requires the absence of a gap, previous preamble detection, and the detection of a signal bit zero. It thus can be seen that the postamble detector will not necessarily respond only to the postamble as defined (one "0"—eight "1"), but any character having a zero as its first bit might, at first cause the postamble detector to respond. (See FIGURE 7, second legal character.) To remedy this, any subsequent "zero" within the character will cause the postamble detector to be turned off again. This is called partial postamble detection and remains ineffective. Consequently, the reset side input of the flip-flop RSF is governed by an "and" gate 371 which has one input terminal connected to receive an $\overline{\text{RF}}$, i.e., a zero defining signal. "And" gate 371 requires further presence of preamble detection and of the reading enabling signal CERF. Thus, a character having a zero as its first bit and having a second zero within its format will cause the postamble detector to be set temporarily only.

The complete postamble detection under various circumstances is shown in FIGURE 8. The critical point is that a zero at the beginning of a character is being followed by at least six 1's. If this situation arises, the postamble detector continues to furnish a signal flip-flop RSF and is not reset, and if this is in fact correct there soon will follow a gap signal because the postamble is the last character of a record, and a gap is encountered simply by absence of transitions (see FIGURE 4A). The postamble signal RF succeeded by a gap is a correct situation, and the postamble is principally used to turn off the preamble flip-flop via the "and" circuit 342 after a count state six has been reached by counter 300. Thus, temporary setting of flip-flop RSF for less than seven bits does not disable the preamble flip-flop RSD, but any character having one zero succeeded by six ones will be recognized as postamble to turn flip-flop RSD off immediately. The turning off of the preamble detector when succeeded by a gap indicates proper termination of the reading of a record.

The read synchronizer operates an "and" circuit 380 having as its input the RC clock pulses, having, furthermore, an input the preamble detector signal RSD and receiving, additionally, the two RSA and RSB signals which are true whenever a count six has been reached by counter 300. Finally, "and" circuit 380 has as its input the output of an "or" circuit 381 which responds to the absence of postamble detection, as identified by the $\overline{\text{RSF}}$ signal, or to the production of a signal $\overline{\text{RF}}$ signal indicating the presence of a zero. Thus, the output signal of "and" gate 380 indicates that seven signals have been read not being either pre- or postamble (the preamble ends with zero), and that the preamble is already present. Any signal developed thereupon by "and" gate 380 is called RCP and is a read character clock pulse.

The RCP pulses follow in sequence of the reading of characters, and particularly an RCP pulse occurs at the end of each character concurrently with the reading of the last bit. It should be mentioned that the production of an RCP pulse is independent from the detection of any error. Thus, the production of an RCP pulse is not inhibited by the fact that the character which has just been read contains an error giving rise to any of the error situations to be described below.

It will be observed, that in a correct record the bits follow each other on the tape in regular sequence without gap or pause in between characters. Since each character is comprised of seven bits, counting of seven bits must periodically occur, and the RCP pulses thus identify each sequence of seven bits. It is important, that not just any sequence of seven bits form a character, but counting must commence from one particular bit which is the very first bit of the first character in a record. This correct starting of counting is ensured by the preamble ending with a zero bit after more than six "one" bits, and the very next bit after this preamble zero bit is the first bit of the first character. The read synchronizer is set to start its periodic counting sequence at that point.

The read synchronizer also serves as a monitor for specific error situations which shall be described next. During reading a continuously running check on the bits in each character is conducted by a parity error detector. The parity error detector and particularly the control circuit for the parity error flip-flop RSE shall be described in the following.

Each character is defined by an odd number of "1" defining bits. Since each character is also defined by seven signals the parity condition can also be defined in that there must be an even number of zeros in each character. The principle used for parity error detection is that for each character a zero in such character turns the parity error flip-flop on, and a subsequently occurring zero turns the parity error (RSE) flip-flop off, the next following zero turns it on again, etc. For even parity of zeros, the condition now is that after each character the flip-flop RSE must be in the off state. If not, a parity error has occurred. Bearing this in mind, it is easy to follow the parity error control circuit.

The set side input of the parity error flip-flop RSE is controlled through an "or" circuit 350 having three inputs respectively connected to receive the signals RSD, the zero defining character signal $\overline{RF}$, and the gap absent signal $\overline{RG}$. The reset side of input of flip-flop RSE is governed by an "or" circuit 351 so that the flip-flop RSE can be turned off by either one of two signals, one of which is drawn from an "and" gate 352 combining the preamble detector output RSD with the enabling signal CERF, and the zero-defining $\overline{RF}$ signal. Thus, during normal operation the parity error flip-flop is alternatingly controlled by the occurrence of zeros within a character.

The parity error detector, and particularly the control circuit of the flip-flop RSE, is directly synced to the sequence of characters, because the parity error flip-flop RSE is reset by $\overline{RSA} \cdot \overline{RSB} \cdot \overline{RSC}$ coincidence (gate 353). This defines always the beginning of a new character (count state zero), and the next clock pulse RC resets the flip-flop RSE. Additionally, this coincidence signal $$\overline{RSA} \cdot \overline{RSB} \cdot \overline{RSC}$$

occurring at the first bit of the next character is used immediately to gate open the error detector gate 354. If at that time the flip-flop RSE is set, a parity error occurs and, therefore, the output of gate 354 is fed to the computer for signaling detection of a parity error. The third input of gate 354 is the RSD signal, so that a parity error situation can be signaled only after preamble detection and, implicity, prior to postamble detection.

The parity error may be combined with a general error circuit logic which signals the several error situations to the computer. A first error situation to be signaled is a coincidence of a preamble signal RSD and of a gap RG. This situation is possible only if the postamble has not been detected even though there appears a gap. This represents an error, because each record is to be concluded with a postamble. The "and" gate 343, thus responds to concurrence of RG and RSD signals, to provide an indicator for this error situation. It will be recalled, that gap signals RG will be produced in case of data or information gaps and when it appears that transitions (RS-signal) occur too frequently or too rarely, exceeding the tolerance range provided by the decoder circuit shown in FIGURE 3 (see also FIGURE 4A). A second error situation arises when a parity error occurs as aforedescribed and signaled by the output of gate 354.

It will be appreciated that both, postamble and preamble contain by definition a parity error, since they have only one "zero" each. This, of course, is not to be signaled as parity error. Signaling is prevented by gating parity error gate 354 by the RSD signal: The RSD signal is not in existence until after the zero bit at the end of the preamble proper, and RSD vanishes if for any reason a single zero is succeeded by six ones.

A third error situation therefore arises in case of premature postamble detection, i.e., in a situation in which the postamble detector (RSF) has responded particularly by turning the preamble detector flip-flop RSD off, while there still is one or more characters on the tape which follow the prematurely detected postamble without prior detection of another preamble. Such erroneous or illegal character is a zero succeeded by six ones.

This situation arises if due to a parity error a character was disturbed to simulate postamble. This type of error will be detected by gate 345.

FIGURE 8 illustrates the time sequence of the premature postamble detection. It may be assumed that a particular character has started out with a zero. It can be seen from the postamble flip-flop RSF, that a zero at the beginning of a character sets the flip-flop, and the signal RSF is being produced. After seven bits no additional zero has been detected so that the flip-flop RSF remains set. Additionally, there was an odd number of zeros so that also the error flip-flop is being set, and has not been reset during this particular character. At the end of this character, the preamble flip-flop RSD is being reset because existence of an RSF signal after seven RC-clock signals in a character serves to turn the preamble flip-flop RSD off (gate 342).

At this point, however, no true error has been detected, because up to this point the situation is the same as if the postamble had been detected regularly. The parity error signal RSE is operative only during presence of a preamble signal RSD, and the preamble flip-flop has just been turned off, and the counter 300 has been reset at the end of seven characters, so that the parity error detector 354 has not signaled an error.

Now it appears, however, that another character is on the tape. The existence of this character succeeding the postamble detection is an error situation detected in that the absence of a preamble signal RSD will coincide with a count state six of counter 300. This is monitored by the "and" gate 345. From the right hand side of FIGURE 8 one can see that the timely detection of a postamble distinguishes from the premature postamble detection (left hand side in FIGURE 8) as follows: After a zero and six ones counter 300 is reset to second state zero, and starts in again to count bits. Now a gap signal RG must occur prior to counter 300 reading again count state six. RG resets counter 300 to zero and error detector 345 will not respond. This is the reason why the postamble is longer than one character but shorter than two, and a gap occurs prior to two character times from the first bit zero. In case of five postamble detection, thirteen bits occurred after the first zero and this caused error gate 345 to respond.

FIGURE 7 illustrates how the counter 300 and the several detectors operate in case of a correct or "legal" character. The synchronizer counter 300 proceeds to count seven bits (RC) by shifting from count state zero to state six. The first read signal to be evaluated occurs when the counter is in state zero after preamble detection. The read error flip-flop RSE is turned on by any first "zero" bit within a character, but it is turned off upon the second zero bit. In case of the second legal character illustrated, one can see that the error flip-flop RSE is being turned on twice since there are shown four zeros, but at the end of a character the error flip-flop is indeed returned to the state of deactivation.

At the end of each character, an RCP character clock pulse is produced and thereafter the counter returns to state zero at the first bit of the next character.

As one can see in FIGURE 7, in case the first signal in a character is a zero, the postamble flip-flop RSF is being set, but this flip-flop RSF is in fact being reset with the next zero signal, because the postamble is defined by one zero and a plurality of 1's following thereafter, so that at the end of this character also the postamble flip-flop RSF is still in the off state.

The third character illustrated in FIGURE 7 is one which has a parity error, and it was described above that at the end of the character an error flip-flop RSE is remaining set, so that with the return of the counter to zero the RSE flip-flop produces the signal RSE and the coincidence occurs at the "and" circuit 354 to furnish a parity error indication.

This completes the description of the read-logic. It will be observed, that it is a complete, autonomous unit, which by itself does not depend upon any particular state signal CS0, CS1, etc. but is solely enabled or disabled by the CERF signal which thus is the exclusive source for enabling or disabling the unit.

*Write logic*

Proceeding now to the description of FIGURE 9, there is shown the write logic comprised of a clock generator, a write synchronizer and a write flip-flop. The write clock generator is comprised of four flip-flops WCA, WCB, WCC and WCD of the *j*-K type. Each one of the flip-flops is clocked from the reference clock furnishing the clock pulses FC at a rate which is twelve times faster than the contemplated writing of individual signals onto any of the tapes. The aforementioned four flip-flops all receive an enabling signal CSG which is produced by an "or" gate 414 whenever the system is not in the idle state. This will be described more fully below. The flip-flops WCA, etc. are interconnected for binary counting operation as follows.

The set side input of flip-flop WCA is governed by an "and" gate 410 having its two additional inputs respectively connected to the set side outputs of flip-flops WEB and WCD. The flip-flop WCA is reset through an "and" circuit 411 connected to receive also the set side output signals of flip-flops WCD and WCB. Thus, the set and reset sides of flip-flop WCA are controlled by similar coincident pulses.

The set side input of WCB is governed by an "and" circuit 412 receiving the set side output of flip-flop WCD as well as the set side output of flip-flop WCC. The reset side input of flip-flop WCB is governed directly by the output of flip-flop WCD. The set side input of flip-flop WCC receives the reset output of flip-flop WCB as well as the set side output of flip-flop WCD through an "and" gate 413. The reset side input of flip-flop WCC receives also the set side output of flip-flop WCD.

The flip-flop WCD itself has both its set and its reset side input gated open all the time so that it creates a waveform in synchronism with the FC pulses by way of a frequency division. Accordingly the pulse train furnished by the flip-flop WCD is a continuous train of clock pulses of half the frequency of that of the reference clock. The flip-flops WCB and WCC are connected to each furnish output pulses of a duration equal to the pulse frequency period of flip-flop WCD with a pause in between two succeeding pulses of twice the pulse length. Additionally the two pulse trains as furnished by the flip-flops WCB and WCC are phase shifted to each other by one pulse length.

The flip-flop WCA furnishes pulses at a frequency equal to the desired bit rate frequency which is $\frac{1}{12}$th of the FC frequency. Thus, the four flip-flops WCA through WCD are in fact interconnected to translate the pulse rate as furnished by the reference clock FC into a pulse train having the frequency of $\frac{1}{12}$th of reference clock pulse frequency, whereby the pulse duration and the pause between two pulses as derivable from the flip-flop WCA are equal.

The write clock generator counter is used as follows. There are provided two "and" gates 420 and 421, each having one input connected to the set side output of flip-flop WCB and one input to receive WCD. Gate 420 receives the signal $\overline{WCA}$ and gate 421 receives WCA. The sixth and the seventh lines in FIGURE 11 indicate the pulse trains respectively called WCP0 and WCP1 and provided at the output sides of the "and" circuits 421 and 420. The pulse train WCP1 determines the phase for controlling occurrence of transitions to be recorded for defining the bit rate, which transitions are used both for bit 1 and bit 0. The pulse train WCP0 is used to define the phase for the zero defining transitions to be written on the tape.

The signals WCP0 and WCP1 are the principal input signals for a write flip-flop WF. The output of the write flip-flop WF directly controls any writing (recording) transducer that is connected to it. This transducer selection process was explained above with reference to FIGURE 1 and is similar to the track selection for reading. The writing process, of course, is controlled independent from the track selected for recording. It should be repeated briefly, that prior to commencement of writing, the computer will initiate a status check to determine whether a particular track is addressable for writing, or whether it is to be erased or if it is file protected, and the operative connection of the respectively associated writing transducer is made dependent upon the result of this status check.

The write flip-flop WF is also of the j-K type, and has the two j-K input terminals connected to an "and" circuit 444 to receive the CSG enabling signal, as well as a signal W9 issued by the computer for as long as the computer intends to issue data. During writing, flip-flop WF is clocked, i.e., sequentially triggered by the output derived from "or" gate 440. Principal input signals for "or" gate 440 are the WCP1-pulses regularly triggering the write flip-flop as long as enabled. The write flip-flop will be operated by WCP1-signals regardless, whether the computer actually furnishes data. This is immaterial since, as will be described below, there is always erasing up to the beginning of preamble formation, and after completion of writing and postamble formation.

During writing the WCP1 pulses will be effective to form the bit defining transitions on the tape. The "zero" defining pulses WCP0 respectively intermediate to two succeeding WCP1-pulses are gated into the "or" gate 440 during writing by an "and" gate 442. The other two inputs of "and" gate 442 are a CS2 state signal to be described below and indicating that the inventive transfer system is in the operation state for writing. The $\overline{HR00}$ signal identifies zero bits drawn from the computer in a manner described with reference to FIGURE 12. Thus, any $\overline{HR00}$ signal causes recording of a WCP0 pulse as intermediate, zero defining transition. Any HR00 signal defines a one and thus causes suppression of a WCP0 pulse. FIGURE 10 illustrates this recording control routine.

The two other inputs for "or" gate 440 respectively serve for preamble and postamble formation independently from any computer data. These pre- and postambles are formed with the aid of write synchronizer to be described below.

From FIGURE 9 one can see that the write flip-flop output WF is not fed directly to the write transducers, but is just passed into an "and" gate 451, and from there to an "or" gate 450, the output of which is the write signal proper. The "and" gate 451 is open only if a flip-flop CETF is in reset state.

It is a significant aspect of the data transfer system that in case no read operation is in progress, but a tape is caused to run and a particular address has been selected, then either there is erasing or there is writing. Erasing is controlled by the erase flip-flop CETF. Thus, writing is possible always as long as the erase CETF flip-flop is reset. Since the write flip-flop WF is triggered normally for as long as the CSG and W9 gating signals are produced, a train of bits is provided for recording on the addressed track. The recording can be inhibited by turning erase flip-flop CETF on so as to block gate 451. It is important to note, that signal W9 is true during writing as well as during erasing, so that erasing requires always suppression of the output of write flip-flop WF.

The set side output of flip-flop CETF opens a gate 452 to permit passage of an erase signal EX to the "or" gate 450, and from there to the addressed write transducer head. The erase signal EX may, for example, be the high frequency signal FC, or any other high frequency, or a D.C. erasing signal.

Though not directly pertaining to the write logic, the erase flip-flop CETF shall be described here, because it always participates in the overall operation during recording. The erase flip-flop is of the D.C. type (FIGURE 2D) and will be turned on always through an "and" gate 448, when during the CS0 state (idle waiting) the computer issues W11 and W9 signals respectively denoting that operation of the transfer system is desired (W11) and that the computer intends to issue data (W9). The like holds true for both writing and erasing routines so that with the very next write bit clock pulse WCP1, the erase flip-flop CETF is turned on, inhibiting writing and causing erasing on the track then addressed. If no writing but true erasing is intended, then the erase flip-flop CETF will be turned off only when the computer decouples itself from the transfer unit by issuing a $\overline{W11}$ signal.

The "and" gates 446 and 447 operate the erase flip-flop during a writing routine, particularly during the preamble and postamble formation periods as identified by CS1 and CS3 state signals. This means that during writing the erase flip-flop CETF is turned off at the beginning of preamble writing and is turned on again at the end of postamble writing, so that during a gap when no data are written, but when the tape is still running, the write or recording transducer produces erasing signals. The particular moments of turning the erase flip-flop on and off during writing will be explained more in detail when postamble and preamble formation is described following the description of the write synchronizer. The distinction between the gap erasing of a normal writing routine and the complete erasing of a record or of a large tape portion, even of the entire tape track, comes from the W10 or $\overline{W10}$ signal. When erasing other than gap erasing is desired, the W10 is issued by the computer preventing the erase flip-flop CETF from being turned off at the moment of what during writing is the beginning of the preamble. Thus, a signal W10 prevents gate 440 from turning the erase flip-flop off.

Proceeding now to the description of the write synchronizer, there are shown three flip-flops WSA, WSB and WSC which are of the j-K type, and they are connected as follows: Each one of these write synchronizer flip-flops receives as clocking signals the pulse train WCP0. FIGURE 11 illustrates this pulse train as used for purposes of reference and on time condensed scale as compared with FIGURE 10.

The set side input of flip-flop WSA is governed by an "and" gate 430 having its two inputs respectively connected to the set side outputs of flip-flops WSB and WSC. The reset side input of flip-flop WSA is connected to receive the set side output of flip-flop WSB. The set side input of flip-flop WSB is connected to receive the set side output of flip-flop WSC, whereas the reset side input of flip-flop WSB is connected to an "or" gate 431 respectively receiving either the set side output signal of flip-flop WSA or the set side output signal of flip-flop WSC.

The set side input of flip-flop WSC is connected to an "or" gate 432 receiving two signals. One of these two signals is the reset side output of flip-flop WSA, the other one being the reset side output of flip-flop WSB. The reset side input of flip-flop WSC is permanently gated open. All input terminals of these write synchronizer flip-flops receive the CSG-gate signal.

FIGURE 11 illustrates the pulse trains as produced at the respective set side outputs of flip-flops WSA, WSB and WSC. The pulse train frequency of the WSA output pulses is equal to one-seventh of the frequency of pulse train WCP0. Thus, the pulse sequence WSA defines the length of each individual character. In other words, the bistable circuit elements WSA, WSB and WSC are interconnected to form a cyclically operating counter, counting up to seven WCP0 pulses, whereupon this particular counter is being reset to start anew thereby defining the number of signals per character.

An "And" gate 433 provides output pulses strobed by a WCP0 pulse and respectively occurring in the middle of the last bit in each character. Accordingly, the output pulses WG01 of gate 433 define the end of each character at a time, when the binary quantity of the last bit is already determined, but prior to counting of the first bit of the next character, if any. The position of WG01 pulses relative to the WCP0 and WCP1 pulse trains is also shown in FIGURE 11.

In the following, formation of premable and postamble will be described. FIGURE 11 illustrates in particular the preamble formation. A preamble, as will be recalled, is a word 111111110: eight ones succeeded by a zero.

The exact length of the preamble is not critical. It should be longer than one character but shorter than two. Actually, the preamble should not be an integral multiple of 7. The reason behind this is that pre- and postambles shall be distinguishable from an illegal character (because of the odd number of zeros). Furthermore, the postamble should terminate prior to a character clock pulse WG01, so that during reading residual oscillation in the read transducer has decayed completely prior to this next pulse WG01, at which time a gap signal RG is to be produced for reasons fully developed above. Since the preamble becomes a postamble in case of reverse reading operation, every requirement for the postamble reflects also on the preamble and vice versa.

Looking at FIGURE 11, it will become apparent, that the character clock signal WG01(3) signals the end of the preamble, so that the first character can be written immediately thereafter. Since the preamble is composed of eight ones and one zero, the writting of "one" bits must commence from a counting state of the write synchronizer defined by WSA·WSC coincidence and occurring prior to character clock signal WG01(2). This WSA·WSC coincidence is detected by "and" gate 445. As will be explained more fully below, at a particular WG01 pulse, here WG01(1), a state signal CS1 is being developed as indication that now the formation of a preamble is desired. Thus, preamble formation starts at the first WSA·WSC coincidence after development of the CS1 signal. This is monitored by a gate 446. Stated differently, at a particular pulse WG01 (here WG01(1)) a state signal CS1 is developed to initiate development of a preamble and to be completed within two character cycles, i.e., at the next following character clock pulse—WG01 (3). It will be recalled, that the preamble formation state CS1 succeeds the state CS0 and that the flip-flop CETF has been turned on during the CS0 state. Thus, at WG01 (1) this flip-flop controls erasing. It is a significant feature of the invention, that during a writing routine subsequent to writing of a postamble and prior to writing of the preamble erasing is to be had, so that in between two records there is a clear gap containing no magnetic transitions of any kind. The erase control flip-flop CETF now participates in the formation of the preamble (and of the postamble) as follows:

As was developed above, the write flip-flop WF is clocked and produces transitions as soon as gate 444 was opened and as long as WCP1-signals are produced. This will occur sufficiently prior to any actual writing, but also the erase flip-flop CETF is on prior to the formation of the preamble. The signal of "and" gate 446 during the CS1 state is now used to turn flip-flop CETF off, to terminate erasing. Since now the $\overline{CETF}$ signal becomes true, gate 451 opens and the writing of "ones" commences for preamble formation (see FIGURE 11). Thus, the particular moment of terminating erasing during the preamble formation period or state operates as commencement of preamble formation proper.

The zero of the preamble will be written at a particular WSA·WSB·WCP0 coincidence monitored by "and" gate 441. This coincidence actually occurs at each character clock signal WG01, and one could use the signal WG01 in lieu of those three inputs for "and" gate 441. Gate 441 is open only when a gating signal $\overline{CECF}$·CS1 is true. This coincidence signal is true only after the second character clock pulse (WG01(2)) succeeds the development of the preamble formation state signal CS1. The development of these gating signals will be described below, but it should be mentioned, that the preamble formation period lasts through two character cycles (WG01), and a flip-flop CECF is on during the first one of these cycles, and off during the second character cycle.

The postamble formation requires the writing of a "zero" succeeded by eight "ones." At the time a particular character clock pulse WG01 signals the end of what is in fact the last character furnished by the computer, a state signal CS3-postamble formation, is developed (infra). The next bit to be written, is the first bit of a character identified by a write synchronizer state $\overline{WSA} \cdot \overline{WSB} \cdot \overline{WSC}$. This state of the write synchronizer is monitored by gate 443, thus gating a WCP0 pulse into the write flip-flop WF for writing a zero. Thereafter, neither gate 441, 442 or 443 furnishes a signal so that "ones" are being written. The $\overline{WSA} \cdot \overline{WSB} \cdot \overline{WSC}$ state recurs after seven WCP0 pulses counted by the write synchronizer. However, this state of the write synchronizer recurs only after the second WG01 pulse when produced during the postamble formation period. To prevent the writing of a zero at this instant, a CECF signal is used to gate open "and" gate 443 only during the first portion of the postamble formation period. It will be described more fully below that during the postamble formation, CECF flip-flop is first on but is turned off at the next character clock pulse WG01. The writing of the postamble is terminated after writing of eight ones which is monitored by gate 447 responding to a counting state WSB and a $\overline{CECF}$ signal. The output of gate 447 is used to turn flip-flop CETF on again, at the moment the writing of eight ones is completed. Accordingly, gate 451 becomes blocked again and gate 452 opens to cause erasing as properly succeeding the recording of the postamble.

The network shown in FIGURE 9 has a broader aspect than mere writing control. The counter comprised of flip-flops WCA, WCB, WCC, WCD provides output pulses WCP0 and WCP1 which are fixed reference pulse sequences, each having ½th of the frequency of reference pulses FC. The write synchronizer is a counter that provides output pulses G01 of fixed frequency which is ⅐th that of the bit pulse frequency of trains WCP0 or WCP1. The entire inventive data transfer system is synchronized to the character pulses WG01, and operational steps are carried out in time increments determined by this character pulse frequency. The only exception to this rule is the read operation itself which is run by the signals drawn from the tape (RC and RCP), but beginning and end of the read period is marked by WG01 pulses.

Here it can be taken into account that the tape runs at similar and constant speed during reading and writing, so that the pulse frequencies of the WG01 and RCP sequences are similar. By controlling the tape drive to a highly constant speed, these frequencies can be made identical within the tolerance limit given by the FC pulses; however, the reading and writing operations are not dependent upon such a constance in tape speed, since it will be recalled, the the autonomous reading process tolerates ±25 percent speed variations.

*Data converter-counter*

Proceeding now to the description of FIGURE 12, there is shown as the central data handling element of the inventive system a multipurpose register 500 comprised primarily of seven bistable flip-flops HR00 through HR06. The principal function of this register is to convert serial information as provided from the tape during reading, into parallel information to be fed to the computer, and to convert parallel information as supplied by the computer into serial information for serial tape writing or recording. When neither reading nor writing is immediately in progress these stages HR00 to HR06 are operated as binary counter.

The register stages HR00 through HR06 are of the *d-g* flip-flop type, see FIGURE 2A, but the *g*-input thereof is either permanently enabled or just omitted. Thus, these flip-flops are controlled by two types of signals only. One type of signal comprises gating signals, determining the mode of operation and interconnecting the flip-flop to perform shift register type or counting operations. The other type of signals are clock pulses provided to the flip-flops at a particular rate as determined by the specific mode of running the flip-flop stages.

Proceeding first to the description of the gating signals, the gating input of each flip-flop is selectively provided by four "and" gates. Absence of all four gating signals empties the register. The gating input terminal of flip-flop HR00 is connected accordingly to the output side of the four "and" gates 501, 502, 503 and 504. The gating input terminal of flip-flop HR01 is connected to the output terminals of "and" gates 511, 512, 513 and 514, etc., and the gating input terminal of flip-flop HR06 is connected to the output side of "and" gates 561, 562, 563 and 564.

There are accordingly seven "and" circuits denoted respectively with reference numerals 501, 511, 521, 531, 541, 551 and 561, each having one gating input terminal connected to a line which receives an SPG signal for concurrent opening. The designation of this signal is an abbreviation for "shift parallel gating" since it is used to cause register 500 to operate in the shift parallel mode. This signal SPG is derived from an "and" circuit 570 having two inputs respectively receiving signals CS2 and CECF. The CS2 signal is the state signal which is true when the system is operated in the writing state. The CECF signal is true when the flip-flop CECF, shown in FIGURE 14, is on.

Since the SPG signal controls the register 500 to operate in the shift parallel mode, the respective second input terminals of the "and" gates 501 through 561 are connected to seven lines C1 through C7 which are the parallel output lines of the computer receiving concurrently the seven bits pertaining to a character. It appears, therefore, that the so-called shift parallel mode of operation as will exist during the second state of system operation, the "and" gates 501 through 561 are enabled to shift bits, i.e., seven parallel bits from the computer into the flip-flop stages HR00 through HR06 for loading same. Thus, in this case the register 500 operates as temporary buffer. It should be mentioned, that the signal coincidence providing for the SPG signal, namely CS2 and CEC*f*, serves also to call on the computer to load the buffer register 500.

The next set of seven "and" gates 502, 512, 522 through 562 have also two input terminals each. One of the input terminals is connected to the common output of an "and" gate 571 producing when enabled a "shift forward gating" signal (SFG) for operating the register 500 as shift register with shifting occurring in the forward direction. The SFG signal is thus a gating signal for the seven flip-flop stages of register 500 to be maintained for forward shifting. The "and" circuit 571 produces the SFG signal by response to coincidence of a $\overline{CI2M}$ signal which is true always as long as the system is operated to have the tape run in forward direction. The second input terminal of "and" circuit 571 is connected to reset the output side of the CECF flip-flop (infra) and the third input is provided by a state signal CS27 which is true when the data transfer system is in either the CS2 or in the CS7 state.

The respective other terminals of the "and" circuits 502 through 552 are respectively connected to the set output sides of the respectively next flip-flop stage, i.e., the second input terminal of gate 502 is connected to the set side output of flip-flop HR01. The second input terminal of gate 512 is connected to the set side output terminal of the flip-flop stage HR02, etc., and the second input terminal of "and" gate 552 is connected to the set side output of flip-flop HR06.

This leaves the second input terminal of gate 562 unconnected as far as this particular connection pattern is concerned. Accordingly, there is provided an "and" circuit 572 having its output side connected to this particular second input terminal of "and" circuit 562. The "and" circuit 572 provides sequentially for the signals to be shifted into the register. Particularly, seven bits are shifted serially into "and" circuit 572 during one cycle. "And" circuit 572 has one input connected to the output of the read flip-flop RF, and the other input is provided by the $\overline{W9}$ signal derived from the computer as an indication that the computer will receive.

The shift forward signal SFG is being produced during forward transport of the tape, and it governs the serially forward shifting of data through the register 500 in forward direction for reading as well as for recording. In case of forward reading, data are shifted serially into gate 562 and into and through the register, while in case of forward writing data are shifted serially to stage HR00 for withdrawal therefrom (see gate 442 in FIGURE 9). Of course, for shifting proper, clock pulses are needed commensurable to the type of shifting operation, and to be described below. The gates 502, 512 to 562 provide the gating input signals for the register stages determining set and reset states thereof but attained only upon clocking of the stages. During forward writing, gate 562 is blocked.

As will be described below, during writing the shift parallel signal SPG is developed briefly to reload the register 500 in parallel through lines C1 to C7. Thereafter the signal SPG is removed and the SFG signal developed by gate 571, and the new register content is serially shifted to stage HR00, the reset terminal thereof feeds gate 442 at the write flip-flop WF (FIGURE 9). Looking at the inputs of gates 570 and 511 respectively providing the SPG and SFG signals, one can see that the alternation between the development of the two signals is controlled by the CECF flip-flop (FIGURE 14) either providing the CECF or the $\overline{CECF}$ signal, so that by alternating the CECF flip-flop, the register 500 is alternated between shift parallel and shift serial modes and the register is thus loaded in parallel and emptied by serial shifting. The third set of gating signals for the seven register stages are derived from the seven "and" gates 503, 513 through 563. They have two input terminals each, one is connected to a common output line of an "and" circuit 575. The "and" circuit 575 produces a shift reverse gating signal, abbreviated SRG, as an enabling signal for reverse shifting operation.

This reverse shifting operation is true upon coincidence of the following three signals; one is a CS27 signal which is an indication for either the second write-state or the seventh-read state. The next gating signal is a $\overline{CECF}$ signal as an indication that the flip-flop CECF is being turned off; the third input is a C12M signal as indication that the tape is running in the reverse mode. As will be described below, a C12M flip-flop is turned on by the C12 signal as soon and as long as the tape then coupled to the computer runs in the reverse direction.

The respective second input terminals of the "and" circuits 503 and 563 are connected as follows. The circuit 503 receives the RF signal from the read flip-flop. This is a direct connection requiring no further gating since no reverse writing is provided for. The second input terminal of "and" circuit 513 is connected to the set output side of the respectively preceding flip-flop stage, i.e., in this case the output set side of the HR00 flip-flop. The pattern continues up to "and" circuit 563 having its second input terminal connected to the output set side of flip-flop HR05. The shift reverse type operation is not to run cyclically by ring counter operation, but continuous shifting depends strictly on the existence of RF signals, i.e., of read flip-flop output signals. Thus, the output of flip-flop HR06 does not participate in this connection pattern.

The last set of the gating signals for the flip-flop stages is derived from the "and" gates 504 through 564. Again, these "and" gates have two inputs each, one is connected to a common output line which is the output of an "or" circuit 576. The output of "or" circuit 576 is called CBG, which is an abbreviation for a "count binary gating" signal designation; this signal is true if the register 500 is to be operated as a binary counter. For counting operations, therefore, the second input terminals of the gates 504 through 564 are respectively connected to the reset side output of their own flip-flop stage, i.e., the second input of "and" circuit 504 is connected to the reset side output of flip-flop HR00, the second input terminal of "and" circuit 514 is connected to the reset side output of flip-flop HR01, etc. The second input terminal of "and" circuit 564 is connected to the reset side output of flip-flop HR06.

The CBG signal is produced by "or" gate 576 either for as long as the inventive system is in the CS0 state, so that one input terminal of "or" circuit 576 is connected to be directly responsive to the CS0 state signal. The other input terminal of "or" circuit 576 is conected to an "and" circuit 577 having two inputs, one of which responds to presence of CS4, or CS5 or CS6 state signals. The second input terminal of "and" circuit 577 is connected to respond to the $\overline{CECF}$ signal. When gate 577 is effective specifically will be explained in detail below.

For clocking the register 500 in any of its various modes, provisions are made to have the clocking terminal of each of the register flip-flops respectively connected to the output of an "or" circuit, 506, 516 through 566. The input conections of these "or" circuits is made so that they all respond to a common output derived from an "or" circuit 580 which is the principal clock pulse source for shifting and resetting operations of register 500. This "or" circuit 580 has three input terminals respectively connected to three "and" gates. The first "and" gate 581 responds to coincidence of the CS2 status signal and the WCP0 pulses derived from the write bit clock as aforedescribed (see FIGURE 9). This, of course, is the clock pulse source for writing. The second "and" circuit 582 responds to coincidence of the RC clock signal (read bit clock—see FIGURE 3) and to the status signal CS7. Of course, this gate 582 is the pulse source for register clocking during reading.

The third "and" circuit 583 responds to coincidence of four signals, one is the train of FC clock pulses which is the fast reference clock; the second signal is the CECF signal serving here for purposes of gating and being derived from the external clock CECF. The third and fourth input terminals of "and" circuit 583 are connected to receive $\overline{CS0}$ and $\overline{CS7}$ signals. Thus, the "and" circuit 583 is in effect gated open for the duration of the states CS1, CS2, CS3, CS4, CS5, CS6. As will be explained below, during these states the CECF signal is produced as register erasing command or gating signal to cause emptying of the register 500 in preparation for a new operation. Erasing is had by fastest means available in the system, which is the FC clock. Additionally, during the operational state CS2 (writing) the clock pulses are either the write pulses WCP0 for write clocking or the fast clock pulses FC for erasing and input clocking. There is no overlapping because the write bit WCP0 pulses are synced to the FC pulses. This alternative mode of operation means that in the operational state CS2 the register 500 is loaded in parallel when the flip-flop CECF is turned on with the loading being clocked by an FC pulse. Still during writing, the clock pulse is a WCP0 pulse as long as the CECF flip-flop is off for serially shifting-clocking the register content to stage HR00 and to the write flip-flop. During the CS1, CS3, CS4, CS5 and CS6 states of operation the FC pulses serve as erase clock pulses for the register 500 as long as permitted by CECF, but during the CS7 state of operation the clock pulses are the RC pulses alone, i.e., the read bit clock pulses. In summary, gate 581 provides the register write clock proper, gate 582 provides the register read clock and gate 583 provides the register erase clock as well as the shift parallel input clocking during the CS2 state.

The respective second input terminals of all circuits 506 through 566 are respectively connected to the output side of "and" circuits 505 and 565. These "and" circuits 505 through 565 have two input terminals, one has a common connection to the output of "or" circuit 576 to receive the CBG signal, i.e., these "and" circuits 505 through 565 are enabled during the count binary operational state. The respective second input terminals of the "and" circuits 515 through 565 are connected to the set side output of the respectively preceding flip-flop, i.e., the "and" circuit 515 has one input terminal connected to the output set side of flip-flop HR00; the "and" circuit 525 has its second input terminal conected to the output side of flip-flop HR01, etc. and the "and" circuit 565 has its second input connected to the set side output of flip-flop HR05. This leaves the second input terminal of "and" circuit 505 unconnected as far as this connection pattern is concerned and it responds to the WG01 signal, which is the write character clock signal recurring at the rate of the writing of characters on the tape (see FIGURE 9).

The CBG signal together with the WG01 pulse train serve as counter input when register 500 operates as counter. Counting operations may occur during states CS0, CS4, CS5 and CS6 (see input of gate 576). The counting has nothing to do with the writing operation as such, but the WG01 pulses though serving to distinguish between sequential characters during writing, are actually reference pulses derived by 1:84 frequency division of the reference clock FC (see FIGURE 9). Thus, all counting operations are carried out in increments of character writing. Since each character occupies a particular length on the tape, counting can also be understood as being carried out in fixed increments of tape lengths, provided the tape runs at constant speed.

The connection of the register 500 to the computer for shifting data in parallel out of the register and into the computer is provided by the seven gates 507 through 577 responding to a CS7 gating signal. This state of operation is present only during tape reading. The gate outputs fed computer input lines Z1 to Z7. The respective second input terminals of the "and" circuits 507 through 567 connect to the set side output terminals of the register flip-flop HR00 through HR06.

It, therefore, appears that the register 500 is capable of the following types of operation. It can receive signals from the computer parallel through gates 501, 511 to 561 and it can shift the same out in forward direction into the write flip-flop. It can receive serially signals from the read flip-flop and in either one of the forward or backward directions, and shift the same out in parallel through the "and" gates 507 through 567 to the computer; the seven stages of the register 500 can be reconnected to serve as binary counter, and, of course, since there are seven stages this counter can operate to count up to 128 clock pulses (WG01). Of course, if higher counting figures were needed, the WG01 pulses could be subjected to further frequency division before being applied to the register.

Register 500 when operating as counter serves to provide various periods of time which are selected basically to accommodate the entire system to the fact that, first, there is, or is to be, a gap on any tape track in between two succeeding records thereon, and second, in any instance the write and read transducers are asymmetrically positioned relative to such records.

If the tape is to be stopped after, for example, reading of one record, the center in between the read and write transducers is to be in about the middle of the gap in between two records. Accordingly, the read transducer will be closer to one record than to the other in this position, and the same holds true for the write transducer. For forward reading and reverse reading different times elapse from the passage of the read head over the respective end of record and final standstill. The time difference is the read-to-write delay. When the tape starts up again thereafter, again the time until the read head is over a record will depend on the direction of tape movement; it will be earlier in case of reverse reading than a case of forward reading. Another important period of time is a limited waiting period for the computer to decide whether another record is to be written, read or erased as the case may be, or whether the tape is to be stopped. If continuation is desired, the writing is to be delayed to permit formation of a suitable gap length, and reading is to be delayed for the read logic to be disabled during most of the time that the read head passes over the gap. The total delay of disabling the read logic will be much shorter than the gap formation during writing to allow for tape speed variations. The delay periods are formed at fixed rates and increments of character clock pulses WG01.

The register 500 when operating as counter to count the pulses WG01 occurring at a fixed frequency ($=84\times$ frequency of FC) serves to provide these delay periods to be introduced in the following in detail. These delay periods are derived by coincidence gates respectively connected to selected output terminals of the register stages HR00 through HR06. The coincidence network is shown as a block 550 in FIGURE 13 which includes conventional "and" gates not shown in detail. The various delay periods will be introduced in the following by way of logic equations, and the connections follow therefrom. The figures given in the following are character periods, i.e., number of WG01 pulses.

First, there is a start gap delay $(STGD=56=HR05 \cdot HR04 \cdot HR02 \cdot HR00 \cdot WG01)$ giving a delay period to commencement of writing after the system was at rest. This includes the time it takes a tape to attain sufficient speed, particularly for writing.

The write-to-read period $(WTRD=51=HR05 \cdot HR04 \cdot HR01 \cdot HR00 \cdot WG01)$ is slightly shorter than the delay in between writing of a bit and the subsequent read check thereof carried out by the read transducer head trailing the writing transducer head at the linear distance between read and write transducer gaps.

The stop-gap-delay period $(SPGD=38=HR05 \cdot HR02 \cdot HR01 \cdot WG01)$ defines the waiting period after reading or writing of a record within which the computer has to decide whether another record is to be read or written, or whether the operation is to be terminated. Since at that time the tape runs at full speed, the length of the gap in between two records is the controlling factor for this period. However, this period must not cover the entire gap length. After this period SPGD has elapsed, the device must be capable to stop the tape, and after restarting, the end of the gap should still not appear until the tape has attained full speed again.

The stop tape delay $(SPTD=15=HR03 \cdot HR02 \cdot HR01 \cdot WG01)$ is the anticipated time it takes normally the tape to stop.

The continue write delay $(CUWD=90=HR06 \cdot HR04 \cdot HR03 \cdot HR01 \cdot WG01)$ is the principal peroid of time determining gap length in between two records during recording.

The continue read delay $(CURD=112=HR06 \cdot HR05 \cdot HR04 \cdot HR03 \cdot WG01)$ is the period of time used in between the reading of two records for disabling the read logic output during most of the time when only tape gap passes under the read head, whereby only "noise" could be detected, which is to be avoided.

Finally, the inter-head guard delay $(IHGD=75=HR06 \cdot HR03 \cdot HR01 \cdot HR00 \cdot WG01)$ is a period of time larger than the read-to-write delay and serving as safety period.

*Control switches*

Proceeding now to the description of the various control flip-flops which play a salient role for operating the inventive data transfer system and which are shown in FIGURE 14. First there is a continuation flip-flop, CUFF, which is of the set-reset type (D.C. operation) as shown in FIGURE 2C. This flip-flop provides for control if after reading or writing of a record, another record shall be read or written for counting therein. This flip-flop CUFF is, first of all, turned on as soon as the $\overline{\text{WII}}$ signal is issued by the computer. This means, that during the waiting or idle period when the system is in the CS0 state, the CUFF signal flip-flop is turned on. Accordingly, there is a set side input "or" gate 701 which responds to the $\overline{\text{WII}}$ signal.

The reset input side of the CUFF flip-flop is governed by an "or" circuit 703 having two inputs respectively connected to the outputs of two coincidence networks 704 and 705. The "and" circuit 704 responds to coincidence of CS1 state signal, i.e. during the formation of the preamble and the "and" circuit 705 responds to the CS7 state signal. A WCP1 signal is the other input for "and" circuits 704 and 705. The WCP1 pulse train is produced as soon as during the CS0 state W11 is issued by the computer. Thus, after reading or writing has commenced, the CUFF flip-flop is being turned off. Even though the WCP1 pulses do not participate by themselves during the read process, it will, however, be observed that all state changes are synchronized to the WG01 pulses, and a WCP1 signal follows half a bit length later in time. Thus, the CUFF flip-flop will be turned off after about the first half of the first bit has been read.

Another signal serving to turn the CUFF flip-flop on is developed during the CS5 state. The CS5 or gap operational state of the data transfer system is a period during which the computer has to decide whether the operation is to be continued, or whether the shutdown sequence is to be initiated, regardless of whether it is a reading or a writing operation. This means that during this period as defined by the CS5 state, the CUFF flip-flop must receive the setting signal for the system to continue operation. Therefore during the CS5 state the computer must issue a command signal STRT for turning the CUFF flip-flop on. The "and" circuit 702 responds to the CS5 state signal and the STRT signal issued from the computer for this purpose. Since continuation of operation means a changeover to states CS1 or CS7, the CUFF flip-flop will then be turned off again. As will be explained below, when flip-flop CUFF is set during state CS5, this will cause a changeover to states CS1 or CS7 as the case may be (writing or reading).

The next flip-flop of importance is the read enable flip-flop CERF. The purpose of this flip-flop is to govern the read logic enabling autonomous operation thereof during read as well as during write operations, since during write operation a read after write check is to be carried out.

The read enable flip-flop is always turned off at operative decoupling of the system from the computer due to a $\overline{\text{WII}}$ signal. In case of writing, the enable flip-flop CERF will be turned on directly via "or" circuit 711 at the beginning of formation of the preamble for preparing the read logic to the read after write check.

It is a significant aspect of the system, that the read enable flip-flop CERF is also enabled during tape erasing which is a program sequence following closely that of the write program sequence. In case of forward erasing, this provides for a running check of completeness of erasing since the read logic should produce a gap signal if the tape or a portion thereof is properly erased. Reverse erasing is usually carried out after a faulty recording. The read after write check may have revealed an error of the type outlined above (parity error, data gap, etc.). In this case, the computer will stop issuing data, and cause the tape to stop for reversal and now the faulty record is reversed. To permit accurate metering of this record to be erased, the read logic is enabled to monitor the overall envelope of record, and particularly its beginning and end. Thus, the read enable flip-flop enables the read logic also during erasing.

The read logic is also to be turned on for the read operation itself, so that another "and" circuit 711 responds to the CS7 state signal. Additionally, the enabling is desired only if a CUFF signal is true at the beginning of the CS7 state, which is the case if reading is either to be initiated or to be continued. The "and" circuit 711 feeds the second input for "or" circuit 712 governing the input set side of the CERF flip-flop.

The flip-flop CERF can be turned off as stated by the $\overline{\text{WII}}$ signal when the computer decouples itself from the system. The CERF flip-flop will be turned off also upon occurrence of a gap during reading or writing. This is monitored by an "and" circuit 715. It is desirable to turn the read enable flip-flop off when there is a true gap as well as a data gap. Accordingly, gate 713 responds to this situation: $RG \cdot (RSD + RSF)$ (see FIGURE 6). Gate 713 requires additionally that the CUFF flip-flop is in the off state and that the operational state is either CS7 or CS4. Normally, the coincidence of these signals will be completed at the moment of gap detection, so that, subsequent to the reading of the postamble, the CERF flip-flop is turned off.

In summary, the read enable flip-flop CERF is on during reading proper, and during erasing and for the read after write check during writing, and is turned off at gap detection subsequent to any reading.

The next flip-flop to be considered is the reverse monitor flip-flop C12M bearing its name from the fact that a tape reversing command is issued by a computer outlet generally designated with C12. The tape reverse monitor flip-flop is, therefore, being turned on by a C12 signal derived from the computer. Of course, the turning on is of interest only if a start signal has in fact been issued by the computer, and this signal could issue only during the start state when the CS0 state signal is in existence. Accordingly, there is provided an "and" circuit 720 responding to a CS0, STRT and C12 coincidence.

The reverse monitor flip-flop C12M is turned off by a CS6 state signal, i.e., when the inventive data transfer system is shifted into stop state. Once flip-flop C12M has been turned on, an entire operational sequence will be carried out in the reverse mode. Tape reversal for any other mode of operation requires the passage of the system through the stop state CS6. Flip flops CERF and C12M are both of the D.C. type (FIGURE 2C).

The central control relay is a multipurpose external clock flip-flop CECF. It is of the j-K type and governs primarily the duration of different control actions during almost every one of the several states of operation. Two "or" circuits 730 and 760 respectively govern enabling and disabling input sides of the CECF flip-flop which is clocked by the fast FC clock pulses.

During the CS0 start state, the flip-flop CECF is enabled (j-input) after the tape has properly started as monitored by a ready signal suitably developed either by the computer or by the data transfer system as a result of ready tests or testing inquiries issued by the computer to determine whether the data transfer system is ready for operation or the tape has started to run. The turning on of flip-flop CECF during the CS0 state marks the end of the idle period.

Looking at FIGURE 9, one can see that this turning on of flip-flop CECF results in production of the gating signal CSG so that from that moment on the bit clock pulse trains WCP0 and WCP1, as well as the character clock pulse train WG01 are being provided continuously. These pulses WG01 are being counted by register 500 when operating as binary counter during CS0 state (see gate 576—FIGURE 12). Counting thus commences when CECF is turned on during the CS0 state. The turning off or disabling of the CECF flip-flop concurs with the changeover into the read state (infra), CS7, when a reading sequence is carried out. Accordingly, there are provided two "and"

circuits 761 and 762 responding to coincidence of C12M, $\overline{W9}$ and CS0, or to the coincidence between state signal CS0 and delay signal IHGD explained above. The two "and" circuits 761 and 762 respectively provide signals at the instance of CS0–CS7 changeover in case of reverse or of forward reading. They feed an "or" circuit 763 governing one input of the "or" circuit 760 for disabling the CECF flip-flop. Additionally, there is provided an input at "and" circuit 761 to receive the WG01 signal for purposes of strobing. No such strobing is needed for gate 762 since IHGD is strobed by WG01 already (supra).

In case of a write or erase sequence, the system is shifted into preamble formation state CS1 with the CECF flip-flop still being on. As a result thereof, there is coincidence at "and" circuit 583 in FIGURE 12 while no enabling input is applied to any of the register stages HR00 etc. so that in effect the FC pulses are then applied to the "and" circuit 583, from there through the "or" circuit 580 and through any of the "or" circuits 506 to 566 to clear the register 500 from any previous counting. Concurrently, the CECF signal participates in the formation of the preamble (see gate 441 in FIGURE 9 and FIGURE 11). After the first half of the CS1 state has elapsed, the next WG01 signal (in the middle of the preamble formation period) turns the CECF flip-flop off. The turning off of the CECF flip-flop during the CS1 state by a character clock signal WG01 is provided by the "and" circuit 764 feeding one input terminal of the "or" circuit 760. This permits formation of a zero to be gated by the "and" circuit 441 into the write flip-flop. Thus, during preamble formation, the CECF flip-flop permits distinction between the two character periods for gating the bit zero at the end of the second character period. An "and" circuit 732 opened by a CS13 state signal causes the next WG01 pulse to turn flip-flop CECF on again. This marks also the end of the preamble formation period and the change over to the write state during normal write (or erase forward) operation.

It was said above repeatedly, that the preamble formation CS1 lasts for two character periods (WG01) and it is apparent that these two character periods are metered by the CECF flip-flop. An exception from this rule is an erase reverse routine marked by a $W10 \cdot C12M$ coincidence. It is important that such erasing covers the record to be erased and will not leave a portion thereof unerased. The computer meters the erasing by issuing the same amount of characters as in the record to be erased. The computer will issue data only when the system is in the CS2 state regardless whether the data are recorded or are issued merely for metering the length of the record to be erased. The erasing is metered by the system in delaying the shifting thereof from state CS1 into the CS2 state until the now leading read head has detected the beginning of the record to be erased. The delay is not controlled by postamble detection, since one cannot presume that the postamble is correctly recorded which may not be the case. The read logic is enabled (see CERF supra) and the RG signal is true as long as no data enter the range of the read transducer. Any seven succeeding characters read cause the RG signal to vanish.

The CECF flip-flop is turned off as usual after one character period (WG01) during the CS1 state (gate 764). However, in case of erase reverse CECF is turned on again immediately by the RG signal provided C12M (reverse) and W10 (erase) signals are true which is monitored at the gate 739. This prevents the system from leaving the CS1 state since, as will be explained below, the changeover from CS1 to CS2 requires existence of an $\overline{CECF}$ signal at the moment of production of a WG01 pulse. The $\overline{CECF} \cdot WG01$ coincidence cannot occur as long as during the erase reverse the gap signal RG is in existence. If seven characters have passed the read head at the normal rate, the RG signal vanishes, the output of gate 739 becomes false and the next WG01 signal will then turn the flip-flop CECF off to terminate the extended CS1 state.

In any event, at the end of the CS1 state whether extended or not, flip-flop CECF is turned on again via gate 732.

At the beginning of the write operation marked by state signal CS2, the CECF flip-flop is initially enabled and on. This results in the first production of an SPG gating signal (FIGURE 12) permitting parallel loading of the register 500 by a character provided by the computer. The very next FC pulse clocks this character into the register stages through gates 583–580. The CECF flip-flop is disabled during the state of operation at the issuance of each $\overline{W6}$, signal from the computer acknowledging the supply of a character (seven bits—parallel) as provided to the lines C1 through C7 (FIGURE 12). The "and" gate 767 provides for this disabling or resetting of flip-flop CECF. When flip-flop CECF is turned off after reception of an acknowledging signal W6, the "and" circuit 571 in FIGURE 12 provides the shift forward gating signal SFG, whereupon the register 500 is emptied by forward shifting. Clocking occurs through gates 581 and 580 with WCP0 serving as clock pulses (supra). It will be recalled, that the reset output side of the stage HR00 is connected through the "and" circuit 442 to the write flip-flop. Thus, as long as flip-flop CECF is off, the bits previously loaded into the register 500 are now shifted serially out of the register 500 and into the write flip-flop WF.

The next character clock pulse WG01 concurs with the end of the first serially written character and is used to turn flip-flop CECF on again via gate 733. This causes again the parallel input gates of the register 500 to open and the register is reloaded. Clocking for loading is again provided through gates 583–580. The alternation in between loading in parallel and shifting in serial is thus controlled by the turning on and off of the flip-flop CECF in strict synchronism with the character rate signal WG01. The turning on period of the CECF flip-flop determines the loading period of the input of the multipurpose register which is to be shorter than the time from a WG01 pulse to the next WCP0 signal which is a bit length. The time during which flip-flop CECF is off determines the serial shifting of the content of the register into the write flip-flop WF at the rate of WCP0 pulses.

No overlap of the loading and serial shifting occurs since the respective last WCP0 pulse (whether needed or not) of altogether seven bit defining pulses concurs with a WG01 signal, and the reloading of register 500 is completed prior to the occurrence of the respective next WCP0 pulse. The pulse sequence can readily be seen from FIGURE 11.

A gate 770 provided for a signal coincidence CECF·W5 (CS2+CS7) as call signal for the computer to provide a character to lines C1 to C7 during writing or erasing (state —CS2), or to accept a character during reading (CS7). Particularly during writing, the signal CECF when true causes production of SPG so that the register 500 is prepared indeed for parallel shifting, i.e., loading.

In summary, during writing the CECF flip-flop provides for the proper alternation between the driving of a character in parallel from the computer and shifting it serially into the write logic.

At the beginning of the postamble formation period, state CS3, the flip-flop CECF is turned on via gate 733 and by the same WG01 signal, which strobed the change over from CS2 to CS3 states. The CECF signal opens "and" gate 443 (FIGURE 9) for a zero bit during a specific count state of the write synchronizer, and this "zero" is then followed by a series of "ones." With the next WG01 pulse, i.e., before completion of the writing of the postamble, the CECF flip-flop is again being disabled via "and" gate 764. While CECF is true during the first half of the CS3 state, no input signals are being applied to any of the gating terminals of the multipurpose register stages 500. The CECF signal when false prevents the writing of another zero when the same synchronizer count state is repeated during the second character cycle of the postamble formation period. When CECF is on, a register erase clocking is attained as described above, i.e., through the elements 580, 583, and 506 through 566, to clear the register 500 from the last character written.

During the CS4 operational state the purpose of the flip-flop CECF is a different one. The same is true for the states CS5 and CS6. The system enters the state CS4 (from CS7), and states CS5 and CS6 with the flip-flop CECF being on. In either one of these states the flip-flop CECF is disabled via gates 765 and 766 at occurrence of the very next WCP1 pulse. During either of these short periods when CECF is true, the register 500 is erased by fast pulses FC. Thereafter, the flip-flop CECF stays off throughout the remainder of states CS4, CS5, CS6. It can be turned on only subsequent to the elapse of the various time intervals such as WRTD, IHGD, SPGD, CUWD and CURD.

The enabling of the CECF flip-flop subsequent to either one of these delay periods concurs with the transition into a different operation state, and is controlled by the "and"—"or" arrangements 734, 735. These networks produce enabling pulses for the CECF flip-flop in response to coincidence of signals:

$$CS4 \cdot \overline{CRF} \cdot WTRD, \text{ or } CS4 \cdot IHGD, \text{ or } CS5 \cdot CUFF \cdot SPGD,$$
$$\text{or } CS5 \cdot W9 \cdot CUFF \cdot CUWD$$

As will be explained below, these signals also cause the change over from state CS4 to the states CS5 or CS6, or a change over from CS5 to CS1 or CS6. In any event at the beginning of states CS1, CS5 or CS6 marked by these different counting periods there is a counting result in the register 500. In either one of the situations the CECF flip-flop will be enabled to cause the clearing of any content in register 500 through the arrangement of gates 580, 583, and 506 through 566. At the beginning of the CS4 state there still might be a character in register 500 to be erased also. To terminate this clearing of register 500, the clock flip-flop CECF will respectively be turned off by the next succeeding WG01 signal when in the state CS1 (at first participating also at preamble formation), or by the next following WCP1 signal when in the state CS4, CS5 or CS6. The network 765 and 766 in FIGURE 14 already mentioned above provide signals to be fed through the "or" gate 760 to the disabling input of flip-flop CECF accordingly.

For purposes of completion it should be mentioned that at the time of a CS0–CS7 state changeover for reading, there is also a counting result in register 500. But in case of reading, the very first step is the serial shifting of the first true character read, into register 500, whereby any previous content thereof is automatically removed.

Since the states CS4, CS5, CS6 are states in which delay time intervals are being formed by operating the register 500 as a counter, the clock CECF flip-flop thus operates during these states only at the very beginning as preparatory instrument to erase the register 500 prior to the commencement of counting. Since counting occurs at the rate of the production of the character register pulses WG01, the enabling of erasing of the register 500 is long terminated by a WCP1 pulse (turning CECF off) and occurring relatively long before the first pulse WG01 to be connected.

The CECF flip-flop participates also in the read operation in state CS7. Flip-flop CECF here does not have to clear the register 500 since the first character read is serially shifted into the register which, in effect, causes sequential erasing of any prior content of register 500. In FIGURE 12 is shown that in the state CS7 either one of the "and" gates 571 or 575 is to produce a shift forward or a shift reverse pulse. This depends on the direction of tape movement, i.e., whether the tape reading is had in forward or in reverse direction identified by the output signals $\overline{C12M}$ or by C12M. In either case, the flip-flop CEFC when disabled provides for the shift forward or the shift reverse gating signals thereby enabling the serial shifting of the register 500.

During its on state the CECF output participates directly in the clocking of the transfer of a previously read character in parallel by bit format into the computer input channels C1 through C7. For such read operation in either direction CECF flip-flop is turned on directly by the read character clock pulses RCP pulse applied to an "and" circuit 736 gated open by the status signal CS7, and the coincidence output of "and" circuit 736 is passed through the "or" circuit 737 to the "or" circuit 730 to enable the flip-flop CECF. This has no direct effect on register operation but serves to signal to the computer that loading of the register 500 with all the bits of a character serially read from the tape has been completed. During reading, there is a continuous, serial shifting of bits into the register 500, but only at the instance marked by a pulse RCP, a complete character is in proper format in the register 500. To signal this instance, flip-flop CECF is turned on by each RCP pulse and the gate 770 signals this to the computer.

The CECF flip-flop is disabled any time the computer acknowledges a character which is done by the computer output W6, here gated by the CS27 state signal, since this type of operation is similar for reading and writing.

At termination of reading, it will be recalled, that the CERF flip-flop is turned off, which signals a change over from the state CS7 to either state CS4 or state CS5 (see FIGURE 1A); the particular change over depends on the direction of reading. The "and" circuit 738 responds to the coincidence of the CS7 $\overline{CERF}$ and WG01 signals to turn the CECF flip-flop on again. Immediately thereafter, the transfer system will be in the state CS4 or state CS5. In both states erasing occurs through the gates 583 and 580 and the individual gates 506 through 566 by the fast pulses FC to erase any content of the register 500 as aforedescribed.

It, therefore appears that the clocking flip-flop CECF controls the loading and unloading of the register 500 during reading and writing. During the CS1 and CS3 states the flip-flop participates in the formation of the zero in the post and preambles, and in the other states the CEF flip-flop causes erasure of any content in the register 500, prior to employment thereof as counter.

*State counter*

All these components and logic networks described above perform specific functions and subroutine programs in response to state signals CS0 to CS7. Such programs are initiated with production of such state signals, while termination of a subroutine program requires a changeover to a different operational state. In the following a state counter 600 (FIGURE 13) will be described which co-ordinates the various components and logic networks. The output circuit of the state counter maintains specific states thereby providing the state signals CS0 to CS7 for as long as needed. The input network for the state counter governs the state changes. Basically it is possible to change from any operational state to any other state by appropriately actuating selected state counter elements so that any number of programs can be provided by selecting sequences of states accordingly. However, only specific program sequences are desired so that the input circuit network for the state counter permits only specified sequences of states. The state counter 600 is comprised of three flip-flops CSA, CSB and CSC of the j-K type (FIGURE 2B). These three flip-flops by way of combinations of set and reset states define altogether eight different states which are briefly defined in the following.

The CS0 state is the idle and start state into which the system of the invention is placed prior to any actual operation. This state will be defined logically by $\overline{CSA}$, $\overline{CSB}$, $\overline{CSC}$, i.e., all three state counter flip-flops are turned off.

The preamble formation state, CS1, is defined by the combination $\overline{CSA}$, $\overline{CSB}$, CSC. The next state is the CS2 or write state during which information is being written onto the particular tape track then coupled to the unit. This state is defined by the combination $\overline{CSA}$, CSB, $\overline{CSC}$. The postamble formation state, CS3, is defined by the combination $\overline{CSA}$, CSB, CSC. The operational state CS4 is the read to write delay state during which the register 500 is operated as a counter to define various time intervals resulting from the fact that the read and write heads have different positions relative to the tape. CS4 is defined by CSA, $\overline{CSB}$, $\overline{CSC}$. The gap state CS5 is defined by CSA, $\overline{CSB}$, CSC and determines operational time delays due to the fact that two records are always separated by a gap. The next state is the CS6 or stop state defined by the combination CSA, CSB, $\overline{CSC}$ and serves to provide the shutdown sequence for purposes of stopping the tape unit and decoupling the system from the computer. The next and last state is a read state CS7 defined by the combination CSA, CSB and CSC, and the inventive system is in this state for as long as a record is being read.

The right hand side of FIGURE 13 illustrates as the output circuit of the state counter 600 a set of "and" gates having their input terminals respectively connected to particular combinations of set or reset output sides of the flip-flops CSA, CSB and CSC, and each of these "and" gates provides a signal indicative of the presence or absence of the operational states. These "and" gates, therefore, provide for the CS0, CS1, CS2, CS3, CS4, CS5, CS6 and CS7 state signals each indicating the existence of the above defined states. These "and" gates are the state signal sources connected to the various input terminals as defined above. During operation the inventive system is always in one of these states, but in only one thereof at a time. Even when the system is completely decoupled from the computer (but power being applied) the system is in CS0 state.

There are provided further three "or" gates respectively connected to produce signals indicating that the system is in state CS0 or state CS4; this serves as the CS04 signal. Another "or" gate provides the CS27 signal as an indication that the system is either in the reading or in the writing state and the third "or" circuit provides a CS56 signal as an indication that the system is either in the gap or shutdown states. A two input "and" gate is connected to receive $\overline{CSA}$ and CSC signals to provide in effect a CS13 signal as indication that the system is in the preamble or postamble formation states of operation. These combination signals are used in the inventive system in case similar operations are to be introduced for two states. This, however, does not negate the fact that the inventive system is always in but one state, and that during operation, the termination of one state is always accompanied by the shifting of the system to another state. Thus, only some operational steps are, for example, similar during reading and writing. The program of operation to be performed is always determined by the particular sequence of states as stated above.

The flip-flops CSA, CSB and CSC are respectively set by a variety of different signals which fact is symbolically illustrated by "or" gates 604, 605, and 606. These three flip-flops are also reset by different signals, and this is illustrated by "or" gates 601, 602 and 603. The state counter input circuit is primarily composed of "and" gates combining composite command and status signals of the data transfer system itself to determine the change over from state to a specific other state by appropriately actuating some or all of the stages of the counter 600.

Some of the input signals for setting and resetting of the state counter flip-flops CSA, CSB and CSC are determined by the flip-flop type switches which have been explained with reference to FIGURE 14. Particular time delay periods outlined above are derived from the register 500 when operated as binary counter so as to determine In several instances the time for change over from one operational state to another independent from completion of operational steps. Additionally, signals are drawn from the computer as an indication of what type of operation the computer desires. The actuation, either setting or resetting, of either one or several of the flip-flops CSA, CSB and CSC always determines the change over from one operational state to another one. The actuation of all these flip-flops is clocked by the write character pulses WG01. It was mentioned above, that the write character clock train WG01 synchronizes the entire operation. This is done by clocking the state counter flip-flops with the WG01 signals. The input circuits for the state counter flip-flops CSA, CSB and CSC are described hereinafter in terms of change overs from one state to another state, because in case more than one flip-flop is concerned for such change of states, the input signals will be similar accordingly.

In order to shift the state counter into the CS0 state it is required that all the flip-flops CSA, CSB and CSC are being turned off. This is being done by the $\overline{WII}$ signal indicating decoupling of the unit from the computer. Thus, normally the inventive transfer system will be in the CS0 state. Accordingly the "or" circuits 601, 602 and 603 each have an input terminal connected to respond to the computer issued signal $\overline{WII}$.

For a change over from state CS0 to state CS1, only the flip-flop CSC is involved, and such change over will occur only for a writing sequence requiring that the computer issues a signal W9 as an indication that the computer will issue data. For this reason the first input terminal of "or" circuit 606 is connected to the output side of an "and" circuit 607 having three inputs, one of which is connected to the W9 output line of the computer. The second input of "and" circuit 607 responds to the STGD delay signal derived from the multipurpose register 500 when operated as a binary counter in state CS0. The STGD period is provided to permit the tape drive to attain full speed before writing may commence. As was explained above, the counting is started when the tape starts (see CECF flip-flop). The CS0 signal serves to limit response of "and" gate 607 to the situation of a $CS0 \rightarrow CS1$ changeover.

Operational state CS1, however, can also be attained from state CS5 which is defined by the combination CSA, $\overline{CSB}$ and CSC. Thus, to shift the counter 600 from state CS5 to state CS1 it is merely necessary to turn off the flip-flop CSA. This situation arises if after a record has been written, another one is to be written. Accordingly, the "or" circuit 601 has a second input connected to an "and" circuit 608 responding to coincidence of four signals. One is the W9 signal as an indication that the computer still intends to issue data to continue the writing sequence. The second input of "and" circuit 608 is the CUFF signal derived from flip-flop of similar name, which is being turned on (supra) whenever a continued writing procedure is desired, i.e., after a record comprised of a plurality of characters has been written on the tape, the computer may desire continuation of writing on the tape in which case the flip-flop CUFF is being turned on during the CS5 state and this fact is signaled to the "and" circuit 608. The third signal for the "and" signal 608 is a delay signal CUWD derived from the register 500 when operating as binary counter which is the case during CS5 operation. CUWD signals in effect the end of the delay period during which the tape runs at full speed, without writing. This period CUWD thus determines the gap length. After CUWD period has expired, the system is shifted into the CS1 state for preamble formation of the next record to be written. The fourth input of "and" gate 608 is the state signal CS5 thus permitting response of gate 608 only for $CS5 \rightarrow CS1$ change over. Normally the system stays in CS1 state for two character periods, erase reverse being the exception.

The change over from state CS1 to state CS2 requires participation of two state counter flip-flops. The flip-flop CSB has to be turned on and flip-flop CSC has to be turned off. During the preamble formation period, the CECF flip-flop is turned off for gating the zero bit into the write flip-flop. The next WG01 pulse is to terminate the CS1 state. Accordingly, the set side input of flip-flop CSB ("or" circuit 605) and the reset side input of flip-flop CSC ("or" circuit 603) are connected to respond to a coincidence of the $\overline{CECF}$ signals and of the CS1 state signal, so that the $\overline{CECF}$ can here provide only this particular change over: $CS1 \to CS2$. A change over proper from state CS1 to CS2 is, of course, attained at the next WG01 signal. No other change over into CS2 state is permitted.

A change over from state CS2 to state CS3 requires a turning on of flip-flop CSC. This situation is basically computer controlled by way of a W5 signal derived from the computer and fed to one input terminal of the "or" circuit 606 via a gate. This gate is prepared by the CS2 state 606 signal to turn the flip-flop CSC on as soon as the computer decides (W5) that no further data will be provided to the input terminals C1 through C7 (FIGURE 12). As stated above, during the state CS3 the inventive system forms and writes the postamble, during two character periods.

The state CS4 (read-to-write delay) can be reached by several ways. In one way, it can be the result of the completion of the formation of the postamble, i.e., state CS4 can be reached by a change over from the state CS3 after the system was for two character periods in state CS3 for postamble formation. Alternatively, the state CS4 can be reached from the state CS7, i.e., after the read state. A change over from the state CS3 to the state CS4 requires reversal of the state of all flip-flops CSA, CSB and CSC; particularly, the flip-flop CSA has to be turned on while the flip-flops CSB and CSC have to be turned off. Alternatively, when the change over results from the state CS7 (reading) the two flip-flops CSB and CSC have to be turned off.

The change over from the state CS3 to state CS4 is possible in two cases. Either there is no erasing in progress ($\overline{W10}$ being true) or there is a reverse erasing. Reverse operation always find C12M as being true. The postamble formation (CS3 state) requires the participation of the CECF signal, and the completion of postamble formation requires a turning off of this flip-flop CECF. This holds true regardless of whether there is erasing or writing. Accordingly, the state counter will be affected by a signal which is logical $\overline{CECF}(\overline{W10}+C12M) \cdot CS3$.

The complete logic, however, influences only the CSC flip-flop; the other flip-flops are simply influenced by the $\overline{CECF}$ and CS3 signals. The "or" circuit 604 at set side input of the CSA flip-flop and the "or" circuit 602 governing the reset input side of flip-flop CSB only responds to the CS3 and $\overline{CECF}$ signals. This simplification is permissible since the other possibility of a changeover is that from states CS3 to CS5, which will be discussed below. Flip-flops CSA and CSB are in similar states during CS4 and CS5 operational states and the distinction between $CS3 \to CS4$ or $CS3 \to CS5$ thus involves only the CSC flip-flop, which alone is, therefore, to be affected by the logic $\overline{CECF}(\overline{W10}+C12M)$, specifically determining the specific $CS3 \to CS4$ state changeover. Accordingly there are provided two "and" gates 610 and 611, each one having one input terminal connected to respond to the $\overline{CECF}$ signal, while the respective other input terminals of the two "and" gates 610 and 611 respond to the $\overline{W10}$ and to the C12M signals. The two outputs of gates 610 and 611 are combined in an "or" gate, and the output thereof is combined with an "and" gate receiving the CS3 signal for gating.

The other changeover into the state CS4 is from the state CS7 at the end of reading and requires the turning off of both flip-flops CSB and CSC. The principal element for any changeover out of state CS7 is the turning off of enable read flip-flop CERF. This flip-flop is kept on throughout any kind of reading process as aforedescribed until a gap is detected. A turning off of flip-flop CERF signals the termination of the reading of a record so that a changeover from CS7 to CS4 is signaled thereby. Accordingly, the reset input sides of both flip-flops CSB and CSC correspond to a $\overline{CERF}$ and a CS7 signal. However, coincidence with a C12M signal is needed, since this changeover shall occur only upon reverse running of the tape. Accordingly, an "and" circuit 612 responds to the coincidence of $\overline{CERF}$ and C12M signals to feed another input terminal of "or" circuits 603 governing the input reset side of flip-flop CSC, CS7, of course, serving as gating signal. The flip-flop CSB is directly reset by $\overline{CERF}$ and CS7 signals applied to a gate 602' feeding another input terminal of the "or" circuit 602, because the only other change over from CS7 state is into CS5 which is defined by the same state of CSB flip-flop, and the distinction between CS7, CS4 and CS7, CS5 involves only the CSC flip-flop.

In the state CS4 the tape runs at full speed. When entering state CS4 from CS3 during writing, the trailing read head is still over the data which have just been written but which are still to be checked for errors. After backwards reading in state CS7, the system enters state CS4 when the write head then trailing is still over data. In both cases removal of the respectively trailing head from data requires equal delays because of the constant distance between read and write heads. Thus, the above defined signal WTRD defines the minimum period of time for maintaining the system in the CS4 state. The change over from state CS4 to state CS5 requires only the turning on of the flip-flop CSC. This change over occurs either during a read reverse sequence or during a write sequence as stated. During the CS4 state the counter register 500 counts WG01 pulses up to the write to read delay time interval permitting passage of tape not quite as long as the distance between write and read heads. At the end of this time the WTRD signal is developed.

Specifically during reverse read operations the change over from CS4 to CS5 is controlled by a $\overline{W9}WTRD$ coincidence established at an "and" gate 617 providing an input for an "or" circuit 606' which governs one input of the gate 606 at the set side input of flip-flop CSC. There is an "and" gate interposed to restrict signal transmission from gate 606' to gate 606 to the CS4 state.

During a write sequence carried out always in forward direction, a similar time delay WTRD is to be waited out and soon thereafter the read enable flip-flop CERF will be turned off at the end of the read after write check. Since during writing the W9 signal is true, another input for "or" circuit 606' is provided by an "and" circuit 613 establishing a coincidence between a W9 signal, the same WTRD signal and the $\overline{CERF}$ signal.

Another change over situation from CS4 to CS5 is enforced, provided no erasing routine is carried out as indicated by a $\overline{W10}$ signal. Here the waiting period is IHGD which is longer than the period signaled by the WRTD period. Thus, in case the tape runs very slow, the system is shifted into the CS5 state regardless of whether or not the respective trailing head has cleared the data. This is a safety measure to prevent the system from staying in CS4 too long, for example, if the end of a record has been missed. Coincidence for this signal combination is provided at an "and" circuit 614 feeding a third input terminal of "or" circuit 606'.

An alternative change over into the state CS5 is possible during forward read operation in state CS7. During forward reading, the reading is terminated by definition only when the trailing reading head has cleared the data, so that the WTRD period specifically provided in the CS4 state does not enter into the sequence of operational delays. After completion of forward reading, which is established by a $\overline{CERF} \cdot \overline{C12M}$ coincidence, it is merely required to turn the flip-flop CSB off to provide the change over $CS7 \to CS5$. Only the $\overline{CERF}$ and CS7 signals are actually needed, since for any change out of state CS7, flip-flop CSB is being turned off anyway, which was described above with reference to gate 602'.

The changeover into the state CS6 provided for carrying out the stop sequence, can be carried either by a changeover from state CS5 to state CS6 or by a changeover from state CS4 to CS6.

The changeover from CS5 to CS6 requires the turning on of flip-flop CSB and turning off of flip-flop CSC by logically similar signals. The changeover from CS5 to CS6 occurs after a delay of maintaining the state CS5 for a period of time measured by countng to provide the SPGD output signal. This is a waiting period during which the computer has to decide whether the particular operation then carried out is to continue or not. The continuation is signaled by turning on of the continue flip-flop CUFF during the CS5 state. If no such continued signal was issued by the computer during the CS5 state and after the count state SPGD has been reached, the stop sequence is to be initiated. Thus, there will occur a changeover from CS5 to CS6 upon coincidence of a $\overline{CUFF}$ signal and the SPGD signal. Accordingly there is provided an "and" circuit 616 responding to a $\overline{CUFF} \cdot SPGD \cdot CS5$ coincidence. The output of gate 616 is respectively fed to the "or" circuit 605 governing the input set side of flip-flop CSB, and the same signal is fed to one input terminal of "or" circuit 603 governing the reset input side of flip-flop CSC.

The alternative shifting into the state CS6 occurs during reverse erasing operation, and there is a changeover from state CS4 to state CS6 which requires only a turning on of the flip-flop CSB. This means that erase reverse will never be continued after erasing of a record. Accordingly, there is provided an "and" circuit 618 which responds to the coincidence of the CS4, the IHGD and the W10 signals to feed a signal to one input terminal of "or" circuit 605 governing, as stated above, the input set side of flip-flop CSB.

The state CS7 which is the read state can be attained either from the state CS0 or from the state CS5. The changeover from CS0 to CS7 occurs at the beginning of a read operation, and the changeover from CS5 to CS7 occurs for continuation of the read operation, after a record has been read and the computer has decided that reading is to be continued.

The changeover from CS0 to CS7 is carried out by turning on all of the flip-flops CSA, CSB and CSC. Two types of reading operations are of interest. One is the forward and one is the reverse read operation. Prior to commencement of such read operations the write head is fairly closely positioned to the beginning of a record and still somewhat apart therefrom, the read head trailing during forward reading, is additionally spaced apart from the beginning of such record to be read by the distance between the read and write heads. Thus, after tape starting in forward direction, there is a delay period slightly larger than the distance required for a tape to travel to cover the space in between read and write heads, before the read head actually reaches data to be read. Accordingly the changeover from CS0 to CS7 from the stop to the read states is in effect to be delayed to prevent extensive "gap" reading. The time interval IHGD serves for this delay. Register 500 counts up to this delay signal period. Accordingly, all of the flip-flops CSA, CSB and CSC are being turned on by the IHGD signal, so that "or" circuits 604, 605 and 606 each receive the $IHGD \cdot CS0$ coincidence signal.

The situation is different in case of a reverse read operation, in which this particular delay is not needed because, then the read head is already at relatively close to the beginning of the record to be read. Therefore, the changeover from CS0 to CS7 can be carried out immediately upon issuance of the $\overline{W9}$ signal, and upon vertification by the tape reverse monitoring flip-flop C12M. Accordingly, all of the flip-flops CSA, CSB and CSC can also be turned on by coincidence signals of $\overline{W9}$ and C12M. This coincidence signal is provided by the "and" circuit 609 receiving also the CS0 signal and providing an output to one input terminal each of the "or" circuits 604, 605, and 606 respectively governing the input set side of the three state counter flip-flops.

The third and fourth way of shifting the system into state CS7 occurs, as was said above, after the computer has made a decision that reading is to be continued. In these cases the device was maintained in the gap, i.e. the CS5 state, but forward and reverse reading require different periods of time before reading can continue. In case of forward reading, the gap state is maintained for the time period CURD which is the longest period of time as provided by the register 500 when operated as binary counter. Of course the continue flip-flop CUFF would have to be turned on prior to the elapse of the SPGD time interval, because otherwise there would have occurred a changeover from CS5 to CS6. However, if one presumes that prior to elapse of SPGD time the flip-flop CUFF was turned on, now the changeover from CS5 to CS7 occurs upon coincidence of the issuance of the CURD signal at CUFF being true. The changeover from CS5 to CS7 requires merely a turning on of flip-flop CSB and accordingly there is provided an "and" circuit 619 responding to coincidence of the CURD signal and the CUFF true, signal and feeding its output to one input terminal of the "or" circuit 605' governing one input of set side "or" gate 605 for input CSB. Of course, an "and" gate for providing the CS5 signal for gating is interposed in the connection of gates 605' and 605.

During reverse reading, the period of time CURD is too long, because during reverse reading there was already a waiting period WTRD (state CS4) for the trailing write head to clear the record just read. Thus, reverse reading is continued after a gap state for only the shorter period SPGD. The delay times SPGD and WTRD together are almost equal to the delay CURD. Thus, a changeover from CS5 to CS7 will occur at $CUFF \cdot \overline{W9} \cdot C12M \cdot SPGD$, turning on flip-flop CSB via "and" gate 620 feeding its output to "or" gate 605'.

Finally, a changeover from CS6 to CS0 will occur only when the computer turned off the W11 signal, thereby temporarily decoupling the inventive tape control unit from the computer, which automatically places the unit into the CS0 idle state, then awaiting the starting signal from the computer. This completes the description of the data counter logic 600.

The state counter 600 permits several of the system elements, particularly the stages of register 500 and switch CECF to perform functions during any state entirely independent from any other function they perform during any other state. The register stages 500 do not participate during preamble and postamble formation, but otherwise these elements participate in subroutines during every state.

*Operation summary*

A summary of several modes of operation will be described hereinafter. At first a normal read operation, either in forward or in reverse direction shall be outlined. Initially, of course, the data transfer system is in the CS0 state, awaiting a start command signal such as the W11 signal for coupling the data transfer system to the computer. A ready signal from the tape unit will turn the CECF flip-flop on for the first time, to provide for the CGS gating signal enabling the write clock flip-flops shown in FIGURE 9 (WCA, WCB, WCC and WCD), and as a result thereof, the formation of the character sync pulses WG01 commences.

Assuming that no C12 pulse (reverse command) was received to turn on the reverse monitor flip-flop C12M, forward motion of the tape is presumed. Also, the computer will have selected a particular track so that but one of the read gates 205 to 208 in FIGURES 1, 3 are open. The CS0 state signal as resulting from the turned off state counter flip-flops produces count binary gating signal CBG, and the stages of register 500 are interconnected to operate as counter and to count the WG01 pulses as soon as produced.

After reaching a predetermined count IHGD, the read head is now near the beginning of a record since the tape has already started to run at the STRT pulse. The formation of the IHGD pulse signals a changeover to the state CS7 by turning on all of the state counter flip-flops CSA, CSB and CSC (see *IHGD·CS0* input for "or" gates 604, 605, 606). This changeover into the state CS7 immediately enables the read enable flip-flop CERF (FIGURE 14) through the open gate 711 and the "or" circuit 712, since the CUFF flip-flop was turned on by the $\overline{WII}$ decoupling signal when the system was shifted into the CS0 state.

The CERF flip-flop enables the RSF1 and RSF2 flip-flops shown in FIGURE 3, and read signals will be produced. The read decoder operates as aforedescribed particularly with reference to FIGURES 3, 4, and 5. The state of read flip-flop RF for each read clock pulse RC produces the distinction between binary quantities "one" and "zero." A running check for a data gap is carried out by the input circuit of gate 250. The read synchronizer (FIG. 6) first detects the preamble and then tracks the characters read. A running check on parity errors is provided, and also the bits are monitored for the postamble. At the end of the state CS0, flip-flop CECF was turned off, and when state CS7 commences, gate 571 provides the shift forward gating pulse for the register 500; the serial shifting is clocked by the RC-signal via gates 582 and 580.

Since there is reading, the $\overline{W9}$ signal is true, and the reading signals RF are applied to "and" circuit 572 to pass into the "and" gate 562 (FIGURE 12). The register 500 is loaded serially with the signals read and as derived from the RF flip-flop. The first character shifts the counting content (IHGD) out of the register 500. The flip-flop CECF (FIGURE 14) is turned on with the first RCP pulse derived in FIGURE 6, from the "and" circuit 380 (FIGURE 6) at the end of the first character read. As one can see from FIGURE 7, this first RCP pulse signals the completion of loading the first character read (after preamble), into the register 500. The first true character must be preceded by a preamble, otherwise an error is signaled.

This RCP pulse turns the external clock CECF on, thereby opening gate 770 (FIGURE 14). The computer will call on this gate by a W5 pulse, and will acknowledge receipt of the first character by a W6 pulse. The acknowledging signal from the computer W6, turns flip-flop CECF off again. This cycle will proceed for as long as character pulses RCP are formed: During the CECF off states, the shift forward gating signal SFG is provided by the "and" circuit 571 (FIGURE 12) so that sequentially the register 500 is loaded serially with the read signals as derived from the RF flip-flop. Whenever the flip-flop CECF is turned on, by a read clock character pulse RCP, the content of the register 500 can be transferred to the computer in proper format through the gates 507 through 567 opened by the CS7 signal.

The serial loading of the register 500 during the reading procedure is clocked through the gates 582, 580, etc. and clocking depends on the rate of production of the RC clock pulses (FIGURE 7). The read clock bit pulses RC are developed as shown in FIGURE 3. Reading continues uninterruptedly until any of the error situations occurs which have been described above (data gap or parity error), and which are signaled to the computer for it to decide how to proceed.

The forward reading process continues until the postamble is detected and the gap situation occurs. Since in the meantime during the reading process the CUFF flip-flop was turned off (see gates 705 and 703—FIGURE 14), upon occurrence of gap and production of the RG signal, which is indicative of the fact that a gap has been encountered, the "and" circuit 713 responds to cause resetting of the read enabling flip-flop CERF, whereupon the data transfer system is shifted out of reading state CS7 and into the gap state CS5.

In the CS5 state the register 500 is first cleared as aforedescribed by a temporary turning on of the flip-flop CECF, and by gating through the FC pulses, through the "or" gate 580 etc. to erase any content from the register 500. The flip-flop CECF is turned off again, through the very next pulse WCPI (gates 766 and 765 in FIGURE 14). When $\overline{CECF}$ is true in state CS5, gate 577 causes "or" circuit 576 to provide a count binary gating signal CBG (FIGURE 12). The continued production of the WG01 pulses which was not impeded by any of the reading operations, is now effective in gate 505 opened by the CBG signal, and the register 500 is operated as a counter.

It is particularly important that now the data transfer system is in a waiting state searching whether during counting up to the time of the production of the SPGD signal, the continue flip-flop CUFF will receive a signal for the data transfer system to continue the reading process. It will be observed that the change over from the CS7 to the CS5 states occurred after a postamble had been encountered, i.e., after a complete record has been read. This, of course, does not mean that the entire content of the tape has been read. Therefore, during the gap situation the tape continues to run and the system waits for a signal STRT from the computer, to be applied to "and" circuit 702 (FIGURE 14) for the continue flip-flop CUFF to be turned on.

Assuming that no signal STRT is issued by the computer, then after the production of the SPGD pulse the system is shifted into the CS6 state in which the flip-flop CECF is briefly turned on and off again and the register 500 is cleared through the gating system 583, 580, etc., to erase the counting result. After the decoupling signal $\overline{WII}$ from the computer has been received, the system is shifted into zero CS0 state.

Assuming, however, that during the period of time in which the system is in the CS5 state (i.e., within the time interval the end of which is marked by the SPGD signal), the STRT signal is produced by the computer to turn on the continue flip-flop CUFF. After turning on of the CUFF flip-flop, the register 500 is permitted to continue the counting until the CURD counting result or state is attained. This counting result bridges almost the entire time during which the read head passes over gap. In order to avoid any pick-up of spurious signals, the read flip-flop is being disabled during this period, and any signal applied to the RSF flip-flops (FIGURE 3) is being suppressed due to the lack of the gating signal to be provided by the read enabling flip-flop CERF.

As soon as the period of time assigned to the production of the signal CURD has elapsed, the data transfer system is shifted back again into the CS7 state as aforedescribed, particularly, here by turning the state counter flip-flop CSB on again, and now the reading sequence continues in the same manner as aforedescribed. Reading now will continue by alternating between the states CS7 and CS5 as a subprogram until no STRT signal is being developed any more by the computer, thereupon the system shifts to the stop state CS6 for shutdown sequence until a new operational command is received from the computer. Reading may specifically be terminated, if the end of the tape has been reached, which situation is monitored separately and signaled to the computer so that no STRT signal will be developed.

Assuming that the reverse reading is desired, then as soon as the start signal was received during the CS0 state, and as soon as the reverse command signal (C12) has been received from the computer, the flip-flop C12M responds. Since the $\overline{W9}$ signal is true, the computer is in the state of expecting signals, so that an immediate shift into the read state CS7 occurs. Since the read head, now leading will be close to the beginning of the first record at the time of the tape ready signal, the read sequence itself is the same as described above, but with the distinction that now the gate 575 (FIGURE 12) is being opened to develop the shift reverse gating signal SRG. The read signals derived from the RF flip-flop are applied to the "and" circuit 503. The register 500 is now shifted serially and in the reverse direction so that in spite of this serial loading of the register in reverse direction, the characters appear in proper format therein whenever a character pulse RGP is being developed. The CECF flip-flop is being turned on by the RCP signals and turned off by the W6 signals from the computer, also in exactly the same manner as aforedescribed, since this routine operates independently from the direction of tape movement and register shifting.

It will also be observed that due to the symmetrical character of post and preambles, a character written as postamble will appear as preamble when reading is set for reverse direction, and the character written as preamble will appear as postamble during reverse reading and scanning, so that operation in the read counter logic (FIGURES 3 and 6) is not different for forward and backward reading. It will be observed further that for the data flow the only difference between forward and reverse reading is by opening either gate 571 or gate 575 to respectively develop forward and reverse shifting gating signals and, of course, the reading signals RF are fed at respective opposite ends into the input circuit network for the register 500.

During reverse reading it is necessary, that the data transfer system is not shifted into the gap state CS5 immediately upon detection of the postamble because the trailing write head has to clear from the record. Nevertheless the flip-flop CERF is turned off by "and" circuit 713 when the read logic encounters the beginning of a true gap to develop the signal RG provided the postamble detecting signal RSF has been developed. Further development of reading signals is thereupon inhibited.

Since C12M (reverse) is still true, a change over from reading state CS7 into the read-to-write delay state CS4 occurs to wait for the trailing write head to be removed from the record. The register 500 operates as a counter to count WG01 pulses up to the number identified by the WTRD signal. This signal occurs somewhat before the respectively trailing writing head clears the record. After having reached the WTRD count, the transfer system is shifted to the CS5 state, and again the register 500 is cleared as aforedescribed immediately after the change over from state CS4 to the state CS5. In the state CS5 the register 500 operates again as a counter (CBG being developed by gate 576) to count character pulses WG01 from count state zero up to expiration of the time assigned for the SPGD signal. During this stop-gap delay period, the computer may or may not issue a STRT signal operating to turn the CUFF flip-flop on as a signal to continue operation. The gate 620 monitors the $CUFF \cdot \overline{W9} \cdot C12M \cdot SPGD$ coincidence whereupon again the state CS7 is attained. Reverse reading now continues until during state condition CS5 the continue flip-flop CUFF remains reset whereupon the change over occurs from the state CS5 to the stop state CS6 which change over itself is not dependent upon any directional mode of operation.

It should be mentioned, that for repeated forward reading the state sequence is CS7–CS5–CS7–CS5–CS7, etc., whereby the transfer system is in the state CS5 for the time it takes counter-register 500 to count up to the CURD counting state (supra). In case of repeated reverse reading, the state sequence is CS7–CS4–CS5–CS7–CS4–CS5–CS7, etc.; here the system is in state CS4 for the counting period terminated by signal WTRD, and in state CS5 for the period marked by signal SPGD. These two periods are about equal to the CURD–time interval and cover in either case about the time it takes a gap of, for example, ¾ inch to pass under the reading head, at the fastest tolerable tape speed.

In case reverse reading is to be discontinued, the change over is CS7 to CS4, and here the read transducer has just passed the end of the record with the write transducer trailing for the read-to-write delay distance. The change over to CS5 occurs a trifle before the time, that the write transducer passes over the end of the record. In case of forward reading the change over is CS7 to CS5 (no CS4) when the read transducer passes the end of the record, the write transducer being already over gap for the read-to-write delay distance. Thus, in either case the time period SPGD for CS5 starts with the respectively trailing transducer then already being over gap for the read-to-write delay time. After the SPGD period has elapsed shutdown occurs (CS6). The drive system as well as the time delay periods are selected so that the transducer assembly will come to a stop from either direction at a position in which the center between write and read transducers is about in the center of the gap.

The writing operation is carried as follows. Again of course the transfer system initially is in the state CS0. Soon the computer will issue a STRT signal and after the addressed tape is ready, the CS0-tape ready coincidence enables CECF flip-flop to provide the CSG and CBG signals (FIGURES 9 and 12) and the production of WG01 pulses is resumed. At this time it may or may not be clear whether reading or writing is intended. The writing sequence is initiated by the issuance of a W9 signal from the computer as a signal that the computer intends to issue data.

The register 500 now operates as a counter as aforedescribed, but the situation is different as far as the counting result is concerned. Counting proceeds until the start gap delay signal STGD is produced. Thereupon the tape has attained writing speed. Upon coincidence of the W9 and STGD signal a change over from CS0 to the CS1 state occurs. Since, of course, character clock WG01 pulses are counted, the changeover is strobed by the WGO1 pulses themselves accurately at the end of counting.

The system stays in the CS1 state for two character periods. During the first character period the CECF flip-flop is turned on, and in the state CS1 the register 500 is erased through the gating assembly 583 and 580, no input being applied to the register stages. Also, during this time that CECF is on, preamble formation commences. With turning on of the tape drive, the erase flip-flop CETF was turned on so that as soon as the tape started to move there is erasing. This erasing continues until in state CS1 during the first character period thereof the write synchronizer has produced a coincidence of WSB, WSC and WCP1 (FIGURE 9). Since no overall erasing is desired $\overline{W10}$ is true and the flip-flop CETF is being turned off at that instance. The WSB, WSC, WCP1 coincidence controls the begining of the preamble formation. Thus, upon occurrence of this coincidence and upon resetting the erase flip-flop CETF, the write logic passes WCP1 pulses to the write flip-flop WF for writing of eight "1" bits onto the tape.

With the next WG01 pulse the CECF flip-flop is turned off, and after counting six WCP0 pulses coincidence occurs at the "and" circuit 441, the next WCP0 pulse is being passed into the write flip-flop WF to write a zero, which in effect is the end of the preamble.

The same WCP0 pulse, which was gated to the write flip-flop for binary zero recording, produces a WG01 pulse in gate 433 to strobe the change over from the state CS1 into the state CS2, and the CECF flip-flop is turned on again at that instant (see WG01(3) in FIGURE 11). The register 500 does not participate in the formation of the preamble. In state CS2 writing is carried as aforedescribed. The gate 570 develops the shift parallel gating signal SPGD to gate open the input gates 501 through 561, during the periods of time in which flip-flop CECF is turned on. CECF production is true at production of each write character strobing pulse WG01. Upon issuance of a W6 signal by the computer soon thereafter the register stages are loaded in parallel through the gates 501 through 561, and the CECF flip-flop is turned off. From FIGURE 11 one can see, that after the WG01(3) pulse strobing the CS1 to CS2 changeover, CECF was on to control loading of the very first character into register 500. When $\overline{CECF}$ is true the shift forward gating signal SFG is developed at gate 571.

The WCP0 pulses occurring at a rate of seven times the frequency of the WG01 pulses, and being produced in the network shown in FIGURE 9, clock the register 500 through gates 581, 580 to serially shift the previously loaded content of register 500 through the reset output side HR00 (FIGURE 12) into gate 442 (FIGURE 9) for passage into the write flip-flop WF. During writing, the WCP1 pulses are unimpededly applied to the write flip-flop WF, and only the zero defining additional transitions derived from the reset output side of register stage HR00 serve as gating signals for gate 442 to permit passage of WCP0 pulses to cause such additional transitions.

The sequence of reloading the register and the serial shifting of data is controlled by flip-flop CECF, alternatingly causing production of the shift parallel and shift serial gating signals in synchronism with the write character clock WG01, whereby as far as the write bit clock signals WCP1 and WCP0 are concerned, the parallel loading of register 500 is completed within less than one write clock period, permitting continuous bit writing of a constant rate without any gap in between characters.

Writing is continued until the computer issues a W5 signal indicating that now no further characters will be supplied for the moment from the computer. It should be mentioned, however, that this does not mean that the W9 signal necessarily ceases to be true, because there might be only a temporary halt in the supply of data from the computer. This temporary discontinuance of data supply is signaled by the presence of the W5 signal, while still W9 signal is true. The W5 signal strobed at a WG01 pulse causes a change over from the state CS2 into the state CS3 for postamble formation.

The postamble formation concurs with a clearing of the register 500 through the gating assembly 583 and 580 at the absence of any other input signal for the gating terminals of the register stages. The postamble itself is being formed in first gating a zero (WCP0) to the write flip-flop (see gate 443, FIGURE 9) and a sequence of eight ones follows while any of the gates 442, 443 and 441 is blocked. At the end of the postamble as identified by a $WCP1 \cdot CS3 \cdot WSA$ and $\overline{CECF}$ coincidence, the erase flip-flop CETF is immediately turned on, so that immediately after the postamble has been written on the tape erasing occurs. The postamble formation period, i.e., the state CS3 lasts also through two character cycles, so that with the third WG01 pulse a change over occurs to state CS4.

It is noteworthy that throughout the writing period the read logic was operating independently. It will be recalled that the response of the read logic and particularly of the read flip-flop RF depends on a gating signal provided by the read enabling flip-flop CERF. The flip-flop CERF in turn was gated open by the state signal CS1. Thus, when the data transfer system is shifted into the preamble formation state CS1, the read enabling flip-flop is turned on and remains on for the read logic to operate continuously.

Of course the read signal output of the RF flip-flop though supplied to "and" circuits 503 and 572 in FIGURE 12 is suppressed during the writing period since neither "and" circuit is gated open. During writing the gate 575 is blocked, because writing is not carried out in the reverse, so that C12M is not true and the shift reverse gating signal is not true accordingly. Also, during writing W9 is not true so that gate 572 is not open. Therefore as far as the input for register 500 is concerned, the RF signal is being suppressed indeed. Of course, the RC signals are also suppressed, gate 582 being closed, since no read clocking is required during the writing stage.

On the other hand, the read detector logic operates during writing and postamble, preamble formation periods; parity error and gap detectors continue to operate throughout the writing procedure by monitoring continuously whether or not the characters just written contain errors or not. Whenever such error occurs or when gap is encountered the network in FIGURE 6 responds and issues a corresponding signal to the computer.

During writing the shifting out of the postamble formation state CS3 occurs by $\overline{CECF}$ $\overline{W10}$ coincidence, of course strobed by a WG01 pulse, whereupon a changeover occurs from CS3 to CS4. Since W9 is still true, there is a delay necessary until the read enable flip-flop CERF is being turned off. This delay is necessary because at the moment the write flip-flop has completed the writing of the postamble the trailing read head still has to monitor several characters, and only after the read head and the read detector logic has encountered the postamble previously written during the CS3 state, the CERF flip-flop will be turned off through the "and" gate 713.

This particular delay is supervised by shifting the system into the CS4 state while the read logic completes its read-after-write check. The register 500 operates as a counter, since it does not participate in the read-after-write check. After counting to produce the pulse WTRD, and after the read enable flip-flop CERF has been turned off by the gap-postamble detector of the read logic, a changeover occurs from the state CS4 to the state CS5 during which again the data transfer system waits for the production of a STRT signal as an indication that the computer desires to write another record. If during the CS5 state, and after elapse of the SPGD period no such signal for enabling the continue flip-flop CUFF has been received, then the shutdown sequence is commenced by shifting the system into the state CS6. If, however, the flip-flop CUFF is being turned on during the gap period, register 500 is continued to operate as a counter as aforedescribed until the CUWD period has elapsed. Upon coincidence of $W9 \cdot CUFF$ and CUWD signals a changeover occurs as above described from the CS5 state back into the preamble formation state CS1. Again, changeover is strobed by a WG01 pulse, and immediately upon occurrence of the change over another preamble is being formed, and writing continues as aforedescribed.

The periods of time WTRD and CUWD added together approximately determine the length of the gap, since WTRD was started after postamble formation and at the end of CUWD another preamble is formed. There is, however, a short additional delay since the WTRD period is slightly shorter than the read to write delay which is actually accurately determined by the moment the CERF flip-flop is disabled upon completion of the read-after write check. If for reasons of a very slow tape speed the read enable flip-flop CERF is not disabled during CS4 state after the period IHGD has elapsed, a changeover into the gap state is made dependent from the state of flip-flop CERF (see "and" gate 618 in FIGURE 13). Thus, the total gap length will not exceed the time IHGD plus CUWD.

During state CS3 and upon completion of the formation of the postamble and even prior to the then succeeding WG01 pulse, the erase control flip-flop CETF was being turned on again in order to erase for as long as the tape is running while no data are being written onto the tape. The erase flip-flop will be turned off either by the $\overline{W11}$ signal which decouples the data transfer system from the computer. Alternatively the erase flip-flop is turned off immediately prior to the formation of a new preamble to precede the next record.

For erasing the two signals W9 and W10 are both true. The program starts, as in all cases, with the CS0 state. Upon occurrence of a STRT signal the addressed tape is tarted and in the CS0 state the erase flip-flop CETF is turned on so that the addressed writing transducer receives erasing signals through the open gate 452. Regardless of forward or reverse direction, the system then shifts into the CS1 state after the STGD period has elapsed. Regardless of forward or reverse direction, the system then shifts into the CS1 state after the STGD period has elapsed. All operations now are similar to writing: Preamble formation, data flow into and out of register 500 and postamble formation, so that in effect the erasing may cover a complete record with pre- and postamble. The only difference is, that at the beginning of preamble formation, the erase flip-flop CETF is not turned off.

During forward erasing the random data issued by the computer pass into the register 500 and even reach the flip-flop WF, but its output is blocked. The amount of data issued by the computer is indicative of the tape length to be erased. During reverse erasing, the random data never leave the register 500. At the end of forward erasing signaled at first by the computer by a W5 signal and succeeded by two character periods for the CS3 state but erasing itself is not interrupted. In case of forward erasing, the system is shifted into gap state CS5 by signals $W10 \cdot \overline{CT2M} \cdot WG01$ and a continuation signal STRT may then occur within the SPGD period or the shutdown sequence, state CS6 is initiated. The CUFF flip-flop is also responsible for controlling an erase continuation in a manner which is analogous to a write continuation.

An erase reverse routine is provided and will be carried out for erasing a record which has just been written but which was found faulty during the read after write check. Thus, there was first a write routine, but in the CS5 state thereof no continue signal was issued and the system was shifted to the shutdown state CS6 and from there into state CS0. Now the tape starts anew but in reverse direction. It is essential that the erasing will cover now precisely this faulty record leaving nothing thereof unerased. Since in erase reverse the read head leads while the trailing write head erases, one can ensure complete erasing if started, for example, at the moment the reversing read head encounters the end the record to be erased, which end, of course, is now the beginning. Erasing is now continued for the duration of data issuance of the computer which comprises the same number of characters as the faulty record; thus the computer will cease to issue data when the read head passes (reversely) over what has the beginning of the faulty record. To this period of time the period defined by IHGD is added which is slightly larger than the read-to-write delay, and during which erasing continues.

The "and" circuit 739 (FIGURE 14) keeps the CECF flip-flop off during the CSI state beyond two character periods until recordings are encountered. Then the system is shifted to CS2 state and after the computer has ceased to issue data, the system shifts out of the CS3 state into the CS4 state and after the IHGD delay period directly into the CS6 state. There is no waiting here for a continuation, because reverse erasing will cover only one record and the accumulation of faulty records on the tape is of course provided for.

The invention is not limited to the embodiments described above, but all changes and modifications thereof not constituting departures from the spirit and scope of the invention are intended to be covered by the followinging claims.

What is claimed is:

1. A data transfer system for controlling recording data on a tape which data are provided by a computer, and for controlling feeding of data to the computer after reading of such data from the tape, comprising:
   program control means defining a plurality of different operational states whereby a first sequence of states defines a tape reading routine and a second sequence of states defines a tape recording routine;
   a plurality of bistable stages operating as serial to parallel converter in one of said states during said tape reading routine and operating as parallel to serial converter in another one of said states during said tape recording routine;
   and means for interconnecting said bistable stages to operate as counter in at least one state that is common to said reading and said recording routines and to provide for operational delay within either routine.

2. A data transfer system for transferring data between a computer and at least one magnetic tape, such data to be provided to and from the computer in a serial by character, parallel by bit format, comprising:
   first signal means for connection to the computer and for receiving therefrom sequentially characters comprised of a plurality of bits, said bits being provided in parallel per character;
   means for drawing said characters in serial by bit format from the said signal means for recording thereof on the tape;
   second signal means for connection to the computer to deliver thereto characters sequentially and in parallel by bit format;
   means for providing to said second signal means data read serially from a tape; and
   program control means for operating said first and second signal means, so that said computer will selectively receive and deliver data after predetermined delay periods.

3. In a data handling system, the combination comprising:
   a plurality of bistable stages;
   first means for interconnecting said stages to selectively serve as data converter for two types of conversion, parallel to serial and serial to parallel, and including means for serially shifting data through said stages in two directions;
   second means for interconnecting said stages to serve as binary counter when said first means are disabled;
   and count detector means responsive to count results of said counter to reactivate said first means in response to predetermined combinations of counting results, type of data conversion, and direction of serial data transfer in said converter.

4. A data transfer system for controlling the flow of data to and from a source of data, comprising:
   program means defining a plurality of operating states some of them having definite durations, the others having indefinite durations in that they depend on the periods of desired data flow or pauses in between sequential flows, and producing state identifying signals;
   control means connected for controlling said program means to define a plurality of state sequences, the termination of a program state being necessarily accompanied by the establishing of another program state, the signals for respectively terminating states of indefinite durations being derived from means pertaining to the source and controlling the providing of data by said source, the control means including timing means responsive to particular state signals for providing signals for terminating a state of definite duration accompanied by the respective one of the particular state signals, each sequence of states representing a program, there being at least one program per data transfer in either direction as between to and from said source of data;
   a second data source issuing and receiving data;
   a plurality of data transfer control elements operatively connectible to said two data sources for handling the flow of data between said two sources, as temporary buffer; and
   control means responsive to said state signals for operating said data transfer control elements in a manner as determined by said state signals thereby determining the direction of data flow through said data transfer elements.

5. The system as set forth in claim 4 wherein the second source issues and receives data in a format different from the format of the data flowing to and from the first source of data, the transfer control elements including means for format conversion.

6. A data transfer system for controlling recording of data on a tape, which data are provided by a computer, and for controlling feeding of data to the computer after reading of such data from the tape, comprising:
- a state counter capable of assuming and maintaining a plurality of different states and providing state identifying signals, there being only one such signal in existence at a time;
- first program control means for drawing data from the computer and enabling the recording thereof on the tape in response and for the duration of a first state identifying signal;
- second program control means for enabling tape reading of data and providing such data to the computer in response to and for the duration of a second state identifying signal;
- third program control means for providing at least one delay period in response to and for the duration of the third state identifying signal produced by said state counter subsequently to the termination of either of said first and said second state identifying signals; and
- means responsive to a command signal from the computer prior to elapse of said delay period to control said state counter for repeating provision of one of said first and second state signals for repeating one of said first and second programs.

7. In a data transfer system for recording binary signals on a magnetic tape which signals are provided by a computer on call and in parallel by bit serial by character relationship, comprising:
- circuit means for providing recording signals in response to pulses received;
- means for providing a first and a second pulse sequence to said circuit means respectively as beginning-of-record and as end-of-record identifying codes, each of said codes when read in one direction being the beginning-of-record code and when read in the opposite direction being the end-of-record code;
- and means connected to the computer for deriving from the computer data to be recorded and for feeding such data to said circuit means only subsequent to production of said first pulse sequence and prior to production of said second pulse sequence.

8. A data transfer system for controlling the recording of data on a tape which data are provided by a computer, and for controlling feeding of data to the computer after reading of such data from the tape, comprising:
- a first register capable of assuming and maintaining a plurality of different states and providing state identifying signals, there being only one such signal in existence at a time;
- a second register permitting parallel loading of data from the computer and serial withdrawal of such data for recording, further permitting serial loading of data read from the tape and parallel feeding of such data to the computer;
- first program control means for controlling said second register to alternate between parallel loading and serial withdrawal in response to and for the duration of a first state identifying signal;
- second program control means for controlling said second register to receive data serially read from a tape and to feed same parallelly to the computer for the duration of and in response to a second state identifying signal;
- a third program control means for providing at least one delay period in response to and for the duration of a third state identifying signal produced by said first register subsequently to the termination of either said first and said second state identifying signals;
- and means responsive to signal furnished by the computer prior to elapse of said delay period for deciding on repetition of any of said first and said second programs.

9. An apparatus for retrieving pulses recorded on a magnetic storage carrier at two pulse frequencies respectively representing binary quantities, comprising:
- a source of reference pulses have a frequency larger than either one of said pulse frequencies;
- a record carrier reading means for reading said recorded pulses and providing a frequency modulated train of pulses in accordance with the frequencies representing the binary quantities;
- counter means connected to count reference pulses and being further connected to said reading means for resetting by pulses recurring at a rate of but one of said two frequencies; and
- means responsive to occurrence of additional pulses prior to each resetting of said counter for providing binary distinguishing signals.

10. An apparatus for retrieving pulses recorded on a magnetic storage carrier at two pulse frequencies respectively representing binary quantities, comprising:
- a source of reference pulses having a frequency larger than either one of said pulse frequencies;
- a record carrier reading means for reading said recorded pulses and providing a first train of pulses representative of the recurring rate of any binary quantity read, and further providing additional pulses representative of one binary quantity, while absence of an additional pulse is representative of the respective other binary quantity;
- a counter connected to count said reference pulses;
- circuit means responsive to absence and presence of pulses of said first train of pulses during a first range of reference pulse counts, and being further responsive to absence and presence of additional pulses during a second range of reference pulse counts; and
- means for providing a binary signal in response to absence and presence of an additional pulse in said second range.

11. An apparatus as set forth in claim 10, said first and said second range being contiguous, said apparatus further including means for providing an error signal upon occurrence of a pulse at a reference pulse count lower than said second range.

12. An apparatus as set forth in claim 10 and including means for providing an error signal upon occurrence of a signal pulse during reference pulse counts outside of said first and said second range.

13. An apparatus as set forth in claim 10 including means for resetting said counter in response to occurrence of a signal pulse in said first range of reference pulse counts.

14. An apparatus as set forth in claim 13 including means for providing an indicating signal when said counter has reached a predetermined count exceeding said first range.

15. An apparatus for retrieving pulses recorded on a magnetic storage carrier at two pulse frequencies respectively representing binary quantities, comprising:
- a source of reference pulses having a frequency larger by about one order of magnitude as compared with at least one of said pulse frequencies;
- a record carrier reading means for reading said recorded pulses and providing a first train of signal pulses representative of the recurring rate of any binary quantity read, and further providing additional signal pulses representative of one binary quantity, absence of the respective other binary quantity;

a counter connected to count said reference pulses;

means for resetting said counter with each signal pulse of said first train of pulses; and means connected to said counter and being responsive to absence and presence of said additional signal pulses during a predetermined range of reference pulse counts and providing for a binary signal distinguishing between said binary quantities.

16. An apparatus for retrieving pulses recorded on a magnetic storage carrier at two pulse frequencies respectively representing binary quantities, comprising:

a source of reference pulses having a frequency larger by about one order of magnitude as compared with at least one of said pulse frequencies;

record carrier reading means for reading said recorded pulses and providing a train of signal pulses representative of the recurring rate of any binary quantity read, and further providing additional signal pulses representative of one binary quantity while absence of an additional signal pulse in between two pulses of said first train is representative of the respective other binary quantity;

a counter connected to count said reference pulses; and circuit means connected to said counter and being responsive to occurrence and absence of said additional signal pulses during a predetermined range of reference pulse counts and providing for a binary signal distinguishing between said binary quantities.

17. An apparatus for retrieving pulses recorded on a magnetic storage carrier at two pulse frequencies respectively representing binary quantities, comprising:

a source of reference pulses having a frequency larger by about one order of magnitude as compared with at least one of said pulse frequencies;

a record carrier reading means for reading said recorded pulses and providing a first train of signal pulses representative of the recurring rate of any binary quantity read, and further providing additional signal pulses representative of one binary quantity, absence of an additional signal pulse in between two pulses of said first train is representative of the respective other binary quantity;

a first counter connected to count said reference pulses;

circuit means connected to said first counter and being responsive to absence and presence of said additional signal pulses during a predetermined range of reference pulse counts and providing for a binary signal distinguishing between said binary quantities;

a second recycling counter responsive to said first train of signal pulses and providing a sequence of character clock pulses representative of the grouping of said binary quantities in characters; a parity error switch triggered by each additional signal pulse; and means for determining the state of said parity error switch at the occurrence of each said character clock pulse.

18. An apparatus for retrieving pulses recorded on a magnetic storage carrier at two pulse frequencies respectively representing binary quantities, comprising:

a source of reference pulses having a frequency larger by about one order of magnitude as compared with at least one of said pulse frequencies;

a record carrier reading means for reading said recorded pulses and providing a first train of signal pulses representative of the recurring rate of any binary quantity read, and further providing additional signal pulses representative of one binary quantity, absence of an additional signal pulse in between two pulses of said first train is representative of the respective other binary quantity;

a first counter connected to said reference pulses;

signal means connected to said first counter and being responsive to absence and presence of said additional signal pulses during a predetermined range of reference pulse counts and providing for a binary signal distinguishing between said binary quantities; and means connected to said signal means to be responsive to a predetermined plurality of binary signals for disabling said record carrier reading means.

19. An apparatus for retrieving pulses recorded on a magnetic storage carrier at two pulse frequencies respectively representing binary quantities, comprising:

a source of reference pulses having a frequency larger by about one order of magnitude as compared with at least one of said pulse frequencies;

a record carrier reading means for reading said recorded pulses and providing a first train of signal pulses representative of the recurring rate of any binary quantity read, and further providing additional signal pulses representative of one binary quantity, absence of an additional signal in between two pulses of said first train is representative of the respective other binary quantity;

a first counter connected to count said reference pulses;

circuit means connected to said first counter and being responsive to absence and presence of said additional signal pulses during a predetermined range of reference pulse counts and providing for a binary signal distinguishing between said binary quantities;

a second recycling counter responsive to said first train of signal pulses and providing a sequence of character clock pulses representative of the grouping of said binary quantities in characters; and code detector means responsive predetermined combination of binary quantities to enable production of said character clock pulse in response to a first one of such combination and to inhibit such production in response to second one of such combinations.

20. Apparatus as set forth in claim 19, either one of said first and second combination operating for enabling and inhibiting operation in dependence upon the direction of movement of said carrier.

21. Apparatus as set forth in claim 19, comprising, in addition a serial to parallel converter, said character clock pulses serving for parallel clocking of said converter, said first train of pulses serving for serial clocking of said converter, said code detector means providing for enabling and disabling of said converter.

22. An apparatus for selectively recording pulses on a magnetic storage carrier at two pulse frequencies respectively representing binary quantities and for retrieving said quantities therefrom, comprising:

a source of reference pulses having a frequency larger than said pulse frequencies;

counting means connected to count said reference pulses;

a record carrier reading means for reading said recorded pulses and providing a first train of signal pulses representative of the recurring rate of any binary quantity read, and further providing additional signal pulses representative of one binary quantity, absence of an additional signal pulse in between two pulses of said first train is representative of the respective other binary quantity;

circuit means connected to said counting means and being responsive to absence and presence of said additional signal pulse during a predetermined range of reference pulse counts and providing for a binary signal distinguishing between said binary quantities;

a recording control means connected for recording a train of signals in response to a periodically repeated count of said reference pulses, the periodicity thereof being within said predetermined range; and gating means for providing to said recording control means for recording a binary quantity distinguishing signal in between two of said signals of said train of signals.

23. An apparatus for recording signals on a magnetic storage carrier at two signal frequencies respectively representing binary quantities, comprising:
- a source of reference pulses having a frequency larger by about one order of magnitude as compared with at least one of said recording frequencies;
- a counter connected to count said reference pulses and providing a train of signal pulses representative of the recurring rate of any binary quantity to be recorded and further providing additional signal pulses representative of one binary quantity while absence of an additional signal pulse in between two pulses of said train is representative of the respective other binary quantity;
- means for providing gating signals representative of binary quantities to be recorded;
- recording control means connected to said counter and being responsive to all of said pulses of said train and being further responsive to occurrence and absence of gating signals for said additional signal pulses thereby providing for a binary signal distinguishing between said binary quantities, said recording control means additionally responsive; and
- reading means for reading and decoding all said pulses after recording thereof and at a rate determined by said train pulse frequency.

24. An apparatus for recording signals on a magnetic storage carrier at two frequencies respectively representing binary quantities, comprising:
- a source of reference pulses having a frequency larger by about one order of magnitude as compared with at least one of said recording frequencies;
- a first counter connected to count said reference pulses and providing first and second trains of signal pulses, said first train being representative of the recurring rate of any binary quantity to be recorded,
- a second recycling counter responsive to one said train of signal pulses and providing a sequence of character clock pulses representative of the grouping of binary quantities in characters to be recorded;
- a parallel to serial data converter receiving data in parallel for temporary storage at a rate determined by said character clock pulses;
- means for operating said data converter in synchronism with one of said train of signal pulses as provided by said first counter to serially shift data out of said converter;
- recording means continually responsive to said first signal train; and
- gating means for feeding to said recording control means second train pulses as determined by said data when serially shifted out of said converter, whereby presence of a second train signal pulse is representative of one binary quantity, while absence of a second train signal pulse in between two signal pulses of said first train is representative of the respective other binary quantity.

25. An apparatus for recording signals on a magnetic storage carrier at two signal frequencies respectively representing binary quantities, comprising:
- a source of reference pulses having a frequency larger by about one order of magnitude as compared with at least one of said signal frequencies;
- a counter connected to count said reference pulses and providing first and second trains of out of phase signal pulses, said first train being representative of the recurring rate of any binary quantity to be recorded;
- recording control means being continuously responsive during recording to said first train of signal pulses for recording thereof;
- first gating means for feeding to and suppressing from said recording control means second train signal pulses in accordance with binary bits to be recorded whereby presence of a second train pulse is representative of one binary quantity, while absence of a second train signal in between two pulses of said first train is representative of the respective other binary quantity; and
- second gating means for feeding a first and a second, second train signal pulse to said recording control means respectively immediately after recording of any data as controlled by said first gating means, and for inhibiting the feeding a predetermined plurality of second train pulses to said recording control means respectively prior to said first and subsequent to said second, second train pulses.

26. An apparatus for recording signals on a magnetic storage carrier at two signal frequencies respectively representing binary quantities, comprising:
- a source of reference pulses having a frequency larger by about one order of magnitude as compared with at least one of said signal frequencies;
- a first counter connected to count said reference pulses and providing first and second trains of signal pulses, said first train being representative of the recurring rate of any binary quantity to be recorded, said second train pulses being individually representative of the respective other binary quantity;
- recording control means responsive to all said first train pulses and to selected train pulses;
- a second counter for counting a predetermined number of signals of one of said trains for inhibiting during said counting passage of pulses of said second train to said recording control means; and
- means permitting passage of one pulse of said second train selectively before and after said inhibition to said recording control means for recording a preamble and a postamble.

27. An apparatus for recording signals on a magnetic storage carrier at two signal frequencies respectively representing quantities, comprising:
- a source of reference pulses have a frequency larger than said frequencies;
- a counter connected to count said reference pulses and providing a first train of pulses representative of the recurring rate of any binary quantity to be recorded and further providing additional pulses for distinguishing between binary quantities;
- recording control means continuously responsive to said first train of pulses during recording; and
- gating means for selectively passing said additional pulses to said recording control means in accordance with information to be recorded, whereby presence of an additional pulse is representative of one binary quantity, while absence of an additional pulse is representative of the respective other binary quantity.

28. A data transfer system for controlling recording of data on a tape with a recording transducer, which data are provided by a computer, and for controlling feeding of data to the computer after reading of such data from the tape by a reading transducer, comprising:
- program means defining a plurality of different operational states whereby a first sequence of states defines a tape read-forward routine, a second sequence of states defines a tape read-reverse routine, and a third sequence of states defines a tape recording routine;
- a plurality of bistable stages operating as serial to parallel converter in one of said states that is common to said tape reading routines and operating as parallel to serial converter in another one of said states during said tape recording routine;
- and program control means for interconnecting said bistable stages to operate as counter in another state that is common to said two reading and said recording routines, to render said program control means responsive to continuation or discontinuance of either of said routines, said control means operating said stages as counter in a third state pertaining to the tape reverse reading and recording routines only, to count for a waiting period corresponding to the delay between passage of reading and recording transducers past a given point.

29. A data transfer system for controlling recording of data on a tape which data are provided by a computer, and for controlling feeding of data to the computer after reading of such data from the tape, comprising:
program control means defining a plurality of different operational states whereby a first sequence of states defines a tape reading routine and a second sequence of states defines a tape recording routine;
a plurality of bistable stages operating as serial to parallel converter in one of said states during said tape reading routine and operating as parallel to serial converter in another one of said states during said tape recording routine;
a source of constant frequency reference pulses;
and means for interconnecting said bistable stages to operate as counter to count said reference pulses in three states that are common to said reading and said recording routines, to respectively define a waiting period for beginning of reading or writing a record, a waiting period for said reading and recording transducer heads to complete passage over any recordings and to face a gap in between two records, and a waiting period for receiving a continue signal for selectively repeating the recording or the reading routines.

30. A data transfer system for controlling recording of data on a tape which data are provided by a computer, and for controlling feeding of data to the computer after reading of such data from the tape, comprising:
program control means defining a plurality of different operational states whereby a first sequence of states defines a tape reading routine and a second sequence of states defines a tape recording routine;
a plurality of bistable stages operating as serial to parallel converter in one of said states during said tape reading routine and operating as parallel to serial converter in one of said states during said tape recording routine;
a read signal circuit responsive to signals read from the tape and during either of said one states and providing digital signals representative of the signals read, the read circuit being connected to one of said stages during said one state of said tape reading routine for passing thereto the digital signals; and
a read signal error detector circuit connected to said signal circuit during several of said states including said one state of said reading routine and said one state during said writing routine for sequentially processing the digital signals for the detection of errors.

31. A data transfer system for controlling the recording of data on a tape which data are provided by a computer, and for controlling feeding of data to the computer after reading of such data from the tape, comprising:
a register permitting parallel loading of data from the computer and serial withdrawal of such data for recording thereof;
read enabling means for providing a read-after write check for each data bit at a predetermined delay after recording of such data bit;
program means for controlling said second register to alternate between parallel loading and serial withdrawal in response to and for the duration of a first state identifying signal;
first circuit means for providing a first delay period shorter than said predetermined delay;
second circuit means for providing a second delay period larger than said predetermined delay, said first and second delay periods to commence at termination of recording; and
third circuit means for providing a third delay period that is a measure of a gap in between sequential recordings, said third delay period to commence after said first delay period and at the read-after-write check of the last recorded bit or at the end of said second delay period.

32. In a data transfer system for controlling the recording of data on a tape which data are provided by a computer, and for controlling feeding of data to the computer after reading of such data from the tape, comprising:
a first register capable of assuming and maintaining a plurality of different states and providing state identifying signals, there being only one such signal in existence at a time;
a second register permitting parallel loading of data from the computer and serial withdrawal of such data for recording;
first program control means for controlling said second register to alternate between parallel loading and serial withdrawal in response to and for the duration of a first state identifying signal;
circuit means for providing a first and a second pulse sequence for recording, respectively during a second and third state signal, as beginning-of-record and as end-of-record identifying codes, each of said codes when read in one direction being the beginning-of-record code and when read in the opposite direction being the end-of-record code; and
means responsive to computer command signals to control said first register to assume said second and third states, said first state being provided by said first register autonomously after a period of fixed duration for said second state has elapsed.

33. A data transfer system for transferring data between a computer and at least one magnetic tape, such data to be provided to and from the computer in a serial by character, parallel by bit format, comprising:
first signal means for connection to the computer and for receiving therefrom sequentially characters comprised of a plurality of bits, said bits being provided in parallel per character;
means for drawing said characters in serial by bit fomat from the said signal means for recording thereof on the tape;
second signal means for connection to the computer to deliver thereto sequentially and in parallel by bit format;
means for providing to said second signal means data read serially from a tape; and
a register common to said first and said second signal means for operating therewith respectively as parallel to serial and serial to parallel converter.

34. A data transfer system for controlling recording of data, supplied by a computer, on a tape and for controlling feeding of data read from the tape, to the computer, comprising:
circuit means providing parallel to serial and serial to parallel data conversion and including a first connecting network for parallel data transfer to and from the computer and further including a second connecting network for serial data transfer for tape reading and recording;
a program control means providing a plurality of different state signals, one at a time;
first control means operating said circuit means as parallel to serial converter during a first state signal;
second control means operating said circuit means as serial to parallel converter during a second state signal;
a third control means for providing a beginning of record code to be recorded on a tape during a third state signal, said program control means furnishing said first state signal to follow said third state signal;
fourth control means for providing an end-of-record code to be recorded on said tape during a fourth state signal, said program control means furnishing said fourth state signal at termination of said first state signal;

detector means connected to reading of said end-of-record code during said second state signal and operating said program means to terminate said second state signal; and circuit means to operate said program control means in response to command signals issued by the computer to furnish said second and third state signals and to terminate production of said first state signal.

35. A data transfer system for controlling a recording of data on a tape, which data are provided by a computer, and for controlling feeding of data to the computer after reading on such data from the tape, the combination comprising:

a register capable of assuming and maintaining a plurality of different states and providing state identifying signals, there being only one such signal in existence at a time;

first program control means for enabling tape reading of data and for providing such data to the computer in response to a first state identifying signal independent from the direction of tape movement;

second program control means for providing a first delay period in response to and for the duration of a second state identifying signal produced by said register in dependence upon the direction of tape movement and subsequent to the termination of said first state identifying signal;

third program control means for providing a second delay period in response to and for the duration of a third state identifying signal produced by said register in dependence upon the direction of tape movement subsequent to the termination of either said second state identifying signal; and means responsive to a command signal when issued by said computer prior to elapse of said second delay period and operating said register to produce said first state signal for controlling repetition of said first program.

36. In a data handling system, the combination comprising:

a plurality of bistable stages;

first means for operatively interconnecting said stages to provide a binary counter, there being a source of pulses to be counted;

second means for operatively interconnecting said stages to provide a serial shift register;

program means for selectively enabling and disabling said first and said second means, to selectively permit serial transfer of data by said stages when enabling said second means and to meter a gap of data transfer when enabling said first means.

37. A data transfer system for controlling the communication between two sources of data, comprising:

program means defining a plurality of operating states and producing state identifying signals;

a plurality of bistable stages;

a source of constant reference signals;

first control means for operatively connecting said stages in between said sources to permit data flow through said stages in one direction during a first state signal and in the opposite direction during a second state signal;

second control means for interconnecting said stages as counter and to said source of reference signals during at least one additional state signal; and means responsive to at least one counting result to operate said program means to terminate said additional state signal, said counting result providing for a delay in between sequences of data flow.

38. In a data handling system, the combination comprising:

a plurality of bistable stages;

a clock pulse source;

means for interconnecting said stages to serve as counter for said clock pulses to count up to a number indicative of the tape unit having attained sufficient speed; and means for reconnecting said stage to selectively serve as parallel to serial and serial to data parallel data converter upon termination of the counting.

39. A data transfer system for controlling recording of data on a tape, which data are provided by a computer and for controlling feeding of data to the computer after reading of such data from the tape, comprising:

a source of constant frequency pulses;

first means for deriving a sequence of bit clock pulses from said source;

second means for deriving a squence of character clock pulses from said source, said bit clock pulses having a frequency relative to said character clock pulses equal to the number of bits per character;

a plurality of bistable switching stages;

first control means for selectively interconnecting said stages to form a serial shift register;

means for clocking said stages when interconnected as a shift register, in response to said bit clock pulses;

second control means for selectively interconnecting said stages to form a parallel shift register;

means for temporarily activating said second control means and deactivating said first control means in response to character clock pulses;

means for feeding signals in parallel to all of said stages;

and means for withdrawing signals serially from one of said stages during activation of said first control means.

40. In a data handling system wherein a tape reading and a tape recording transducing units are positioned relative and along the tape and at a predetermined distance for each other, and wherein such tape is permitted to move relative to said transducing units in either direction, the combination comprising:

a plurality of bistable stages selectively interconnectible to form a shift register with one stage being selectively operatively connectible to said transducing units for respectively providing and receiving sequentially data organized in records;

means for selectively providing data to and withdrawing data from said stages in parallel;

program means for interconnecting and operating said stages as shift register to serially shift data to and from said one stage;

a source of constant frequency pulses;

circuit means for interconnecting said stages to form a counter, to count said constant frequency pulses;

means for disabling said program means when the respective leading one of said transducer heads has passed over the end of a record as recorded on the tape, thereby enabling said circuit means;

means for providing an output signal after said stages when interconnected by said circuit means as a counter, having counted a predetermined number of pulses approximately indicative of the passage of the trailing transducer unit over said end of record; and means responsive to production of said output signal and providing for re-enabling of said program means after predetermined delayed periods.

41. In a data handling system, the combination comprising:

a plurality of bistable stages;

first means for operatively interconnecting said stages to provide a binary counting counter, there being a source of pulses to be counted;

second means for operatively interconnecting said stages to provide a serial shift register;

third means for operatively interconnecting said stages to provide a parallel shift register, said first, second and third means being selectively enableable and disableable;

first program control means alternating enabling said second and said third means for controlling parallel to serial data conversion;

second program means enabling said first means to provide a time interval by counting a fixed number of pulses; and means for disabling said first program means during said counting.

42. A data transfer system for controlling recording of data on a tape which data are provided by a computer, and for controlling feeding of data to the computer after reading of such data from the tape, comprising:

a plurality of bistable stages;

first gate control means for operatively interconnecting said stages to serve as serial shift register;

a source of constant frequency shifting pulses applied to said stages for serial shifting of data through said bistable stages;

second gate control means for operatively interconnecting said stages to serve as parallel shift register;

a bistable switch which when in one state enables said first gate control means and when in the other state enables said second gate control means;

means for providing a sequence of first switching pulses to said switch corresponding to the rate of characters as they pass through said shift register;

means for providing a second sequence of second switching pulses from said computer to said switch at the rate as characters are provided in parallel from said computer to said bistable stages, any one of said first switching pulses cooperating with one of said second switching pulses for temporarily activating said second gate control means without effecting the rate of serial shifting.

43. In a data handling system, a plurality of bistable stages;

first means for interconnecting said stages to selectively provide a serial shift register, one of said stages sequentially assuming the states of all the stages;

second means for interconnecting said stages to selectively provide a parallel shift register;

third means for providing data in parallel to all of said stages;

fourth means for concurrently enabling said second and third means and for enabling said first means when said second and said third means are disabled; and means for drawing data serially out of said one stage.

44. In a data transfer system for recording binary signals on a magnetic tape which signals are provided by a computer on call and in parallel by bit, serial by character relationship, comprising:

a plurality of bistable stages interconnected to serve as parallel to serial data converter;

means for providing from the computer bits pertaining to one character in parallel relationship to said stages, there being N-bits per character;

means for serially withdrawing said bits from one of said stages;

circuit means responsive to said withdrawn bits for providing recording signals representative thereof;

means for providing a first signal sequence of at least N similar binaries succeeded by one complementary binary prior to operation of said data converter; and means for providing a second signal sequence of one said complementary binary succeeded by at least N said similar binaries subsequent to operation of said data converter.

45. In a data transfer system for recording binary signals on a magnetic tape which signals are provided by a computer on call and in parallel by bit, serial by character relationship, comprising:

a plurality of bistable stages interconnected to serve as parallel to serial data converter;

means for connection to the computer for providing bits pertaining to one character in parallel relationship to said stages, there being N bits per character;

means for serially withdrawing said bits from one of said stages;

circuit means responsive to said withdrawn bits for providing recording signals representative thereof;

means for providing a first and a second pulse sequence to said circuit means respectively as beginning-of-record and as end-of-record identifying codes, each of said codes when read in one direction being the beginning-of-record code and when read in the opposite direction being the end-of-record code, each said pulse sequences comprising a number of bits larger than N but unequal to an integral multiple of N;

and means for permitting operation of said data converter only subsequent to provision of said first sequence and prior to provision of said second sequence of pulses.

46. A data transfer system for controlling recording of data supplied by a computer on a tape and for controlling feeding of data read from the tape to the computer, comprising:

first circuit means selectively providing parallel to serial and serial to parallel data conversion, and including a first connecting network for parallel data transfer to and from the computer, and further including a second connecting network for serial data transfer for tape reading and recording;

second circuit means for operating said first circuit means as parallel to serial converter for as along as the computer furnishes data in parallel by bit serial by character format;

third circuit means for forming an end-of-record code to be recorded when the computer terminates furnishing said data; and fourth circuit means for operating said first circuit means as serial to parallel converter for a period of time terminated when an end-of-record code has been read from the tape.

47. A data transfer system for controlling recording of data on a tape which data are provided by a computer, comprising:

program control means defining a plurality of different operational states whereby a first sequence of states defines a tape erasing routine and a second sequence of states defines a tape recording routine;

a plurality of bistable stages operating as parallel to serial converter in one of said states during said tape recording routine to convert signals provided in parallel by said computer into signals permitting serial withdrawal;

transducing means for providing said serial signals to said tape during said one state; and means responsive to a computer-issued erase command signal for erasing said tape during a sequence of states including said one state.

48. A data transfer system for controlling recording of data on a tape by a recording head which data are provided by a computer, and for controlling feeding of data to the computer after reading of such data from the tape by a reading head, comprising:

program control means defining a plurality of different operational states whereby a first sequence of states defines a tape erasing-forward routine, a second sequence of states defines a tape erasing-reverse routine, and third sequence of states defines a recording routine;

a plurality of bistable stages operating as parallel to serial converter in one of said states during said tape recording routine;

means for interconnecting said bistable stages to operate as counter in a state that is common to erase forward and said recording routines to render said program control means responsive to continuation or discontinuance of either of said routines, said means operating said stages as counter in another state pertaining to the tape reverse erasing and recording routines to count waiting periods substantially corresponding to the delay between passage of reading and recording heads past a given point.

49. A memory system for connection to a computer, which computer has a plurality of parallel input terminals, a similar plurality of parallel output terminals, and a further plurality of control signal terminals, the combination comprising:

a multipurpose register having a number of stages equal to said plurality of input terminals, each stage having input and output circuits;

first means for connecting said input circuits of said register stages to said output terminals of said computer for receiving therefrom binary bits in parallel;

second means for connecting said output circuits of said register stages to said input terminals of said computer for providing thereto binary bits also in parallel;

first control means for shifting said register in either one of two directions to load said register serially with a number of binary quantities equal to said plurality of input terminals;

second control means for shifting said register in either one of two directions to discharge therefrom serially a number of binary quantities stored therein;

a plurality of signal storage carriers capable of varying their respective characteristics for storing information signals applied thereto along individual tracks;

means connected to said second control means for writing on any of at least some of said plurality of storage carriers an information track in response to signals drawn by the second control means from said register; and means connected to said first control means for feeding thereto binary signals serially read from any of said storage carriers.

50. A data transfer system for controlling the recording and erasing of data on a tape, there being a tape recording and a tape reading transducer positioned in spaced relationship along said tape, comprising:

means responsive to signals to be recorded and feeding same to tape recording transducer, said tape moving past said transducers with the reading transducer trailing the recording transducer;

means for controlling beginning of erasing in reverse direction and being responsive to a read transducer output representative of the beginning of the record to be erased; and means for controlling end of erasing in response to a delay period approximately similar to the delay between passages of said transducers past the end of the record to be erased.

51. An apparatus for retrieving digital data recorded on a magnetic storage carrier and as a sequence of magnetic transitions, the relative distance between two sequential ones of the transitions being of digital significance, comprising:

first means coupled to the carrier for reproducing the transitions and providing signals representative of the sequence of transitions;

a source of reference signals having a frequency in excess of the rate of recurrence of the transitions as reproduced;

counting means connected to the source for counting the reference signals; and second means connected to the first means and to the counting means for providing digital signals in response to the counting results respectively obtained in between sequential transitions.

52. An apparatus for retrieving digital data recorded on a storage carrier as a particular characteristic thereof, there being a particular characteristic recurring on a regular basis defining the rate of recording the data on the carrier there being selected additional, interspaced, particular characteristics the presence and absence of which being of bivalued significance, comprising a combination:

first means coupled to the carrier for providing a signal representative of the particular characteristics on the carrier;

a source of reference signals having a frequency in excess of the rate of recurrence of the characteristics as reproduced;

counting means connected to the source for counting the reference signals; and second means connected to the first means and to the counting means for providing a train of bivalued signals in response to sequential counting results obtained in between sequential particular characteristics as represented in the signal train.

53. A data transfer system for controlling the communication between two sources of data, one of said sources being responsive to and issuing data in serial-by-bit format, comprising:

a buffer being responsive to signals representing data derived from either source and for feeding such signals to the respective other source;

a clock pulse source providing pulses having a higher frequency rate than the rate of bits when flowing into or out of said one source;

first signal means connected to said buffer to receive therefrom serially signals representing bivalued bits at a rate determined by a fixed sequence of said clock pulses;

control means responsive to the clock pulses and to big signals received by the first signal means to provide signals to said one source after particular number of clock pulses, the numbers depending upon the respective values of the big signals;

second signal means connected to said one source to be responsive to signals representing data from said one source and referencing manifestations of the occurrence said latter signals against said pulses from said clock pulse source for distinguishing bivalued signals by clock pulse counts; and means for feeding said distinguished bivalued signals as serial bits to said said buffer.

54. A system for recording and reproducing data respectively on and from a bidirectionally movable magnetic tape respectively furnished and received by a digital data processing device, there being recording and reproducing transducers spaced apart along the direction of motion of the tape, comprising:

means coupled to the tape for moving the tape past the transducers;

a transfer system connected for providing digital data received from the processing device to the record transducer, and for receiving data from the reproducing transducer, for providing the reproduced data to the processing device; and means for metering a particular delay period succeeding the transfer of data by the transfer system, having duration approximately equal to the time delay between passage of the transducers past any particular tape portion, the period to become operative for subsequent control of the means for moving for one particular direction of top movement only.

55. A device for the retrieval of digital data recorded on a storage carrier as recurring characteristics thereof, comprising:

means coupled to the carrier for reproducing the recording and providing a signal train representative thereof and having particular recurring signal increments, the occurrence thereof within progressive, recurring particular time periods having bit value defining significance;

a source of reference pulses, having a frequency in excess of the respective rate of recurrence of the particular periods;

means coupled to the source for counting the reference pulses for metering each of the particular periods and on a progressively recurring basis;

means coupled to the means for counting and to the means for reproducing for detecting presence or absence of the particular signal increments in relation to particular pulse counts to provide bit value distinguishing signals on the progressively recurring basis.

References Cited
UNITED STATES PATENTS

| | | | |
|---|---|---|---|
| 2,951,232 | 8/1960 | Amdahl et al. | 340—172.5 |
| 2,960,683 | 11/1960 | Gregory et al. | 340—172.5 |
| 2,968,027 | 1/1961 | McDonnell et al. | 340—172.5 |
| 3,040,300 | 6/1962 | Rabenda et al. | 340—172.5 |
| 3,219,996 | 11/1965 | Tucker | 340—172.5 |

ROBERT C. BAILEY, *Primary Examiner.*

G. SHAW, *Examiner.*